United States Patent
Prasad et al.

(10) Patent No.: US 12,373,027 B2
(45) Date of Patent: Jul. 29, 2025

(54) GAZE INITIATED ACTIONS

(71) Applicant: Amazon Technologies, Inc., Seattle, WA (US)

(72) Inventors: Rohit Prasad, Lexington, MA (US); Arushan Rajasekaram, North Bend, WA (US); Furqan Muhammad Khan, Culver City, CA (US); Rajiv M Reddy, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/344,921

(22) Filed: Jun. 30, 2023

(65) Prior Publication Data

US 2025/0004544 A1    Jan. 2, 2025

(51) Int. Cl.
G06F 3/01         (2006.01)
G06F 3/0481       (2022.01)
(Continued)

(52) U.S. Cl.
CPC ............ *G06F 3/013* (2013.01); *G06F 3/0481* (2013.01); *G06F 3/04842* (2013.01); *G06F 3/165* (2013.01); *G06F 3/167* (2013.01); *G06F 9/451* (2018.02); *G06T 7/70* (2017.01); *G10L 15/22* (2013.01); *G06T 2207/30201* (2013.01); *G10L 15/193* (2013.01); *G10L 2015/223* (2013.01)

(58) Field of Classification Search
CPC .... G06F 3/013; G06F 3/0481; G06F 3/04842; G06F 3/165; G06F 3/167; G06F 9/451; G06T 7/70; G06T 2207/30201; G10L 15/22; G10L 15/193; G10L 2015/223
See application file for complete search history.

(56) References Cited

U.S. PATENT DOCUMENTS

| | | | |
|---|---|---|---|
| 5,818,439 | A | 10/1998 | Nagasaka et al. |
| 6,484,189 | B1 | 11/2002 | Gerlach et al. |

(Continued)

FOREIGN PATENT DOCUMENTS

| | | |
|---|---|---|
| JP | 2011227236 A | 11/2011 |
| WO | 2019077012 A1 | 4/2019 |

(Continued)

OTHER PUBLICATIONS

Oleg Akhtiamov, et al. 2017. Speech and Text Analysis for Multimodal Addressee Detection in Human-Human-Computer Interaction. In Interspeech 2017, 5 pages, https://www.isca-speech.org/archive_v0/Interspeech_2017/pdfs/0501.

(Continued)

*Primary Examiner* — Bryan Earles
(74) *Attorney, Agent, or Firm* — Pierce Atwood LLP

(57) ABSTRACT

A system that detects the location of a user gaze at a display and in response to the duration of the gaze exceeding a threshold, auto-playing content on the display. The system may also determine gaze event data associating the gaze event with the source of the content the user is gazing at. Other information may also be associated with the gaze event such as user ID, time/duration data, or the like. Various actions can be taken in response to the gaze event such as auto-playing of content, outputting a visual indication of the detected gaze, interpreting detected speech using the gaze event data, data aggregation, etc.

20 Claims, 25 Drawing Sheets

(51) Int. Cl.
    *G06F 3/04842*     (2022.01)
    *G06F 3/16*     (2006.01)
    *G06F 9/451*     (2018.01)
    *G06T 7/70*     (2017.01)
    *G10L 15/22*     (2006.01)
    *G10L 15/193*     (2013.01)

(56) References Cited

U.S. PATENT DOCUMENTS

| | | |
|---|---|---|
| 6,724,864 B1 | 4/2004 | Denenberg et al. |
| 6,934,756 B2 | 8/2005 | Maes |
| 7,117,442 B1 | 10/2006 | Kemble et al. |
| 7,194,409 B2 | 3/2007 | Balentine et al. |
| 7,324,636 B2 | 1/2008 | Sauvage et al. |
| 7,447,636 B1 | 11/2008 | Schwartz et al. |
| 8,229,750 B2 | 7/2012 | Creamer et al. |
| 8,406,457 B2 | 3/2013 | Matsuoka et al. |
| 8,432,368 B2 | 4/2013 | Momeyer et al. |
| 8,788,977 B2 | 6/2014 | Bezos |
| 8,970,625 B2 | 3/2015 | Chavez et al. |
| 9,026,438 B2 | 5/2015 | Buck et al. |
| 9,041,734 B2 | 5/2015 | Look et al. |
| 9,092,435 B2 | 7/2015 | Douthitt et al. |
| 9,094,576 B1 | 7/2015 | Karakotsios |
| 9,213,163 B2 | 12/2015 | Lewis et al. |
| 9,294,670 B2 | 3/2016 | Jafarzadeh et al. |
| 9,317,175 B1 | 4/2016 | Lockhart |
| 9,318,129 B2 | 4/2016 | Vasilieff et al. |
| 9,319,221 B1 | 4/2016 | Awad et al. |
| 9,354,709 B1 | 5/2016 | Heller et al. |
| 9,368,105 B1 | 6/2016 | Freed et al. |
| 9,384,594 B2 | 7/2016 | Maciocci et al. |
| 9,431,021 B1 | 8/2016 | Scalise et al. |
| 9,269,012 B2 | 9/2016 | Fotland |
| 9,542,941 B1 | 1/2017 | Weksler et al. |
| 9,552,093 B2 | 1/2017 | Zawacki et al. |
| 9,591,295 B2 | 3/2017 | Lockhart et al. |
| 9,626,152 B2 | 4/2017 | Kim et al. |
| 9,652,031 B1 | 5/2017 | Savastinuk et al. |
| 9,880,640 B2 | 1/2018 | Gray et al. |
| 9,940,929 B2 | 4/2018 | VanBlon et al. |
| 10,027,888 B1 | 7/2018 | Mackraz |
| 10,055,013 B2 | 8/2018 | Ramaswamy et al. |
| 10,067,634 B2 | 9/2018 | Ames et al. |
| 10,146,303 B2* | 12/2018 | Cerriteno .............. G06F 3/0346 |
| 10,320,353 B1 | 6/2019 | Wahlberg et al. |
| 10,325,409 B2 | 6/2019 | Costa |
| 10,332,506 B2 | 6/2019 | Pappu et al. |
| 10,349,120 B2 | 7/2019 | Graham et al. |
| 10,366,692 B1 | 7/2019 | Adams et al. |
| 10,373,617 B2 | 8/2019 | Piernot et al. |
| 10,430,024 B2 | 10/2019 | Sachidanandam et al. |
| 10,503,770 B2 | 12/2019 | Lee et al. |
| 10,573,312 B1 | 2/2020 | Thomson et al. |
| 10,579,912 B2 | 3/2020 | Holtmann |
| 10,592,064 B2 | 3/2020 | Ames et al. |
| 10,594,757 B1 | 3/2020 | Shevchenko et al. |
| 10,705,794 B2 | 7/2020 | Gruber et al. |
| 10,923,101 B2 | 2/2021 | Guo et al. |
| 10,979,331 B2 | 4/2021 | Alsina et al. |
| 11,140,459 B2 | 10/2021 | Ingel et al. |
| 11,170,761 B2 | 11/2021 | Thomson et al. |
| 11,258,841 B2 | 2/2022 | Vincent et al. |
| 11,315,572 B2 | 4/2022 | Nishikawa et al. |
| 11,403,466 B2 | 8/2022 | Peng et al. |
| 11,468,892 B2 | 10/2022 | Lim et al. |
| 11,620,997 B2 | 4/2023 | Kurasawa et al. |
| 12,105,874 B2* | 10/2024 | Kelly .............. G06F 3/165 |
| 2004/0152054 A1 | 8/2004 | Gleissner et al. |
| 2004/0218768 A1 | 11/2004 | Zhurin et al. |
| 2006/0093998 A1 | 5/2006 | Vertegaal |
| 2009/0018828 A1 | 1/2009 | Nakadai et al. |
| 2010/0226487 A1 | 9/2010 | Harder et al. |
| 2011/0267374 A1* | 11/2011 | Sakata .............. H04N 21/4223 345/672 |
| 2013/0268954 A1* | 10/2013 | Hulten .............. H04N 21/442 725/12 |
| 2014/0078039 A1* | 3/2014 | Woods .............. H04N 21/4318 345/156 |
| 2015/0082145 A1 | 3/2015 | Ames et al. |
| 2015/0106386 A1* | 4/2015 | Lee .............. G02B 27/017 707/736 |
| 2015/0213784 A1 | 7/2015 | Jafarzadeh et al. |
| 2015/0215532 A1 | 7/2015 | Jafarzadeh et al. |
| 2016/0162020 A1* | 6/2016 | Lehman .............. G06F 3/017 715/835 |
| 2016/0170710 A1* | 6/2016 | Kim .............. G06F 3/013 704/275 |
| 2016/0378747 A1 | 12/2016 | Orr et al. |
| 2017/0212583 A1 | 7/2017 | Krasadakis |
| 2018/0040046 A1 | 2/2018 | Gotoh et al. |
| 2018/0133900 A1 | 5/2018 | Breazeal et al. |
| 2018/0227630 A1* | 8/2018 | Schmidt .............. H04N 21/4728 |
| 2018/0276706 A1* | 9/2018 | Hoffman .............. G06V 40/193 |
| 2019/0199993 A1* | 6/2019 | Babu J D .............. G06F 3/011 |
| 2020/0128177 A1* | 4/2020 | Gotou .............. H04N 21/431 |
| 2020/0285314 A1* | 9/2020 | Cieplinski .............. H04N 21/42203 |
| 2020/0333875 A1 | 10/2020 | Bansal et al. |
| 2020/0349966 A1* | 11/2020 | Konzelmann .............. G06F 3/167 |
| 2021/0104242 A1 | 4/2021 | Hashimoto et al. |
| 2021/0166686 A1 | 6/2021 | Mok et al. |
| 2021/0312938 A1 | 10/2021 | Yun et al. |
| 2022/0021914 A1 | 1/2022 | Lintz et al. |
| 2022/0093093 A1 | 3/2022 | Krishnan et al. |
| 2022/0093094 A1 | 3/2022 | Krishnan et al. |
| 2022/0093101 A1 | 3/2022 | Krishnan et al. |
| 2023/0036042 A1* | 2/2023 | Niioka .............. G06F 3/04842 |
| 2023/0094522 A1* | 3/2023 | Stauber .............. G06F 3/165 715/719 |

FOREIGN PATENT DOCUMENTS

| | | |
|---|---|---|
| WO | 2019138651 A1 | 7/2019 |
| WO | 2021188266 A1 | 9/2021 |
| WO | 2023049418 A2 | 3/2023 |

OTHER PUBLICATIONS

Oleg Akhtiamov, et al. 2017. Are you Addressing Me: Multimodal Addressee Detection in Human-Human-Computer Conversations. In Speech and Computer, SPECOM 2017, Lecture Notes in Computer Science, vol. 10458, pp. 152-161, Springer, Cham. Retrieved from https://doi.org/10.1007/978-3-319-66429-3_14.

Francois Chollet. 2017. Xception: Deep Learning with Depthwise Separable Convolutions. In 2017 IEEE Conference on Computer Vision and Pattern Recognition (CVPR), pp. 1800-1807, Retrieved from https://arxiv.org/abs/1610.0235.

Gourav Datta, et al. 2022. ASD-transformer: Efficient active speaker detection using self and multimodal transformers. In ICASSP 2022—2022 IEEE International Conference on Acoustics, Speech and Signal Processing (ICASSP), pp. 4568-4571, Retrieved from https://www.amazon.science/publications/asd-transformer-efficient-active-speaker-detection-using-self-and-multimodal-transformers.

Jiankang Deng, et al. 2020. RetinaFace: Single-Shot Multi-Level Face Localisation in the Wild. In 2020 IEEE/CVF Conference on Computer Vision and Pattern Recognition (CVPR), pp. 5202-5211, Retrieved from https://openaccess.thecvf.com/content_CVPR_2020/papers/Deng_RetinaFace_Single-Shot_Multi-Level_Face_Localisation_in_the_Wild_CVPR_2020_paper.pdf.

Mihail Eric, et al. 2020. MultiWOZ 2.1: A Consolidated Multi-Domain Dialogue Dataset with State Corrections and State Tracking Baselines. In Proceedings of the Twelfth Language Resources and Evaluation Conference, pp. 422-428, Retrieved from https://aclanthology.org/2020.lrec-1.53.

Lifeng Fan, et al. 2019. Understanding Human Gaze Communication by Spatio-Temporal Graph Reasoning. In IEEE International Conference on Computer Vision (ICCV), pp. 5724-5733, Retrieved from https://arxiv.org/abs/1909.02144v1.

(56) References Cited

OTHER PUBLICATIONS

Vineet Garg, et al. 2022. Device-Directed Speech Detection: Regularization via Distillation for Weakly-Supervised Models. In Interspeech 2022, pp. 1258-1262, https://www.isca-speech.org/archive/pdfs/interspeech_2022/garg22_interspeech.

Kellen Gillespie, et al. 2020. Improving Device Directedness Classification Of Utterances With Semantic Lexical Features. In IEEE ICASSP 2020 Virtual Conference May 2020, pp. 7859-7863, Retrieved from https://arxiv.org/abs/2010.01949v1.

Kristen Grauman, et al. 2022. Ego4D: Around the World in 3,000 Hours of Egocentric Video. In Proceedings of the IEEE/CVF Conference on Computer Vision and Pattern Recognition (CVPR), 2022, pp. 18995-19012, Retrieved from https://arxiv.org/abs/2110.07058v3.

Jianzhu Guo, et al. 2020. Towards Fast, Accurate and Stable 3D Dense Face Alignment. In Computer Vision—ECCV 2020. ECCV 2020. Lecture Notes in Computer Science, vol. 12364, pp. 152-168 pages, Retrieved from https://www.ecva.net/papers/eccv_2020/papers_ECCV/papers/123640154.pdf.

Che-Wei Huang, et al. 2019. A Study for Improving Device-Directed Speech Detection toward Frictionless Human-Machine Interaction. In Interspeech 2019, pp. 3342-3346, Retrieved from https://www.isca-speech.org/archive/pdfs/interspeech_2019/huang19i_interspeech.pdf.

Kazunori Komatani, et al. 2021. Multimodal Dialogue Data Collection and Analysis of Annotation Disagreement. In Increasing Naturalness and Flexibility in Spoken Dialogue Interaction, Lecture Notes in Electrical Engineering vol. 714, pp. 201-213, Springer. Retrieved from https://doi.org/10.1007/978-981-15-9323-9_17.

Alina Kuznetsova, et al. 2020. The Open Images Dataset V4: Unified image classification, object detection, and visual relationship detection as scale. In International Journal of Computer Vision, vol. 128, pp. 1956-1981, Retrieved from https://arxiv.org/abs/1811.00982v2.

Thao Le Minh, et al. 2018. Deep Learning Based Multi-modal Addressee Recognition in Visual Scenes with Utterances. In Proceedings of the Twenty-Seventh International Joint Conference on Artificial Intelligence (IJCAI-18), pp. 1546-1553, https://www.ijcai.org/proceedings/2018/0214.pdf.

Sri Harish Mallidi, et al. 2018. Device-directed Utterance Detection. In Interspeech 2018, pp. 1225-1228, Retrieved from https://arxiv.org/abs/1808.02504.

Joseph Roth, et al. 2020. Ava Active Speaker: An Audio-Visual Dataset for Active Speaker Detection. In ICASSP 2020- 2020 IEEE International Conference on Acoustics, Speech and Signal Processing (ICASSP), pp. 4492-4496, Retrieved from https://arxiv.org/abs/1901.01342v2.

Mark Sandler, et al. 2018. MobileNetV2: Inverted Residuals and Linear Bottlenecks. In 2018 IEEE/CVF Conference on Computer Vision and Pattern Recognition (CVPR), pp. 4510-4520. Retrieved from https://arxiv.org/abs/1801.04381v4.

Kalin Stefanov, et al. 2016. A Multi-party Multi-modal Dataset for Focus of Visual Attention in Human-human and Human-robot Interaction. In Proceedings of the Tenth International Conference on Language Resources and Evaluation (LREC'16), pp. 4440-4444, Retrieved from https://aclanthology.org/L16-1703.

Timothy Tsai, et al. 2015. Multimodal addressee detection in multiparty dialogue systems. In 2015 IEEE International Conference on Acoustics, Speech and Signal Processing (ICASSP), pp. 2314-2318, Retrieved from https://www.microsoft.com/en-us/research/wp-content/uploads/2016/02/addressee_conf.pdf.

Xiangyu Zhu, et al. 2016. Face Alignment Across Large Poses: A 3D Solution. In 2016 IEEE Conference on Computer Vision and Pattern Recognition (CVPR), pp. 146-155, Retrieved from https://arxiv.org/abs/1511.07212v1.

International Preliminary Report on Patentability mailed on Mar. 30, 2023 for International Patent Application No. PCT/US2021/050645.

International Search Report and Written Opinion mailed on Mar. 9, 2022 for International Patent Application No. PCT/US2021/050645.

Invitation to Pay Additional Fees and, Where Applicable, Protest Fee mailed on Dec. 10, 2021 for International Patent Application No. PCT/US2021/050645.

U.S. Final Office Action mailed on Feb. 16, 2023 for U.S. Appl. No. 17/112,520.

U.S. Non-Final Office Action mailed on Mar. 30, 2023 for U.S. Appl. No. 17/112,512.

U.S. Non-Final Office Action mailed on Nov. 3, 2022 for U.S. Appl. No. 17/112,520.

U.S. Non-Final Office Action mailed on Oct. 26, 2022 for U.S. Appl. No. 17/112,227.

International Search Report and Written Opinion mailed Sep. 12, 2024 for International Patent Application No. PCT/US2024/033204, filed Jun. 10, 2024.

\* cited by examiner

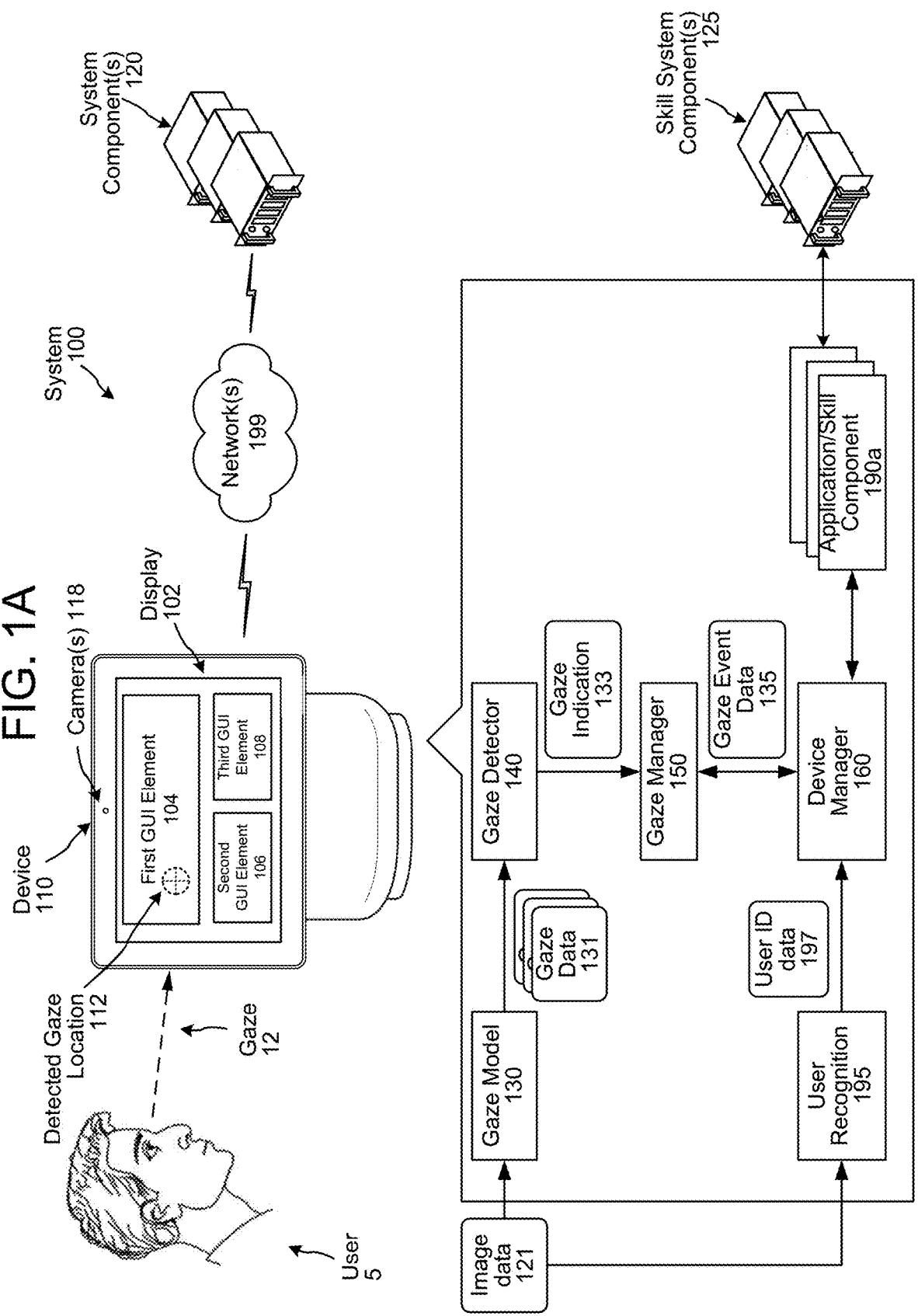

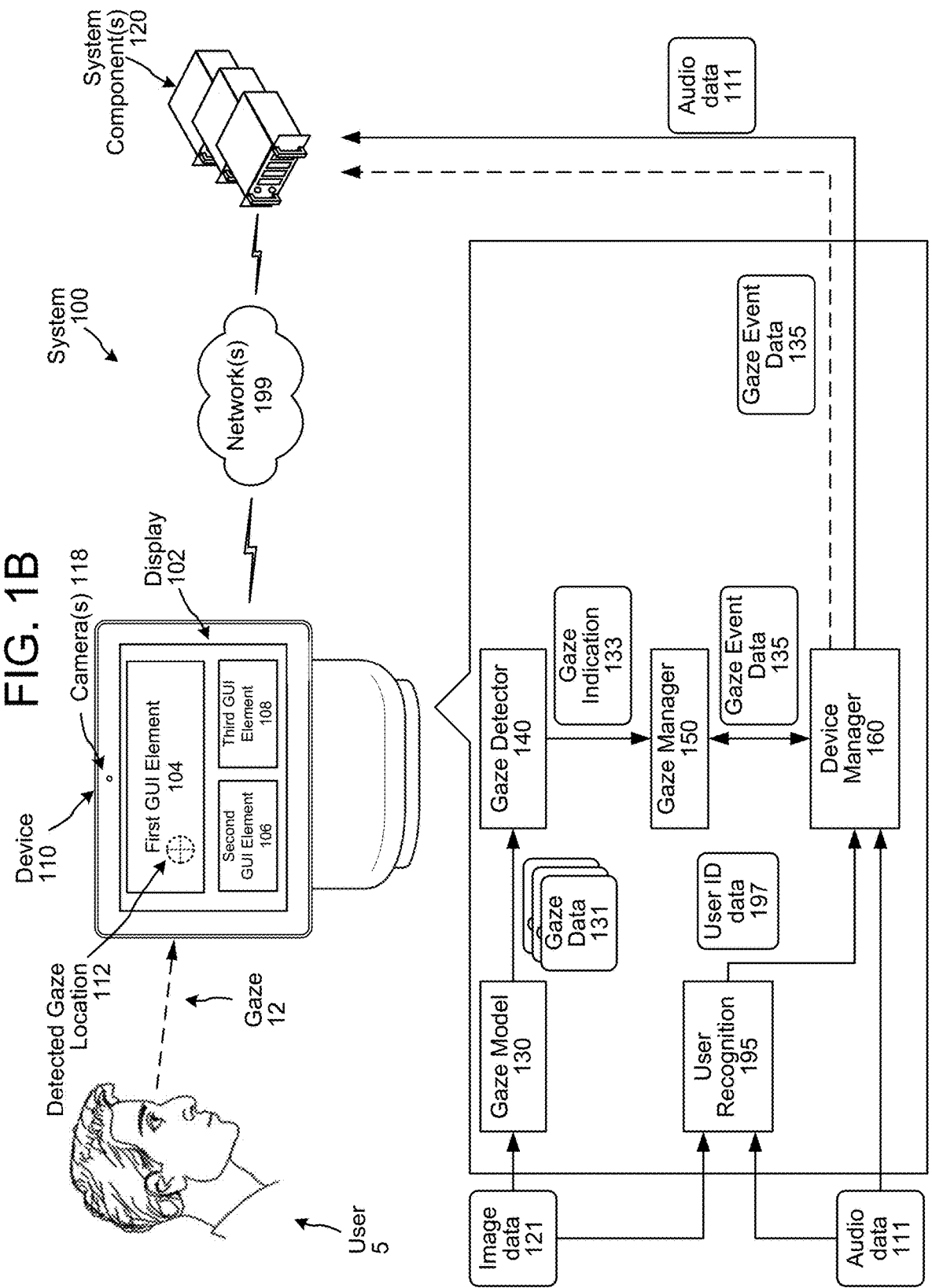

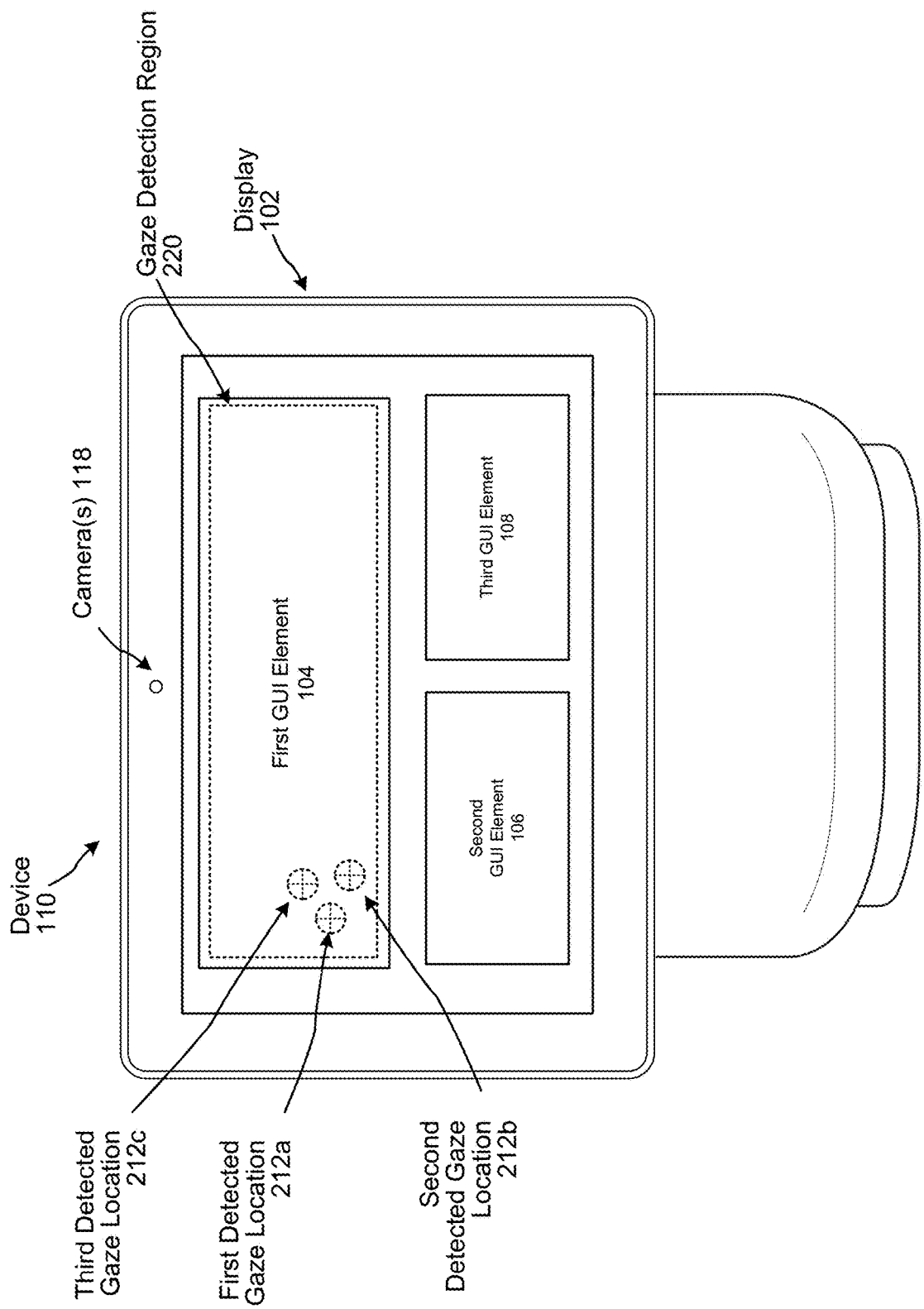

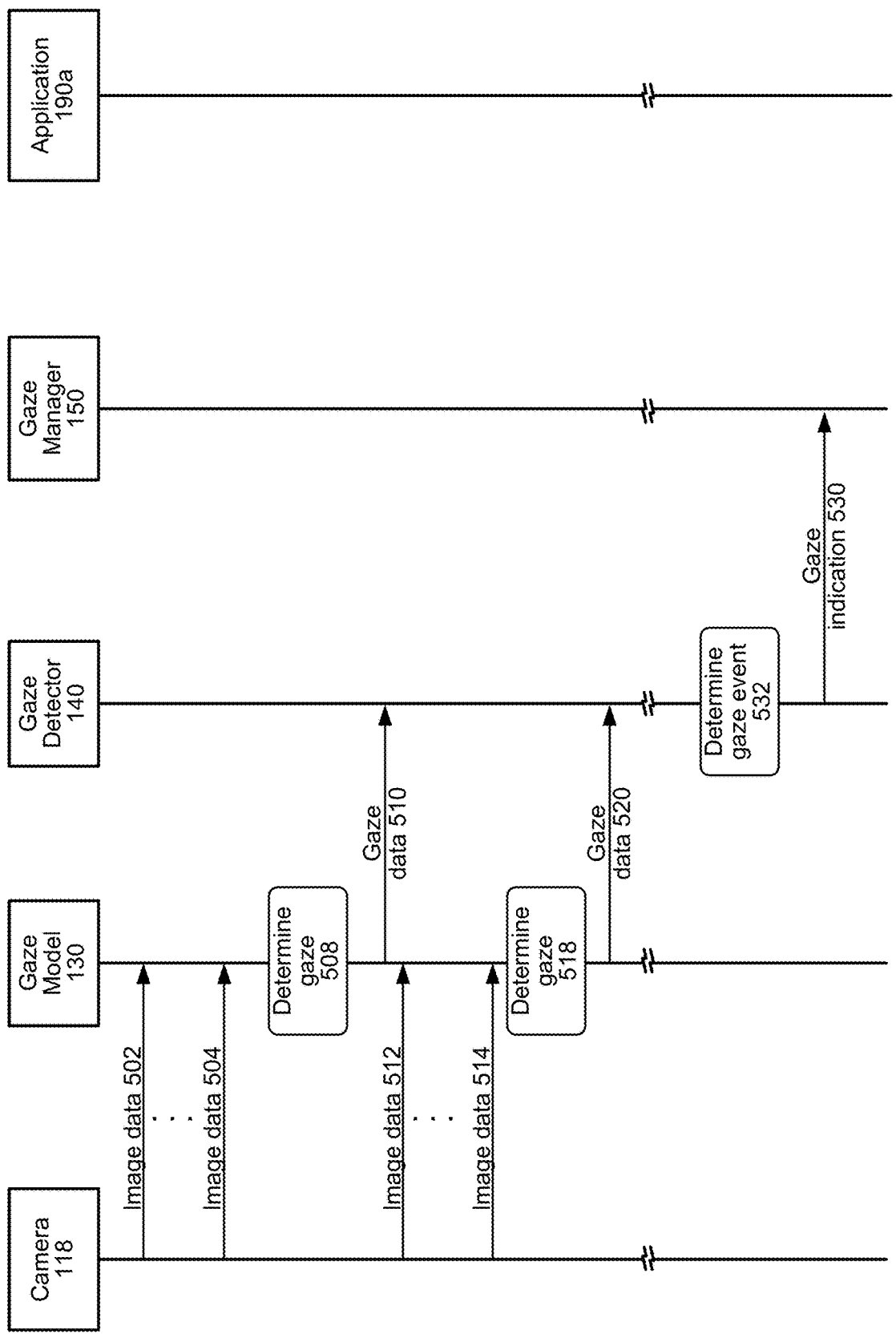

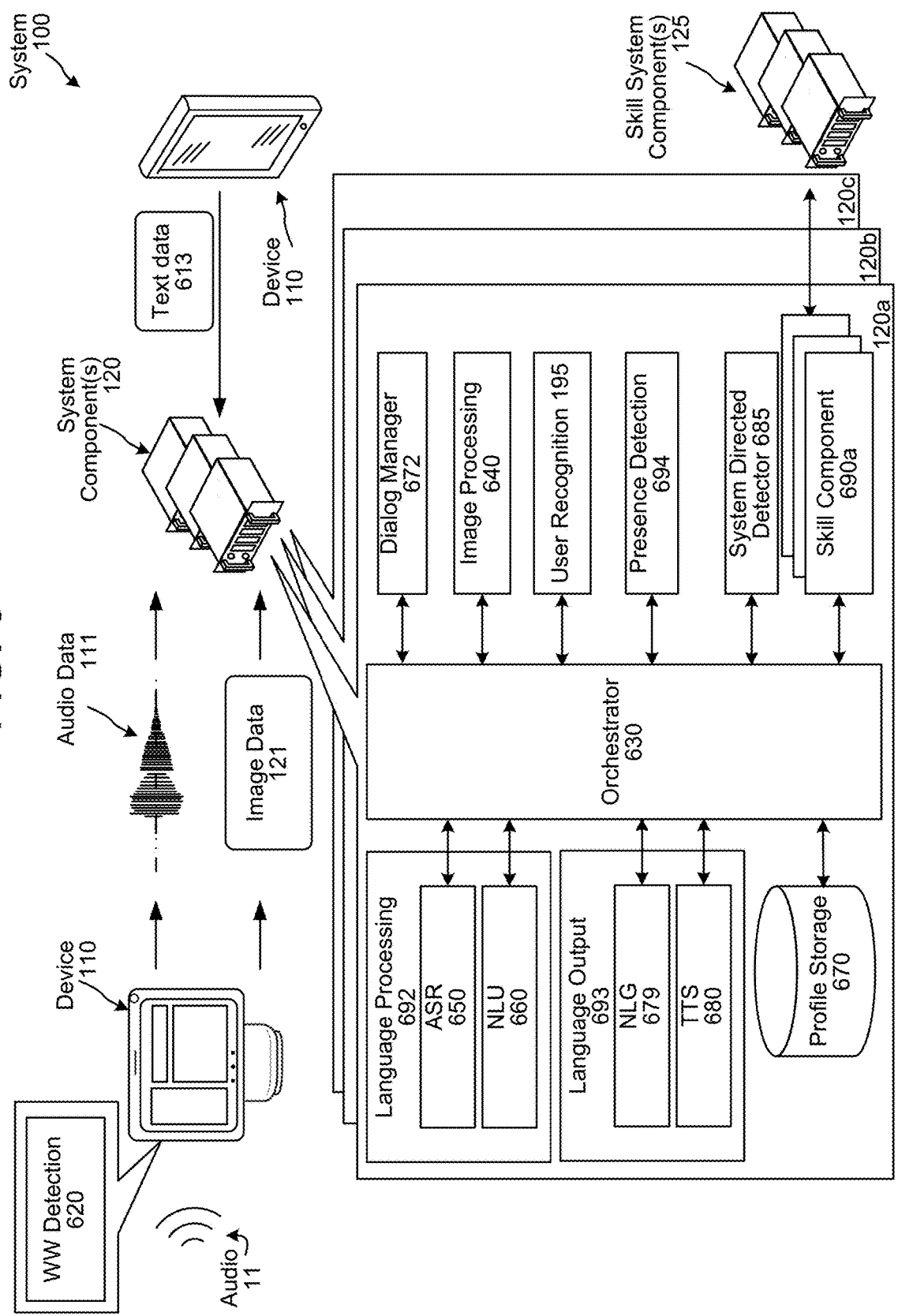

FIG. 16A
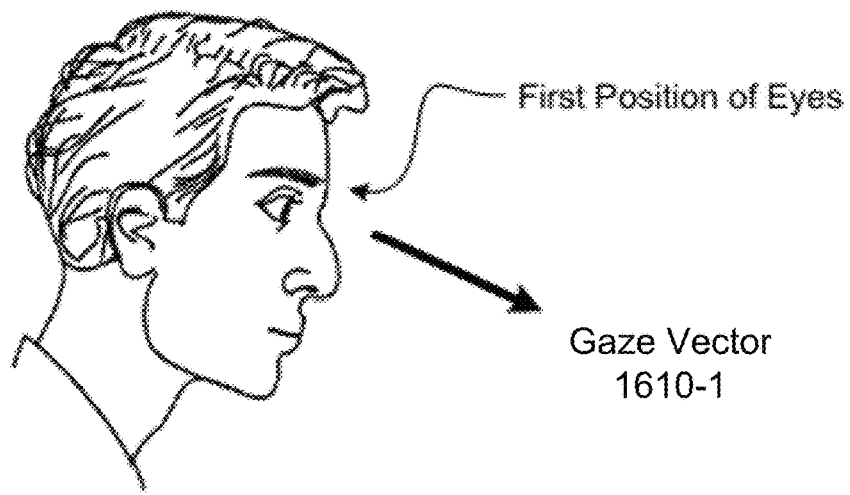
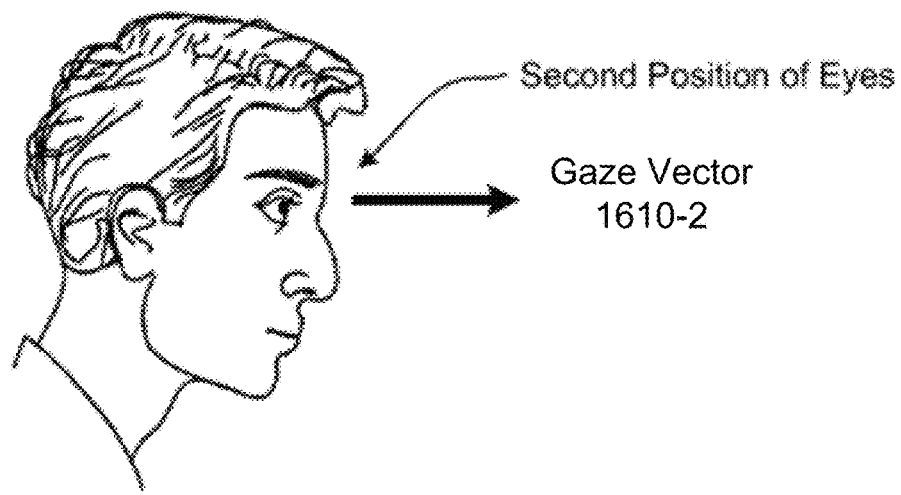

FIG. 16B
Example 1602-1
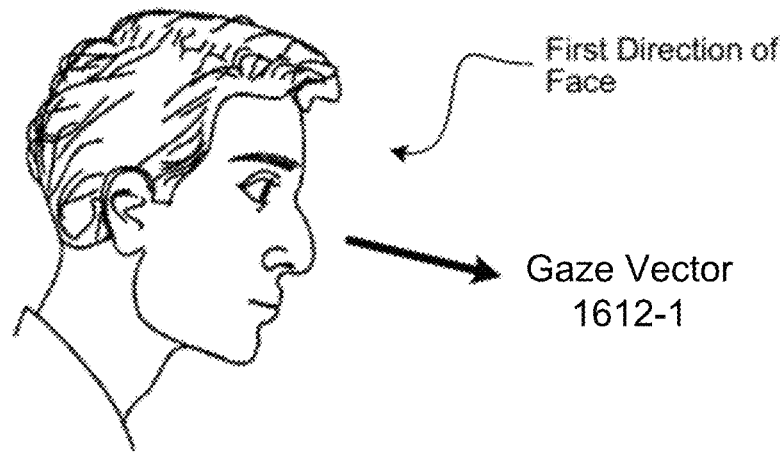
Example 1602-2
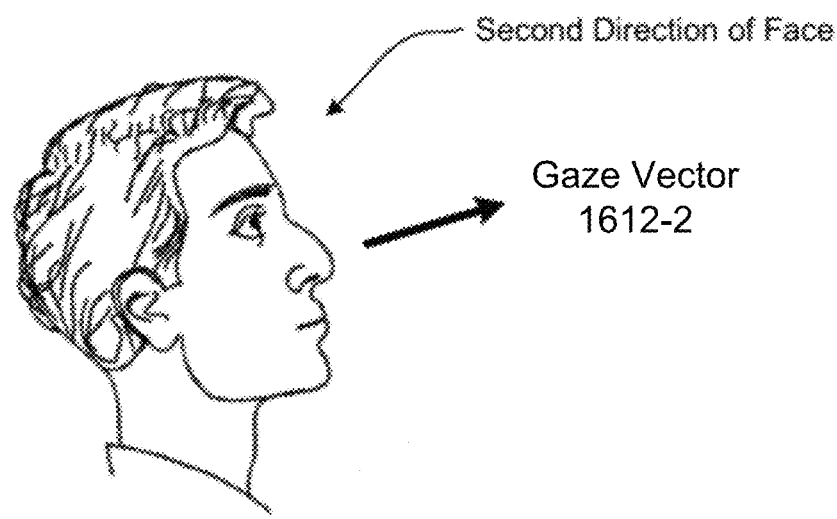

GAZE INITIATED ACTIONS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating a system for detecting and acting upon a user gaze, according to embodiments of the present disclosure.

FIG. 2 illustrates determining a user gaze event using different user gaze locations, according to embodiments of the present disclosure.

FIGS. 5A-5B illustrate data exchange among system components to determine a user gaze event, according to embodiments of the present disclosure.

FIG. 6 is a conceptual diagram of components of the system, according to embodiments of the present disclosure.

FIGS. 16A-16C illustrate examples of gaze tracking according to embodiments of the present disclosure.

DETAILED DESCRIPTION

Figure 3A:
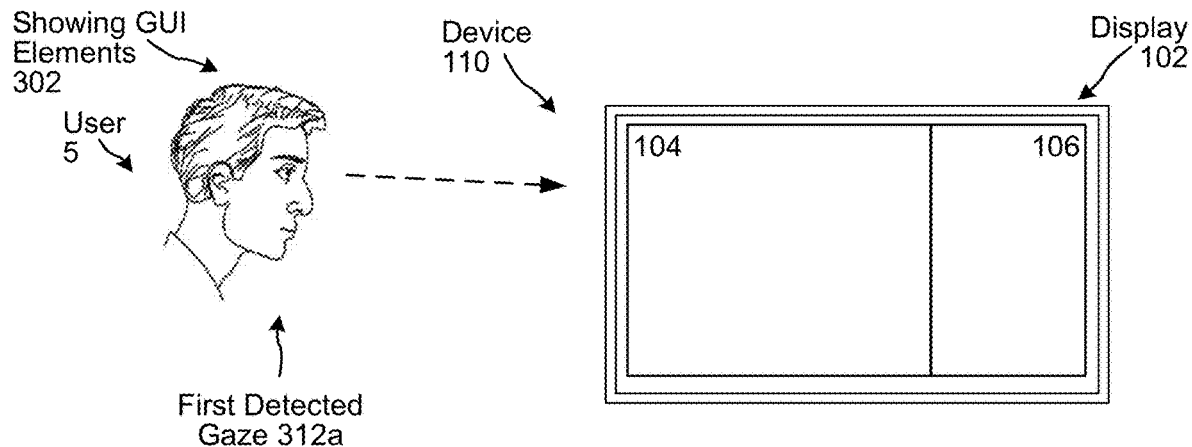
FIGS. 3A-3C illustrate executing an auto-play action as well as intermediate actions in response to a user gaze event, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system. Various other capabilities and components may be configured to enable other system capabilities. For example, a system may be configured to perform computer vision to detect and/or identify objects in image data. A system may also be configured to perform user identification to enable operations customized for an operating user. A system may also allow a user to select content for display as well as enable delivery of that content through applications, skills, and supporting components, which may be connected together over one or more computer networks. Descriptions for such operations are further provided below.

Virtual assistant systems can be configured to respond to spoken commands. For example, in response to an utterance by a user, a virtual assistant system may perform ASR and NLU processing on audio data corresponding to the utterance to ascertain an intent of the user, may determine data responsive to the intent (for example, by invoking a skill/application), and may perform NLG and TTS processing to generate an audible response to the utterance. When the determined intent relates to the taking of an action (e.g., playing music, video, or other content), the virtual assistant system may further generate instructions to cause one or more components (e.g., obtaining data underlying that content from a source device and causing an output device to playback the data) to take the action. As a more detailed example, the user may utter "Alexa, play my morning news," and, in response, the system may begin streaming audio or video from a source device to the user's device for playback.

To process and respond to audio initiated commands the system may include user devices configured with audio components such as microphones, loudspeakers, etc. To enhance system capabilities user devices may also be configured with video and image components such as cameras, display screens, etc. which can be used to capture more information about a user's environment (using the cameras) as well as provide visual output information to the user (using the displays). Offered are techniques and components to process data from these components to allow a user to interact with a system in a way that supplements, or in some ways may replace, the spoken, touch, or remote control initiated commands. Specifically, one or more devices located in an environment of a user may be configured to detect a user's gaze, that is where a user is looking. The system may be configured to determine that a user is gazing at a display screen and/or, depending on system capabilities, where on the display screen a user is directing her gaze. The system can further identify what information is being presented on the display screen at the point of the gaze location and can take one or more actions in response to the user's gaze being directed at that specific information. The system may also take into consideration whether any of the content being presented is able to auto-play a video (with or without sound) in response to the user's gaze being directed to the display for a threshold amount of time. For example, if a display screen is showing three graphical user interface (GUI) elements, and one corresponds to a video clip available for the user's viewing, and the user looks at the screen for a long enough amount of time, the system may determine to auto-play the video clip, possibly without sound (unless asked for sound) and without the user having to speak a command (or touch the screen, touch a button on a remote control, etc.). As another example, if a display screen is showing three graphical user interface (GUI) elements, each corresponding to a different video clip available for the user's viewing, and the user looks at the one she wishes to watch for a long enough amount of time, the system may determine where on the display the user is gazing, identify which video clip goes with that gaze location on the display, and, in response to the user holding her gaze at that location, may being playing the subject video clip, without the user having to speak a command (or touch the screen etc.) to play the video.

The system may take a variety of actions in response to a user gaze. If the user is gazing at an item associated with a shopping application the system may present more information about the item and/or, if the user gazes at the item long enough, add it to a virtual shopping cart. If the user is gazing at a list of items (such as songs, products, etc.) near the top or bottom of the list, the system may automatically scroll to the next portion of the list. If the user is speaking a command while gazing at a device, the system may use information about the user's gaze to interpret the user's spoken command (e.g., "Alexa, send that one to my mom"). The system may create gaze event data that associates a particular gaze with an application that was providing the underlying information and/or the information that was displayed as well as other information such as the user identity, the time of the gaze, the duration of the gaze, what other information was being shown on the display at the time of the gaze, the sentiment of the user at the time of the gaze, what other users may have been in the room at the time of the gaze, etc., depending on user preferences and system configuration.

Gaze event data may be used locally by a device (for example, the device that has the display, microphone, camera, etc.) and/or may be sent to another device, such as a cloud system or the like, for aggregation and operation, again depending on user preferences and system configuration.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. In particular, the system may require a user to opt-in to performing auto-play of content or taking other gaze-initiated actions. Such a requirement may avoid the system taking actions that a user may deem obtrusive or undesired. The system may also be configured to display content based on a user's identity such that certain content may be displayed for one user while different content may be displayed for a different user. The system may take into account different information for each user when doing so, for example considering individual user preferences/settings, affinities, profile information, age, etc.

FIGS. 1A-1B are conceptual diagrams illustrating a virtual assistant system 100. The system 100 may be configured to perform gaze detection and related processing as well as natural language processing, according to embodiments of the present disclosure. As shown in FIG. 1A, the virtual assistant/natural language command processing system 100 may include a device 110 local to a user 5 as well as one or more system component(s) 120 (e.g., components that can execute various functions of the system 100) connected across one or more networks 199. The system component(s) 120 may include a remote system such as a group of computing components located geographically remote from device 110 but accessible via network 199 (for example, cloud servers accessible via the internet). The system component(s) 120 may also include remote system component(s) that are physically separate from device 110 but located geographically close to device 110 and accessible via network 199 (for example a home server located in a same residence as device 110). System component(s) may also include some combination thereof, for example where certain components/operations are performed via a home server(s) and others are performed via geographically remote server(s)/computing component(s).

The device 110 may include image input and output components such as one or more camera(s) 118 and one or more display(s) 102. And though not shown in FIG. 1A, the device 110 may also include one or more audio input and output components such as one or more microphone(s) 1920 and one or more loudspeaker(s) 1912, discussed below. Examples of various devices 110 are further illustrated in FIG. 21.

Although the figures and discussion of the present disclosure illustrate certain steps in a particular order, the steps described may be performed in a different order (as well as certain steps removed or added) without departing from the present disclosure. Further, although the figures and discussion of the present disclosure illustrate certain components/ functionality being located/executed by a particular device, such components/functionality may be spread across multiple device(s) 110 and/or system component(s) 120 depending on system configuration. For example, gaze detection may be based on image data captured from multiple device(s) in a user environment and gaze event data may be used may various device(s) to perform various actions.

As shown in FIG. 1A, a user 5 may interact with a device 110. The device 110 may present on its display 102 a number of GUI elements such as first GUI element 104, second GUI element 106, and third GUI element 108. As can be appreciated, the number/configuration of such GUI elements is variable depending on system operation. The first GUI element 104 may be associated with a particular first application/skill. That is the first GUI element 104 may be displaying information related to that first application. For example, for a music application the first GUI element 104 may display a song list, particular music video, information about a musical artist, etc. depending on the information provided to the device 110 by the first application. Similarly, the second GUI element 106 may be associated with, and display information related to, a second application and the third GUI element 108 may be associated with, and display information related to, a third application. A component of the device 110, such as the device manager 160, may obtain the information for the various GUI elements and may coordinate their presentation with display 102. The specific information/GUI elements displayed may be based on an identify/profile information for user 5. For example, the device manager 160 may receive user identification data 197 (discussed below) and may obtain user profile information for the identified user (discussed below). The user profile information may indicate home screen (or other) preference information such that GUI elements for certain applications 190 should be shown on display 102 for that particular user 5. (If the device 110 detects that the user 5 has left the environment of the device and a new user is detected, the device 110 may obtain profile information for the new user and re-configure the display 102 accordingly.)

The user 5 may be looking at the display 102. The user's gaze may be directed at a particular location of the display 102, as represented by gaze 12. The camera(s) 118 captures image data 121 which is sent to a gaze model 130. The gaze model 130 processes the image data 121 to determine a detected gaze location 112. Determination of the gaze location 112 by gaze model 130 may be performed in a manner as described herein below in reference to FIGS. 14-16C, or using other techniques. Depending on device capability detected gaze location 112 may be sufficiently precise to indicate a region of the display 102 at which the gaze is detected (such as shown in FIG. 1A) and/or the detected gaze location 112 may be general such as a determination that the gaze is directed generally at display 102. The gaze model 130 may determine gaze data 131. The gaze data 131 may indicate a time of the gaze and a location of the gaze. The gaze model 130 may perform such processing on multiple instances of image data 121 as it is received, for example on multiple image frames captured by the camera 118. The gaze model 130 may send the gaze data 131 to the gaze detector 140. The gaze detector 140 may process the instances of gaze data 131 to determine if a gaze event occurs. A gaze event is one where the system 100 has determined that the user has actually looked at a particular location/region of the display 102 for a sufficient period of time to consider it an actual gaze, rather than a more fleeting instance of the user looking across the display 102. A gaze event may be short in duration and may be triggered after even a second or less of gaze time, depending on system configuration. When a gaze event is detected, the gaze detector 140 may send a gaze indication 133 to the gaze manager 150. The gaze indication 133 may indicate a time of the gaze, a duration of the gaze, and a location/region on the display 102 of the gaze.

The gaze manager 150 may receive the gaze indication 133 as well as other information about operation of the device 110. For example, the gaze manager 150 may have information regarding which GUI elements are being shown on the display, where such GUI elements are positioned on the display, as well as the underlying applications that correspond to the GUI elements. Such information may be provided by the device manager 160, the application/skill component(s) 190 or otherwise.

The device manager 160 may include one or more components to manage/control operations of device 110. Such components may include an operating system (OS), display manager, application manager, etc. For example, the device manager 160 may communicate with/control application(s)/skill(s) 190. Application(s)/skill(s) 190 may include software/other components configured to operate with regard to device 110. Many different application(s)/skill(s) 190 may operate on device 110. Such application(s)/skill(s) 190 may take input from various components of device 110 such as a keyboard, mouse, touch screen, voice input, etc. Examples of application(s)/skill(s) 190 may include application(s)/skill(s) 190 for playing games, playing videos, playing music, shopping, news, weather, etc. as further explained herein. While the term skill may be used with regard to software that involves a voice user interface (VUI) and may be interacted with using spoken commands/audio output, the software operating with regard to device 110 may operate with or without interaction with a VUI depending on system configuration, hence the illustration of such software as application(s)/skill(s) 190. Particular application(s)/skill(s) 190 may also be associated with skill system component(s) 125 which may be support components for respective application(s)/skill(s) 190 and may provide content, processing, etc. for the respective application(s)/skill(s) 190. For example, a video skill system component 125a may provide video content for a video application/skill 190a while a music skill system component 125b may provide video content for a music application/skill 190b, etc. Further details regarding application(s)/skill(s) 190/skill system component(s) 125 are discussed below.

To assist in perform gaze-initiated actions, the gaze manager 150/device manager 160 may also have access to other information. For example, a user recognition component 195 may have determined a user ID/user profile of the user 5 who is interacting with the device. Such user recognition may be based on image data 121 and/or audio data 111 (shown in FIG. 1B). Operation of the user recognition component 195 is further discussed below in reference to FIG. 17. The user ID data 197 may be sent from the user recognition component 195 to the device manager 160 and potentially to the gaze manager 150. The gaze manager 150 may process the gaze indication 133 along with the user ID data 197 and other information available to the gaze manager 150 to determine gaze event data 135. Such processing may also be performed by device manager 160 depending on system configuration.

The gaze event data 135 may indicate that a gaze event occurred, how long the gaze event was, at what time the gaze event occurred, what application is associated with the detected gaze location 112, what information was being displayed at the detected gaze location 112, what other information was being shown on the display 102 at the time of the gaze (e.g., information related to second GUI element 106 and/or third GUI element 108), a user identifier (e.g., taken from user recognition data 197), how many other users were in the room (for example as detected by presence detection component 694 discussed below), identify information for those users (for example as determined by user recognition component 195), dialog status information related to the time of the gaze (for example as determined by dialog manager 772 discussed below), distance from the user 5 to the device 110 (for example as determined from a proximity sensor, image data 121, and/or detected by presence detection component 694 discussed below), or other information. The gaze event data 135 may also include confidence information/scores for the above, indicating the respective component's confidence in its processing.

For example, the gaze indication 133 may include confidence information as determined by the gaze detector 140. The gaze detector 140 may include one or more trained models to process gaze data 131 to determine when a gaze event occurred. Such model(s) may also output confidence information which may be processed by gaze manager 150 and/or included in gaze event data 135. Similarly, the gaze manager 150 may include one or more trained models to process gaze indication 133 to determine gaze event data 135. Such processing may also result in confidence information which may be output. Other confidence information (such as from user recognition component 195, presence detection component 694, dialog manager 772, etc.) may be included in gaze event data 135 depending on system configuration.

The gaze event data 135 may be sent to one or more downstream components for further operation. For example, the gaze event data 135 may be sent to one or more application(s)/skill(s) 190. For example, gaze event data 135 indicating that a gaze was held for a certain amount of time and the device was displaying a GUI element corresponding to auto-play content for a particular application, the gaze event data 135 may be sent to that particular application. In response to receipt of the gaze event data 135 the respective application 190*a* may obtain content (e.g., music data/video data that is configured to be auto-played) from the respective skill system component(s) 125*a*. The content data may be sent from the skill system component(s) 125*a* to the application 190*a* and then sent to display 102 for output (which may be managed by device manager 160 or some other component).

In another example, the gaze manager 150 and/or device manager 160 may track what GUI elements are being presented on display 102 and if a specific GUI element corresponds to auto-play content. If so, the gaze manager 150 and/or device manager 160 may determine a time threshold corresponding to a gaze duration sufficient to cause playback of the auto-play content. The gaze manager 150 and/or device manager 160 may receive the gaze event data 135 indicating that a user's gaze was directed at the display 102 for a sufficient time to satisfy the time threshold. The gaze manager 150 and/or device manager 160 may then indicate to the respective application 190*a* corresponding to the auto-play content to obtain and/or start playback of the auto-play content.

Various system settings/preference data may be used to perform auto-play operations. For example, as noted above the device 110 may use user preference information to determine which GUI element(s) may display indicators of content available for gaze-initiated auto-play. User preference information may also indicate gaze durations/thresholds to be used for auto-play. For example, a first user may be associated with user settings information where content should be auto-played in response to a gaze duration that satisfies a first threshold while a different second user may be associated with user settings information where content should be auto-played in response to a gaze duration that satisfies a second threshold different from the first threshold. Auto-play thresholds may also be based on the type of content to be presented. For example, news content may be auto-played in response to gaze duration that satisfies a first threshold while entertainment content may be auto-played in response to gaze duration that satisfies a second threshold different from the first threshold. Further, order of priority of auto-play information may be configurable and based on user settings, content type, etc. For example, if two GUI elements are displaying indicators of playable content, user profile/setting data may indicate the content that should be prioritized for the gazing user. Thus, if one GUI element is displaying an indicator of playable news content and another GUI element is displaying an indicator of playable entertainment content, the device may user setting data to determine which content to auto-play in response to a gaze event satisfying a certain time threshold.

The application(s)/skill(s) 190 and/or skill system component(s) 125 may perform other operations using gaze event data 135. For example, gaze event data 135 may be used to determine what information is appealing to the user to cause the user to gaze at the information, the circumstances surrounding such gaze events, etc.

In another example, depending on user preferences and/or system configuration, gaze event data 135 may be sent to one or more components of device 110 and/or to system component(s) 120. The gaze manager 150, device manager 160 and/or other component of device 110 (or system component(s) 120), may process the gaze indication 133 and/or gaze event data 135 to determine if the gaze event satisfies certain condition(s), for example, if a gaze event had a sufficient duration to cause another action to be executed. If an action is called for, the device 110/system component(s) 120 may cause the action to be executed. For example, if the gaze event is directed at a GUI element that corresponds to additional information, the device 110 may cause the additional information to be displayed in response to the gaze. When a gaze event ends (e.g., when the user looks away from a detected gaze location 112), the system 100 may also perform other operations such as stopping playback of content, changing the GUI elements shown on the display 102, or other actions.

As shown in FIG. 1B, the device 110 may also receive audio 11 corresponding to a spoken natural language input originating from the user 5. The device 110 may process audio following detection of a wakeword. The device 110 may generate audio data 111 corresponding to the audio, and may send the audio data to the system component(s) 120 for speech processing (and/or perform speech processing using components of device 110). The device 110 may send the audio data 111 to the system component(s) 120 via an application (not shown) that is installed on the device 110 and associated with the system component(s) 120. An example of such an application is the Amazon Alexa application that may be installed on a smart phone, tablet, or the like. In some implementations, the device 110 may receive text data 613 corresponding to a natural language input originating from the user 5, and send the text data to the system component(s) 120. Speech processing may then be performed by the device 110 and/or system component(s) 120 as described herein (for example as discussed in reference to FIGS. 6, 7, and 10-12). The device 110 may also receive output data from the system component(s), and generate a synthesized speech output.

The system 100 may use information about the gaze event to perform speech processing. For example, if the user 5 speaks a command such as "Alexa, show me the next one" the system may use the gaze event data 135 to interpret the user's utterance as relating to an application providing information to a GUI element the user is gazing at (e.g., a first application providing information for the first GUI element 104 corresponding to detected gaze location 112). The system 100 may also determine an item of information that was being shown using first GUI element 104 (for example using operations by gaze manager 150 and/or orchestrator 630 discussed below) and may then determine a next item for display/output to the user. Thus, speech processing of audio data 111 may be improved by further processing gaze event data 135.

FIG. 2 illustrates determining a user gaze event using different user gaze locations, according to embodiments of the present disclosure. As shown the device 110 may process incoming image data 121 to determine multiple different gaze locations. For example, one set of image data may be processed by gaze model 130 to determine the user's gaze is directed to a first detected gaze location 212a. Another set of image data may be processed by gaze model 130 to determine the user's gaze is directed to a second detected gaze location 212b. Still another set of image data may be processed by gaze model 130 to determine the user's gaze is directed to a third detected gaze location 212c, and so forth. As a user may not precisely gaze at the same spot at each moment, the device 110 may, for example using gaze detector 140 and/or gaze manager 150, determine that each such gaze location 212a, 212b, and 212c, correspond to a same gaze detection region 220. Individual gaze instances may be grouped together based on various factors such as time, distance, etc. For example, if the image data used to determine first detected gaze location 212a is only a certain number of image frames separated from the image data used to determine second detected gaze location 212b, the device 110 may process them in a manner to determine if they correspond to a particular gaze event. Further, if the distance on the display 102 between first detected gaze location 212a and second detected gaze location 212b is not far (e.g., within a same gaze detection region), the device 110 may process them in a manner to determine if they correspond to a particular gaze event.

The gaze detection region 220 may correspond to the borders of a GUI element, for example first GUI element 104. Or a gaze detection region may correspond to a section of a GUI element, such that a GUI element may correspond to multiple gaze detection regions depending on the GUI element and the potential actions that may be performed in response to a gaze event directed at a particular portion of a GUI element. Thus, the device 110 may determine that multiple gaze instances at different locations (e.g., gaze location 212a, 212b, and 212c) may correspond to a single gaze event directed at gaze detection region 220. Information reflecting that gaze event may be sent from gaze detector 140 to gaze manager 150 as part of the gaze indication 133.

Various actions may be executed depending on the gaze event, gazed at GUI element/information, underlying application, etc. Such actions may also depend on the duration of a gaze event, user ID of the gazing user, etc. As noted above, a device 110 may auto-play a video in response to a gaze event. However, execution of the auto-play may also be staged, with intervening actions, depending on gaze duration.

Figure 3B:
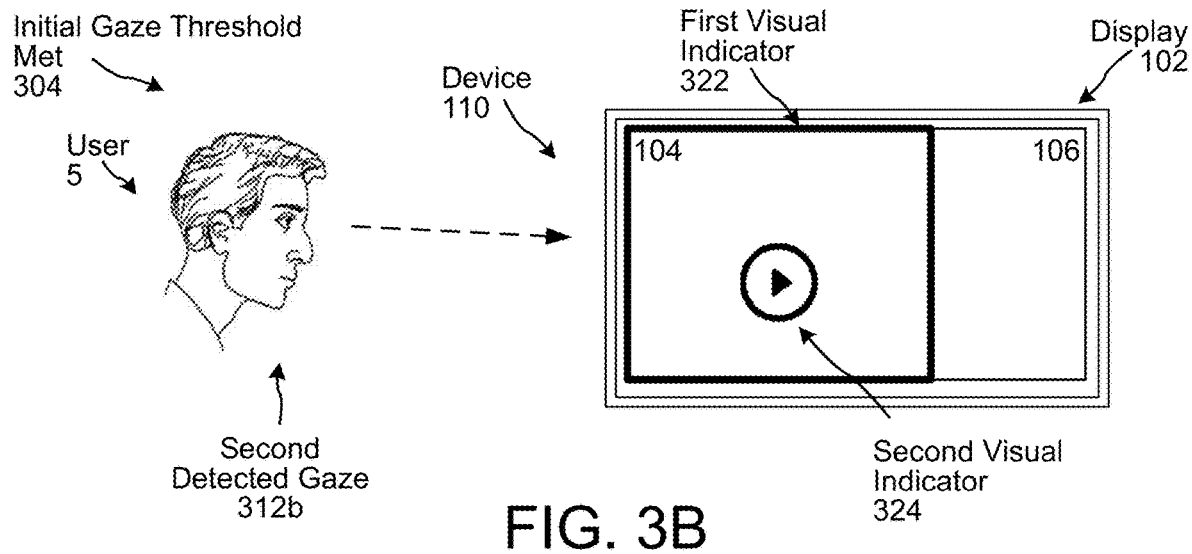
Figure 3C:
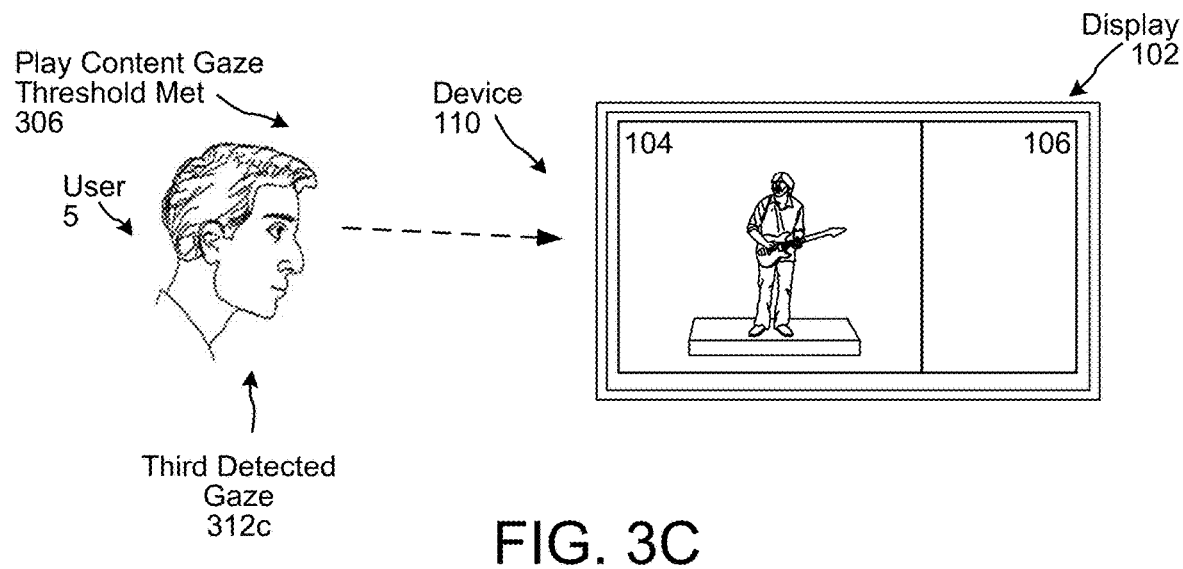

FIGS. 3A-3C illustrate executing an auto-play action as well as intermediate actions in response to a user gaze event, according to embodiments of the present disclosure. As shown in FIG. 3A, a device 110 (such as a television) may display a first GUI element 104 and a second GUI element on display 102 as shown in situation 302. The device 110 may process image data 121 to determine a first detected gaze 312a corresponding to the display 102. That is, the device 110, using components described herein, may receive image data 121 indicating that the user 5 is gazing at the display 102. The gaze manager 150/device manager 160 may determine that the first GUI element 104 corresponds to video content that may be auto-played in response to a sufficient gaze duration, such as a gaze duration that satisfies a first time threshold. The gaze manager 150/device manager 160 may also determine that intermediate actions may be performed in response to other, perhaps lesser, time thresholds.

For example, FIG. 3B illustrates a situation 304 where an initial gaze threshold is met. The initial gaze threshold may correspond to perform an action of outputting one or more visual indications of a gaze in response to a gaze duration satisfying the initial gaze threshold. As shown in FIG. 3B, a second detected gaze 312b also corresponds to the display 102. The device 110 (for example using gaze detector 140, gaze manager 150, device manager 160, etc. as described herein) may determine that the first gaze instance corresponding to the first detected gaze 312a may correspond to the second gaze instance corresponding to the second detected gaze 312b, for example due to the time between the gaze instances, etc. In response to the gaze event meeting the initial threshold the gaze manager 150/device manager 160 may control the display 102 to present a first visual indicator 322. For example, the first visual indicator 322 may correspond to a colored border surrounding the first GUI element 104. The border may change color or otherwise animate (e.g., through flashing, pulsing, or other animation) to indicate an active gaze. Such color of the border may also change as different gaze thresholds are met (for example starting at yellow and progressing to green or the like). In response to the gaze event meeting the initial threshold the gaze manager 150/device manager 160 may also control the display 102 to present a second visual indicator 324, which is illustrated as a play icon. The second visual indicator 324 may indicate that video content will be played if the device detects a maintained gaze at the display. The second visual indicator 324 may also change or animate to indicate a detected maintained gaze. The first visual indicator 322 and second visual indicator 324 may also animate or change to indicate a gaze away from the display 102 (such as a color change from green to yellow or the like) depending on system configuration.

If the user maintains her gaze at the display 102 (for example from first detected gaze 312a to second detected gaze 312b through third detected gaze 312c), the device 110 may determine that a play content gaze threshold is met as illustrated in situation 306 shown in FIG. 3C. In response to the play content gaze threshold being met, the gaze manager 150 may cause the device 110 to present video content using the video data corresponding to the video of first GUI element 104. In certain configurations, the auto-play may occur within the original borders of first GUI element 104. In other configurations, the first GUI element 104 may be enlarged to cover more of the display 102 (for example, in full screen mode) to allow easier viewing of the video content by user 5.

At some time between the time illustrated in FIG. 3A and FIG. 3C the gaze manager 150 may also perform other actions related to the eventual playback of the video. For example, upon the gaze meeting some intermediate threshold duration the device 110 may send a request for video data corresponding to the video content to a device associated with the first application associated with first GUI element 104 (e.g., 125*a* as discussed below). The device 110 may receive a portion of the video and store it in anticipation of reaching the play content duration threshold as discussed in relation to FIG. 3C. If such a duration threshold is never satisfied the device 110 may delete the portion of the video data. However if such a duration threshold is satisfied, the device 110 may present the video content starting with the stored first portion, thus reducing the latency for starting the video content once the gaze duration threshold is satisfied.

In another example, playback of the video content, such as that illustrated in FIG. 3C, may be image only, to avoid disrupting the audio environment of the user. That is, the initial playback of the video content may be without playback of the video's corresponding audio. The device 110 may add audio playback with the video in response to some further event, such as a spoken command by the user (e.g., "Alexa, audio on"), touch screen command (for example a touch input corresponding to the area of the display 102 corresponding to first GUI element 104), holding a gaze for an even longer period of time (to meet an even further time threshold), or the like.

Figure 4A:
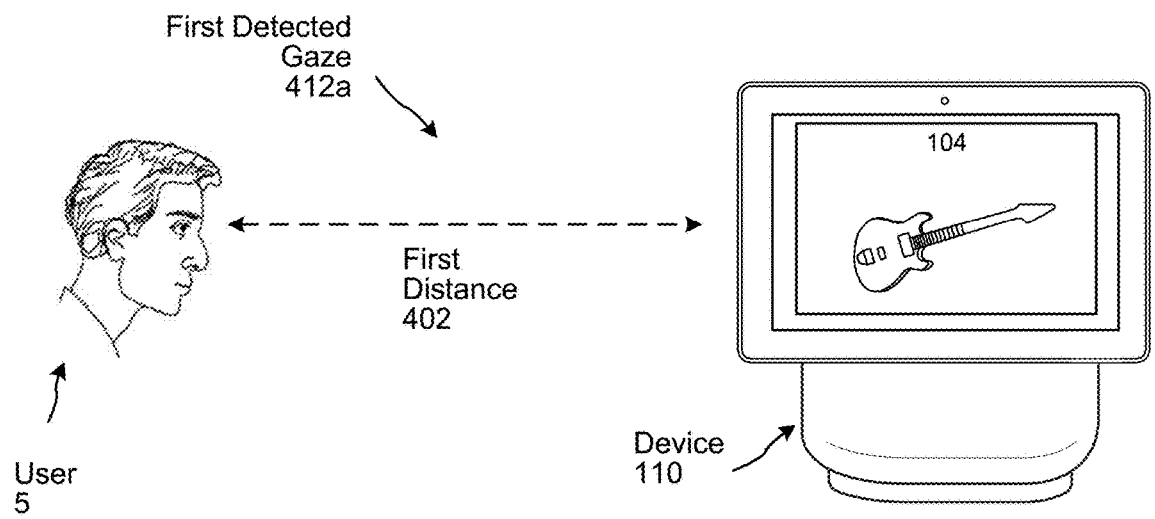
FIGS. 4A-4B illustrate displaying different information in response to a user gaze event and user distance from a device, according to embodiments of the present disclosure.
Figure 4B:
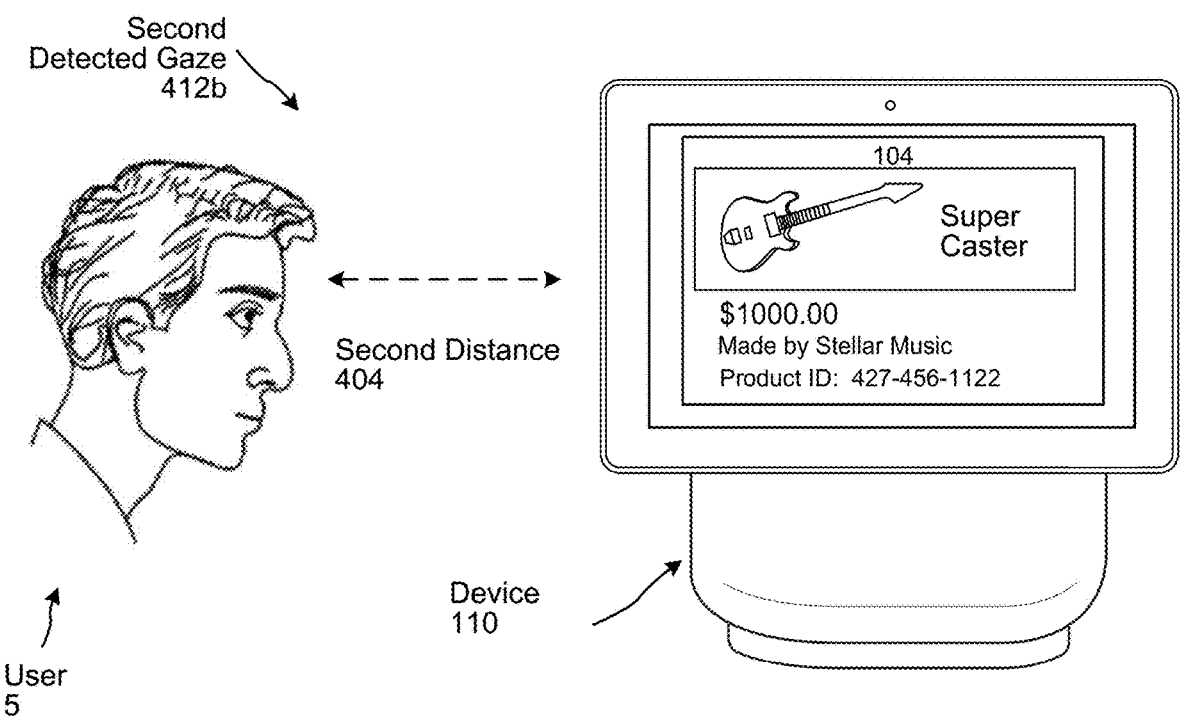

The system 100 may perform different actions using gaze event data and distance data. The system 100 may determine a distance from the user 5 to the device 110 (for example as determined from a proximity sensor, image data 121, and/or detected by presence detection component 694 discussed below). Such distance data may be used by gaze manager 150 and/or other component(s) to determine what information is presented by display 102. FIGS. 4A-4B illustrate displaying different information in response to a user gaze event and user distance from a device, according to embodiments of the present disclosure. For example, as shown in FIG. 4A, the system 100 may determine that a user 5 is at a first distance 402 from device 110 and that the user is gazing at a first GUI element 104 as indicated by the first detected gaze 412*a*. The device 110 may determine that the first distance 402 is such that the user 5 is unlikely to be able to read text on the display 102 so the gaze manager 150 may determine information related to the first GUI element 104 that is likely to be visible to the user 5 at the first distance 402, for example an image (such as the image of the guitar shown in FIG. 4A). As the user gets closer to the device, such as shown in FIG. 4B, the device 110 may determine that the user is still gazing at the first GUI element 104 (as indicated by second detected gaze 412*b*) when at the closer second distance 404 and thus the gaze manager 150 may control the display 102 to display additional information such as further information about the guitar in text, as shown in FIG. 4B.

The device 110 may be configured to alter information in this way based on the distance between the user 5 and the device 110. For example, at a larger distance the device 110 may display larger fonts while at a shorter distance the device 110 may display smaller fonts. The device 110 may also be able to detect gaze location and distance such that it can execute certain actions in response to the user changing the distance between the device 110. For example, if the device 110 is outputting content and the user is walking away from the device 110 but still maintaining her gaze location, the device 110 may increase output volume and/or zoom in on content as the user gets farther from the device. Similarly the device 110 may decrease output volume and/or zoom out on content as the user gets closer to the device. In another example, if the user looks away from the device 110 during content output, the device 110 may detect the change in gaze location and pause the content output. When the user returns her gaze to the device (e.g., to the region of first GUI element 104) the device may resume content playback.

The device 110 may also use other information to determine what action to perform. For example, if first GUI element 104 corresponds to a news feed application, the device 110 may determine an identity of user 5 (e.g., using user recognition component 195) and may request particular news feed content based on the gaze of the specific user 5. Thus, if the device 110 detects user A gazing at first GUI element 104 it may request news video content from a first source but if the device 110 detects user B gazing at first GUI element 104 it may request news video content from a second, different, source depending on user preferences/system configuration. The device 110 may also refrain from performing certain actions based on user ID. For example, if the user 5 is determined to be a child gazing at a news feed GUI, the device 110 may determine not to auto-play news content, even if a gaze has exceeded an auto-play duration.

Figure 5B:
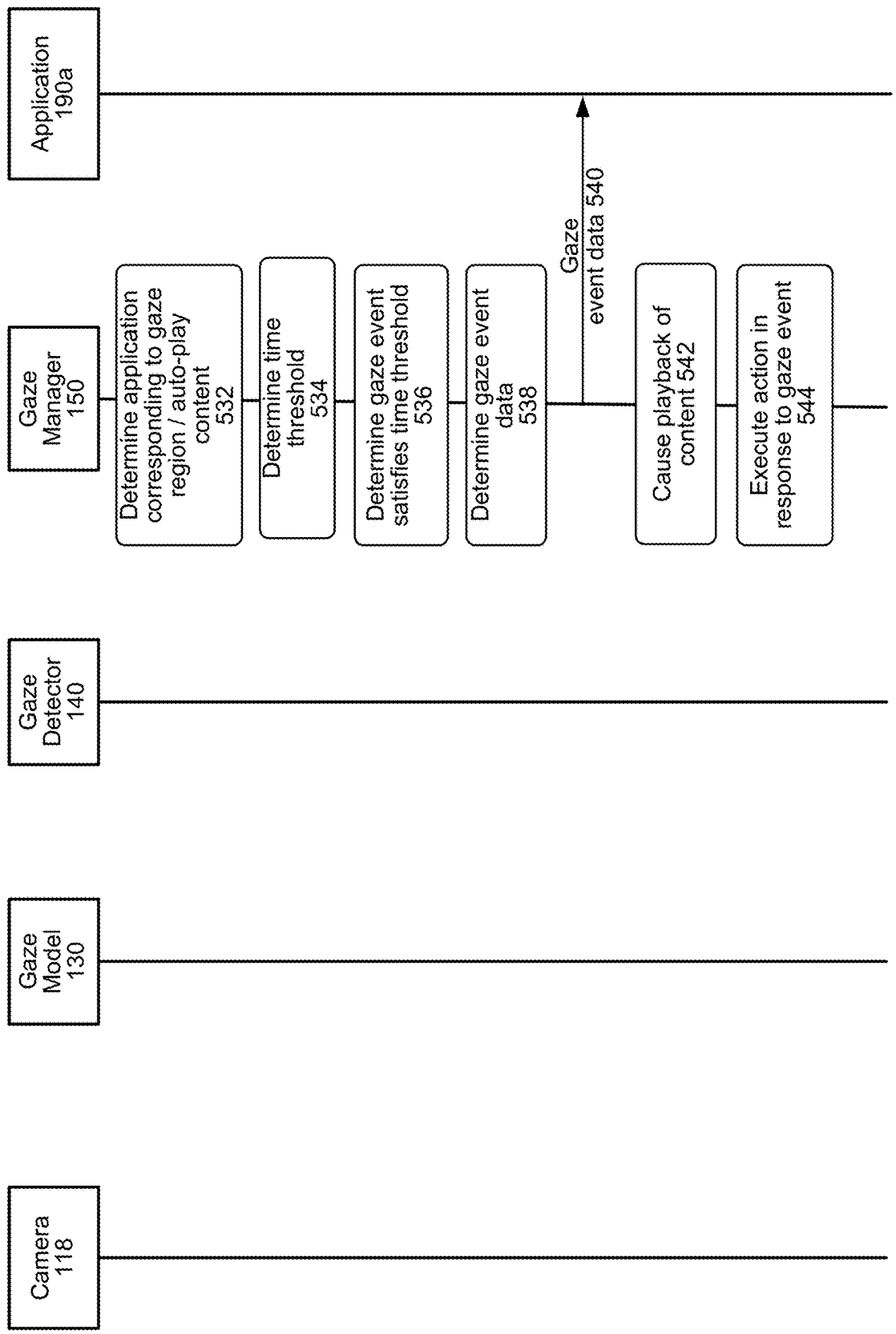

FIGS. 5A-5B illustrate data exchange among system components to determine a user gaze event, according to embodiments of the present disclosure. As shown in FIG. 5A one or more camera(s) 118 of device 110 capture image data. Image data may also be captured by camera(s) located on other devices showing the environment of device 110. The camera(s) 118 send the image data, for example as frames of image data 502, 504, etc. to gaze model 130. The gaze model 130 processes the image data to determine a user gaze instance 508. The gaze model 130 may then send (510) gaze data 131 to gaze detector 140. This process may continue as further image data is obtained. Thus camera(s) 118 may continue to send image data, for example as image data frames of image data 512, 514, etc. to gaze model 130. The gaze model 130 processes this image data as well to determine another user gaze instance 518. The gaze model 130 may then send (520) gaze data 131 corresponding to the second gaze instance to gaze detector 140. This process may continue as image data is made available and processed. The gaze model 130 processes the image data to determine gaze location in a manner as described herein below in reference to FIGS. 14-16C, or using other techniques. The gaze data 131 sent from the gaze model 130 to the gaze detector 140 may indicate the gaze location (e.g., location on the display 102 or just that the gaze is directed at the display 102) as well as other information such as a time of the gaze instance.

The gaze detector 140 may receive the gaze data and determine (532) a gaze event. For example, the gaze detector 140 may determine that certain gaze instance(s) correspond to a same region of display 102. The gaze detector 140 may also determine that certain gaze instance(s) are within a certain time of each other and thus correspond to a same gaze event. The gaze detector 140 may then send (530) information (e.g., gaze indication 133) about a detected gaze event to gaze manager 150. The gaze indication 133 may indicate the gaze location/region (e.g., location/region on the display) as well as other information such as a start time of the gaze event, duration of the gaze event, end time of the gaze event, location range of the gaze event (e.g., how much of an area of the display 102 is encompassed by the individual gaze instances of the gaze event), etc.

The gaze manager 150 may then process the gaze indication 133 as well as other information to determine gaze event data and/or execute an action in response to the gaze event. As shown in FIG. 5B, the gaze manager 150 may determine (532) an application/information corresponding to the gaze region and/or an application 190a corresponding to auto-play content. For example, the gaze manager 150 may determine what GUI element(s) are being shown on the display 102 and which GUI element being shown may correspond to auto-play content. The gaze manager 150 may also determine which application goes with that GUI element. The gaze manager 150 may determine (534) a time threshold corresponding to the auto-play content. The gaze manager 150 may then determine (536) if the gaze event satisfies one or more of the time thresholds. If so, the gaze manager 150 may send (540) gaze event data to the corresponding application 190a and cause (542) playback of content from application 190a in response to the gaze event.

In another example, the gaze manager 150 may take the information about the gaze region of the display 102 as indicated in the gaze indication 133 and may determine what GUI element(s) are being shown on the display 102 and which GUI element is being shown on the gaze region. The gaze manager 150 may also determine which application goes with that GUI element as well as what information is being shown on the display and whether it corresponds to a particular action that can be executed, list being displayed, supplemental information available, or the like. The gaze manager 150 may determine (534) a time threshold corresponding to one or more potentially executable actions. For example, if the GUI element corresponds to one or more potential actions, and each action corresponds to a certain time threshold for execution of the action, the gaze manager 150 may determine those thresholds. For example, a number of different thresholds may be possible (e.g., short, medium-short, medium, medium-long, long, etc.), and the gaze manager 150 may select one or more of them based on the action, application, or the like corresponding to the gazed-at GUI element/portion of the display 102.

The gaze manager 150 may then determine (536) if the gaze event satisfies one or more of the time thresholds. If so, the gaze manager 150 may execute (544) an action in response to the gaze event. In certain instances the gaze manager 150 may execute an action without processing with regard to time thresholds, depending on the action to be performed, system configuration, etc. Execution of an action may also depend on other information available to the gaze manager 150 such as user ID information, presence/distance information, information about other users, dialog status, etc.

The gaze manager 150 may then determine (538) gaze event data 135. Determination of the gaze event data 135 may be done after determination that the gaze event satisfies a certain time threshold or may be done without regard to a time threshold. The gaze event data 135 may indicate that a gaze event occurred, how long the gaze event was, at what time the gaze event occurred, what application is associated with the detected gaze location 112, what information was being displayed at the detected gaze location 112, what other information was being shown on the display 102 at the time of the gaze (e.g., information related to second GUI element 106 and/or third GUI element 108), a user identifier (e.g., taken from user recognition data 197), how many other users were in the room (for example as detected by presence detection component 694 discussed below), identify information for those users (for example as determined by user recognition component 195), dialog status information related to the time of the gaze (for example as determined by dialog manager 772 discussed below), distance from the user 5 to the device 110 (for example as determined from a proximity sensor, image data 121, and/or detected by presence detection component 694 discussed below), or other information. The gaze event data 135 may also include confidence information/scores for the above, indicating the respective component's confidence in its processing.

The gaze event data 135 may be stored by the device 110. The gaze event data 135 may also be sent (540) from the device 110 to application 190a and/or system component(s) 120 which may process/store/further process the gaze event data 135 depending on system configuration. For example, as discussed herein, the system 100 (e.g., using device 110 and/or system component(s) 120) may perform speech processing on audio data 111 using the gaze event data 135. The system 100 may also aggregate gaze event data 135 for data analysis, for example noting what GUI element(s) a user was paying attention to, ignoring, and under what circumstances, etc. In this way the system 100 may determine what content is more of interest to a user and thus may customize other system operations accordingly.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s). In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc. The device 110 may also capture images using camera(s) 118 of the device 110 and may send image data 121 representing those image(s) to the system component(s). The image data 121 may include raw image data or image data processed by the device 110 before sending to the system component(s). The image data 121 may be used in various manners by different components of the system to perform operations such as determining whether a user is directing an utterance to the system, interpreting a user command, responding to a user command, etc.

The wakeword detector 620 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 620 and/or input is detected by an input detector, the device 110 may "wake" and begin transmitting audio data 111, representing the audio 11, to the system component(s) 120. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detector 620 may result in sending audio data to system component(s)a for processing while detection of the wakeword "Computer" by the wakeword detector may result in sending audio data to system component(s)b for processing. The system may have a separate wakeword and system for different skills/systems (e.g., "Dungeon Master" for a game play skill/system component(s) c) and/or such skills/systems may be coordinated by one or more skill(s) 690 of one or more system component(s) 120.

The device 110 may also include a system directed input detector 785. (The system component(s) may also include a system directed input detector 685 which may operate in a manner similar to system directed input detector 785.) The system directed input detector 785 may be configured to determine whether an input to the system (for example speech, a gesture, etc.) is directed to the system or not directed to the system (for example directed to another user, etc.). The system directed input detector 785 may work in conjunction with the wakeword detector 620. If the system directed input detector 785 determines an input is directed to the system, the device 110 may "wake" and begin sending captured data for further processing (for example, processing audio data using the language processing 692/792, processing captured image data using image processing component 640/740 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input, and may output a green indicator if a system directed input is detected. Other such configurations are possible. Further details regarding the system directed input detector 785 are included below with regard to FIG. 8.

Upon receipt by the system component(s) 120, the audio data 111 may be sent to an orchestrator component 630. The orchestrator component 630 may include memory and logic that enables the orchestrator component 630 to transmit various pieces and forms of data to various components of the system, as well as perform other operations as described herein.

The orchestrator component 630 may send the audio data 111 to a language processing component 692. The language processing component 692 (sometimes also referred to as a spoken language understanding (SLU) component) includes an automatic speech recognition (ASR) component 650 and a natural language understanding (NLU) component 660. The ASR component 650 may transcribe the audio data 111 into text data. The text data output by the ASR component 650 represents one or more than one (e.g., in the form of an N-best list) ASR hypotheses representing speech represented in the audio data 111. The ASR component 650 interprets the speech in the audio data 111 based on a similarity between the audio data 111 and pre-established language models. For example, the ASR component 650 may compare the audio data 111 with models for sounds (e.g., acoustic units such as phonemes, senons, phones, etc.) and sequences of sounds to identify words that match the sequence of sounds of the speech represented in the audio data 111. The ASR component 650 sends the text data generated thereby to an NLU component 660, via, in some embodiments, the orchestrator component 630. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in greater detail below with regard to FIG. 10.

The speech processing system 692 may further include a NLU component 660. The NLU component 660 may receive the text data from the ASR component. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the device 110, the system component(s) 120, a skill component 690, a skill system component(s) 125, etc.) to execute the intent. For example, if the text data corresponds to "play the 5$^{th}$ Symphony by Beethoven," the NLU component 660 may determine an intent that the system output music and may identify "Beethoven" as an artist/composer and "5th Symphony" as the piece of music to be played. For further example, if the text data corresponds to "what is the weather," the NLU component 660 may determine an intent that the system output weather information associated with a geographic location of the device 110. In another example, if the text data corresponds to "turn off the lights," the NLU component 660 may determine an intent that the system turn off lights associated with the device 110 or the user 5. However, if the NLU component 660 is unable to resolve the entity—for example, because the entity is referred to by anaphora such as "this song" or "my next appointment"— the speech processing system 692 can send a decode request to another speech processing system 692 for information regarding the entity mention and/or other context related to the utterance. The speech processing system 692 may augment, correct, or base results data upon the audio data 111 as well as any data received from the other speech processing system 692.

The NLU component 660 may return NLU results data 1285/1225 (which may include tagged text data, indicators of intent, etc.) back to the orchestrator 630. The orchestrator 630 may forward the NLU results data to a skill component(s) 690. If the NLU results data includes a single NLU hypothesis, the NLU component 660 and the orchestrator component 630 may direct the NLU results data to the skill component(s) 690 associated with the NLU hypothesis. If the NLU results data 1285/1225 includes an N-best list of NLU hypotheses, the NLU component 660 and the orchestrator component 630 may direct the top scoring NLU hypothesis to a skill component(s) 690 associated with the top scoring NLU hypothesis. The system may also include a post-NLU ranker 665 which may incorporate other information to rank potential interpretations determined by the NLU component 660. The local device 110 may also include its own post-NLU ranker, which may operate similarly to the post-NLU ranker 665. The NLU component 660, post-NLU ranker 665 and other components are described in greater detail below with regard to FIGS. 11 and 12.

A skill component may be software running on the system component(s) 120 that is akin to a software application. That is, a skill component 690 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 690. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 690 may operate in conjunction between the system component(s) 120 and other devices, such as the device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

A skill system component(s) 125 may communicate with a skill component(s) 690 within the system component(s) 120 and/or directly with the orchestrator component 630 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 690 dedicated to interacting with the skill system component(s) 125. Unless expressly stated otherwise, reference to a skill, skill device, or skill component may include a skill component 690 operated by the system component(s) 120 and/or skill operated by the skill system component(s) 125. Moreover, the functionality described herein as a skill or skill may be referred to using many different terms, such as an action, bot, app, or the like. The skill 690 and or skill system component(s) 125 may return output data to the orchestrator 630.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 672 that manages and/or tracks a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 630 or other component. Depending on system configuration the dialog manager 672 may determine the appropriate system generated response to give to a particular utterance or user input of a turn. Or creation of the system generated response may be managed by another component of the system (e.g., the language output component 693, NLG 679, orchestrator 630, etc.) while the dialog manager 672 selects the appropriate responses. Alternatively, another component of the system component(s) 120 may select responses using techniques discussed herein. The text of a system generated response may be sent to a TTS component 680 for creation of audio data corresponding to the response. The audio data may then be sent to a user device (e.g., device 110) for ultimate output to the user. Alternatively (or in addition) a dialog response may be returned in text or some other form.

The dialog manager 672 may receive the ASR hypothesis/ hypotheses (i.e., text data) and make a semantic interpretation of the phrase(s) or statement(s) represented therein. That is, the dialog manager 672 determines one or more meanings associated with the phrase(s) or statement(s) represented in the text data based on words represented in the text data. The dialog manager 672 determines a goal corresponding to an action that a user desires be performed as well as pieces of the text data that allow a device (e.g., the device 110, the system component(s) 120, a skill 690, a skill system component(s) 125, etc.) to execute the intent. If, for example, the text data corresponds to "what is the weather," the dialog manager 672 may determine that that the system component(s) 120 is to output weather information associated with a geographic location of the device 110. In another example, if the text data corresponds to "turn off the lights," the dialog manager 672 may determine that the system component(s) 120 is to turn off lights associated with the device(s) 110 or the user(s) 5.

The dialog manager 672 may send the results data to one or more skill(s) 690. If the results data includes a single hypothesis, the orchestrator component 630 may send the results data to the skill(s) 690 associated with the hypothesis. If the results data includes an N-best list of hypotheses, the orchestrator component 630 may send the top scoring hypothesis to a skill(s) 690 associated with the top scoring hypothesis.

The system component(s) includes a language output component 693. The language output component 693 includes a natural language generation (NLG) component 679 and a text-to-speech (TTS) component 680. The NLG component 679 can generate text for purposes of TTS output to a user. For example, the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680 (e.g., output text data 1815 discussed below). Alternatively or in addition, the TTS component 680 may receive text data from a skill 690 or other system component for output.

The NLG component 679 may include a trained model. The NLG component 679 generates text data 1815 from dialog data received by the dialog manager 672 such that the output text data 1815 has a natural feel and, in some embodiments, includes words and/or phrases specifically formatted for a requesting individual. The NLG may use templates to formulate responses. And/or the NLG system may include models trained from the various templates for forming the output text data 1815. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 680.

The TTS component 680 may generate audio data (e.g., synthesized speech) from text data using one or more different methods. Text data input to the TTS component 680 may come from a skill component 690, the orchestrator component 630, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 111 representing the commands to the system component(s) 120 for processing, after which the system component(s) 120 may return output data that can cause the device 110 to engage its camera.

Upon receipt by the system component(s) 120, the image data 121 may be sent to an orchestrator component 630. The orchestrator component 630 may send the image data 121 to an image processing component 640. The image processing component 640 can perform computer vision functions such as object recognition, modeling, reconstruction, etc. For example, the image processing component 640 may detect a person, head, etc. (which may then be identified using user recognition component 195). The image processing component 640 is described in greater detail below with regard to FIG. 13. The device may also include an image processing component 740 which operates similarly to image processing component 640.

In some implementations, the image processing component 640 can detect the presence of text in an image. In such implementations, the image processing component 640 can recognize the presence of text, convert the image data to text data, and send the resulting text data via the orchestrator component 630 to the language processing component 692 for processing by the NLU component 660.

Figure 17:
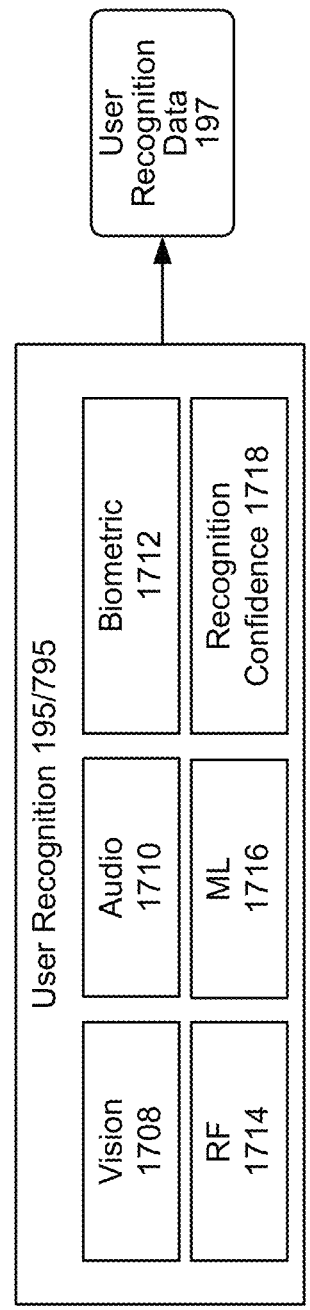
FIG. 17 is a schematic diagram of an illustrative architecture in which sensor data is combined to recognize one or more users according to embodiments of the present disclosure.

The device 110 and/or system component(s) 120 may include a user recognition component 195 that recognizes one or more users using a variety of data, as described in greater detail below with regard to FIG. 17.

The user-recognition component 195 may take as input the audio data 111 and/or text data output by the ASR component 650. The user-recognition component 195 may perform user recognition by comparing audio characteristics in the audio data 111 to stored audio characteristics of users. The user-recognition component 195 may also perform user recognition by comparing biometric data (e.g., fingerprint data, iris data, etc.), received by the system in correlation with the present user input, to stored biometric data of users assuming user permission and previous authorization. The user-recognition component 195 may further perform user recognition by comparing image data (e.g., including a representation of at least a feature of a user), received by the system in correlation with the present user input, with stored image data including representations of features of different users. The user-recognition component 195 may perform additional user recognition processes, including those known in the art.

The user-recognition component 195 determines scores indicating whether user input originated from a particular user. For example, a first score may indicate a likelihood that the user input originated from a first user, a second score may indicate a likelihood that the user input originated from a second user, etc. The user-recognition component 195 also determines an overall confidence regarding the accuracy of user recognition operations.

Output of the user-recognition component 195 may include a single user identifier corresponding to the most likely user that originated the user input. Alternatively, output of the user-recognition component 195 may include an N-best list of user identifiers with respective scores indicating likelihoods of respective users originating the user input. The output of the user-recognition component 195 may be used to inform NLU processing as well as processing performed by other components of the system.

The system 100 (either on device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
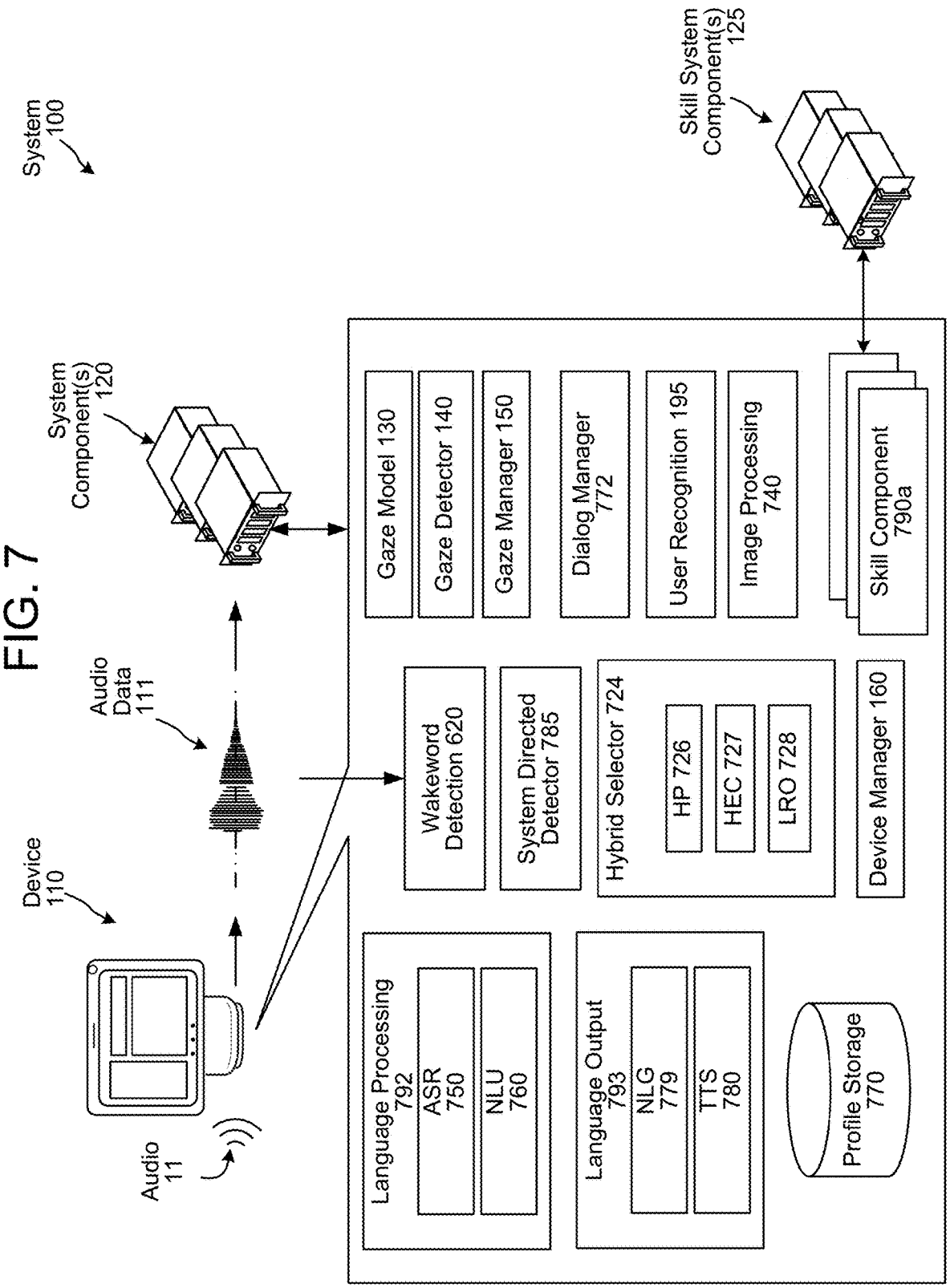
FIG. 7 is a conceptual diagram illustrating components that may be included in a device, according to embodiments of the present disclosure.

Although the components of FIG. 6 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 7 illustrates such a configured device 110.

In at least some embodiments, the system component(s) may receive the audio data 111 from the device 110, to recognize speech corresponding to a spoken input in the received audio data 111, and to perform functions in response to the recognized speech. In at least some embodiments, these functions involve sending directives (e.g., commands), from the system component(s) to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) over the network(s) 199, some or all of the functions capable of being performed by the system component(s) may be performed by sending one or more directives over the network(s) 199 to the device 110, which, in turn, may process the directive(s) and perform one or more corresponding actions. For example, the system component(s), using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the device 110 may include a wakeword detection component 620 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 724, of the device 110, may send the audio data 111 to the wakeword detection component 620. If the wakeword detection component 620 detects a wakeword in the audio data 111, the wakeword detection component 620 may send an indication of such detection to the hybrid selector 724. In response to receiving the indication, the hybrid selector 724 may send the audio data 111 to the system component(s) and/or the ASR component 750. The wakeword detection component 620 may also send an indication, to the hybrid selector 724, representing a wakeword was not detected. In response to receiving such an indication, the hybrid selector 724 may refrain from sending the audio data 111 to the system component(s), and may prevent the ASR component 750 from further processing the audio data 111. In this situation, the audio data 111 can be discarded.

The device 110 may conduct its own speech processing using on-device language processing components, such as an SLU/language processing component 792 (which may include an ASR component 750 and an NLU 760), similar to the manner discussed herein with respect to the SLU component 692 (or ASR component 650 and the NLU component 660) of the system component(s). Language processing component 792 may operate similarly to language processing component 692, ASR component 750 may operate similarly to ASR component 650 and NLU component 760 may operate similarly to NLU component 660. The device 110 may also internally include, or otherwise have access to, other components such as one or more application/skill components 190 capable of executing commands based on NLU output data or other results determined by the device 110/system component(s) (which may operate similarly to skill components 690), a user recognition component 195, profile storage 770 (configured to store similar profile data to that discussed herein with respect to the profile storage 670 of the system component(s)), or other components. In at least some embodiments, the profile storage 770 may only store profile data for a user or group of users specifically associated with the device 110. Similar to as described above with respect to skill component 690, a skill component 190 may communicate with a skill system component(s) 125. The device 110 may also have its own language output component 793 which may include NLG component 779 and TTS component 780. Language output component 793 may operate similarly to language processing component 693, NLG component 779 may operate similarly to NLG component 679 and TTS component 780 may operate similarly to TTS component 680.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s).

The hybrid selector 724, of the device 110, may include a hybrid proxy (HP) 726 configured to proxy traffic to/from the system component(s). For example, the HP 726 may be configured to send messages to/from a hybrid execution controller (HEC) 727 of the hybrid selector 724. For example, command/directive data received from the system component(s) can be sent to the HEC 727 using the HP 726. The HP 726 may also be configured to allow the audio data 111 to pass to the system component(s) while also receiving (e.g., intercepting) this audio data 111 and sending the audio data 111 to the HEC 727.

In at least some embodiments, the hybrid selector 724 may further include a local request orchestrator (LRO) 728 configured to notify the ASR component 750 about the availability of new audio data 111 that represents user speech, and to otherwise initiate the operations of local language processing when new audio data 111 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) and chooses to use that remotely-determined directive data.

Thus, when the audio data 111 is received, the HP 726 may allow the audio data 111 to pass through to the system component(s) and the HP 726 may also input the audio data 111 to the on-device ASR component 750 by routing the audio data 111 through the HEC 727 of the hybrid selector 724, whereby the LRO 728 notifies the ASR component 750 of the audio data 111. At this point, the hybrid selector 724 may wait for response data from either or both of the system component(s) or the local language processing components. However, the disclosure is not limited thereto, and in some examples the hybrid selector 724 may send the audio data 111 only to the local ASR component 750 without departing from the disclosure. For example, the device 110 may process the audio data 111 locally without sending the audio data 111 to the system component(s).

The local ASR component 750 is configured to receive the audio data 111 from the hybrid selector 724, and to recognize speech in the audio data 111, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 660 of the system component(s). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s), assuming a remote response is even received (e.g., when the device 110 is able to access the system component(s) over the network(s) 199), or to determine output audio requesting additional information from the user 5.

The device 110 and/or the system component(s) may associate a unique identifier with each natural language user input. The device 110 may include the unique identifier when sending the audio data 111 to the system component(s), and the response data from the system component(s) may include the unique identifier to identify which natural language user input the response data corresponds.

In at least some embodiments, the device 110 may include, or be configured to use, one or more skill components 190 that may work similarly to the skill component(s) 690 implemented by the system component(s). The skill component(s) 190 may correspond to one or more domains that are used in order to determine how to act on a spoken input in a particular way, such as by outputting a directive that corresponds to the determined intent, and which can be processed to implement the desired operation. The skill component(s) 190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill system component(s) 125. For example, a skill system component(s) 125 may be located in a remote environment (e.g., separate location) such that the device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the device 110 may communicate with the skill system component(s) 125 via a private network, such as a local area network (LAN).

As used herein, a "skill" may refer to a skill component 190/690, a skill system component(s) 125, or a combination of a skill component 190/690 and a corresponding skill system component(s) 125.

Similar to the manner discussed with regard to FIG. 6, the local device 110 may be configured to recognize multiple different wakewords and/or perform different categories of tasks depending on the wakeword. Such different wakewords may invoke different processing components of local device 110 (not illustrated in FIG. 7). For example, detection of the wakeword "Alexa" by the wakeword detector 620 may result in sending audio data to certain language processing components 792/skills 190 for processing while detection of the wakeword "Computer" by the wakeword detector may result in sending audio data different language processing components 792/skills 190 for processing.

Figure 8:
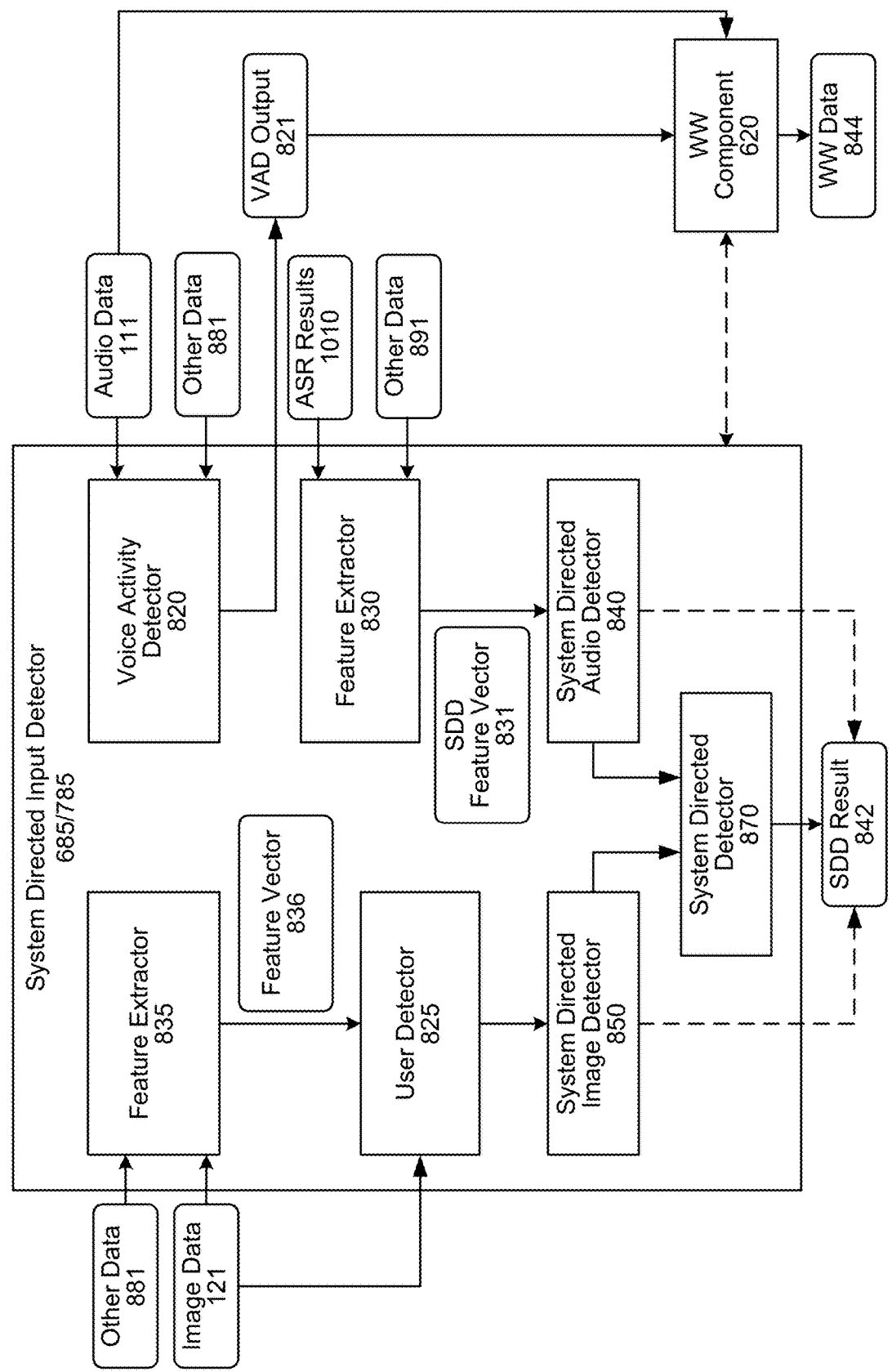
FIG. 8 is a conceptual diagram of components of a system to detect if input audio data includes system directed speech, according to embodiments of the present disclosure.

Configuration and operation of the system directed input detector 785 is illustrated in FIG. 8. As shown in FIG. 8, the system directed input detector 785 may include a number of different components. First, the system directed input detector 785 may include a voice activity detector (VAD) 820. The VAD 820 may operate to detect whether the incoming audio data 111 includes speech or not. The VAD output 821 may be a binary indicator. Thus, if the incoming audio data 111 includes speech, the VAD 820 may output an indicator 821 that the audio data 111 does includes speech (e.g., a 1) and if the incoming audio data 111 does not includes speech, the VAD 820 may output an indicator 821 that the audio data 111 does not includes speech (e.g., a 0). The VAD output 821 may also be a score (e.g., a number between 0 and 1) corresponding to a likelihood that the audio data 111 includes speech. The VAD 820 may also perform start-point detection as well as end-point detection where the VAD 820 determines when speech starts in the audio data 111 and when it ends in the audio data 111. Thus the VAD output 821 may also include indicators of a speech start point and/or a speech endpoint for use by other components of the system. (For example, the start-point and end-points may demarcate the audio data 111 that is sent to the speech processing component 240.) The VAD output 821 may be associated with a same unique ID as the audio data 111 for purposes of tracking system processing across various components.

The VAD 820 may operate using a variety of VAD techniques, including those described above with regard to VAD operations performed by device 110. The VAD may be configured to be robust to background noise so as to accurately detect when audio data actually includes speech or not. The VAD 820 may operate on raw audio data 111 such as that sent by device 110 or may operate on feature vectors or other data representing the audio data 111. For example, the VAD 820 may take the form of a deep neural network (DNN) and may operate on a single feature vector representing the entirety of audio data 111 received from the device or may operate on multiple feature vectors, for example feature vectors representing frames of audio data where each frame covers a certain amount of time of audio data (e.g., 25 ms). The VAD 820 may also operate on other data 881 that may be useful in detecting voice activity in the audio data 111. For example, the other data 881 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 111 to determine if that voice matches a voice in the reference section of speech. If the voices match, that may be an indicator to the VAD 820 that speech was detected. If not, that may be an indicator to the VAD 820 that speech was not detected. (For example, a representation may be taken of voice data in the first input audio data which may then be compared to the second input audio data to see if the voices match. If they do (or do not) that information may be considered by the VAD 820.) The VAD 820 may also consider other data when determining if speech was detected. The VAD 820 may also consider speaker ID information (such as may be output by user recognition component 195), directionality data that may indicate what direction (relative to the capture device 110) the incoming audio was received from. Such directionality data may be received from the device 110 and may have been determined by a beamformer or other component of device 110. The VAD 820 may also consider data regarding a previous utterance which may indicate whether the further audio data received by the system is likely to include speech. Other VAD techniques may also be used.

If the VAD output 821 indicates that no speech was detected the system (through orchestrator 630 or some other component) may discontinue processing with regard to the audio data 111, thus saving computing resources that might otherwise have been spent on other processes (e.g., ASR for the audio data 111, etc.). If the VAD output 821 indicates that speech was detected, the system may make a determination as to whether the speech was or was not directed to the speech-processing system. Such a determination may be made by the system directed audio detector 840. The system directed audio detector 840 may include a trained model, such as a DNN, that operates on a feature vector which represent certain data that may be useful in determining whether or not speech is directed to the system. To create the feature vector operable by the system directed audio detector 840, a feature extractor 830 may be used. The feature extractor 830 may input ASR results 1010 which include results from the processing of the audio data 111 by the speech recognition component 750. For privacy protection purposes, in certain configurations the ASR results 1010 may be obtained from a language processing component 792/ASR component 750 located on device 110 or on a home remote component as opposed to a language processing component 692/ASR component 650 located on a cloud or other remote system component(s) so that audio data 111 is not sent remote from the user's home unless the system directed input detector component 785 has determined that the input is system directed. Though this may be adjusted depending on user preferences/system configuration.

The ASR results 1010 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1010 may include a trellis, which may include a raw search graph as scored during ASR decoding. The ASR results 1010 may also include a lattice, which may be a trellis as scored that has been pruned to remove certain hypotheses that do not exceed a score threshold or number of hypotheses threshold. The ASR results 1010 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1010 may also include corresponding respective scores (such as for a trellis, lattice, confusion network, individual hypothesis, N-best list, etc.)

The ASR results 1010 (or other data 891) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 750 being less confident about its best hypothesis, which in turn may correlate to detected speech not being device directed. The entropy may be a feature included in other data 891 to be considered by the system directed audio detector 840.

The system may also determine and consider ASR decoding costs, which may include features from Viterbi decoding costs of the ASR. Such features may indicate how well the input acoustics and vocabulary match with the acoustic models 1053 and language models 1054. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 750 is less confident about the top hypothesis, which may correlate to detected speech not being device directed. Other such features or data from the ASR results 1010 may also be used as other data 891.

The ASR results 1010 may be represented in a system directed detector (SDD) feature vector 831 that can be used to determine whether speech was system-directed. The feature vector 831 may represent the ASR results 1010 but may also represent audio data 111 (which may be input to feature extractor 830) or other information. Such ASR results may be helpful in determining if speech was system-directed. For example, if ASR results include a high scoring single hypothesis, that may indicate that the speech represented in the audio data 111 is directed at, and intended for, the device 110. If, however, ASR results do not include a single high scoring hypothesis, but rather many lower scoring hypotheses, that may indicate some confusion on the part of the speech recognition component 750 and may also indicate that the speech represented in the audio data 111 was not directed at, nor intended for, the device 110.

The ASR results 1010 may include complete ASR results, for example ASR results corresponding to all speech between a startpoint and endpoint (such as a complete lattice, etc.). In this configuration the system may wait until all ASR processing for a certain input audio has been completed before operating the feature extractor 830 and system directed audio detector 840. Thus the system directed audio detector 840 may receive a feature vector 831 that includes all the representations of the audio data 111 created by the feature extractor 830. The system directed audio detector 840 may then operate a trained model (such as a DNN) on the feature vector 831 to determine a score corresponding to a likelihood that the audio data 111 includes a representation of system-directed speech. If the score is above a threshold, the system directed audio detector 840 may determine that the audio data 111 does include a representation of system-directed speech. The SDD result 842 may include an indicator of whether the audio data includes system-directed speech, a score, and/or some other data.

The ASR results 1010 may also include incomplete ASR results, for example ASR results corresponding to only some speech between a between a startpoint and endpoint (such as an incomplete lattice, etc.). In this configuration the feature extractor 830/system directed audio detector 840 may be configured to operate on incomplete ASR results 1010 and thus the system directed audio detector 840 may be configured to output an SSD result 842 that provides an indication as to whether the portion of audio data processed (that corresponds to the incomplete ASR results) corresponds to system directed speech. The system may thus be configured to perform ASR at least partially in parallel with the system directed audio detector 840 to process ASR result data as it is ready and thus continually update an SDD result 842. Once the system directed input detector 785 has processed enough ASR results and/or the SDD result 842 exceeds a threshold, the system may determine that the audio data 111 includes system-directed speech. Similarly, once the system directed input detector 785 has processed enough ASR results and/or the SDD result 842 drops below another threshold, the system may determine that the audio data 111 does not include system-directed speech.

The SDD result 842 may be associated with a same unique ID as the audio data 111 and VAD output 821 for purposes of tracking system processing across various components.

The feature extractor 830 may also incorporate in a feature vector 831 representations of other data 891. Other data 891 may include, for example, word embeddings from words output by the speech recognition component 750 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 830 processing and representing a word embedding in a feature vector 831 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 891 may also include, for example, NLU output from the natural language 660 component may be considered. Thus, if natural language output data 1285/1225 indicates a high correlation between the audio data 111 and an out-of-domain indication (e.g., no intent classifier scores from ICs 1164 or overall domain scores from recognizers 1163 reach a certain confidence threshold), this may indicate that the audio data 111 does not include system-directed speech. Other data 891 may also include, for example, an indicator of a user/speaker as output user recognition component 195. Thus, for example, if the user recognition component 195 does not indicate the presence of a known user, or indicates the presence of a user associated with audio data 111 that was not associated with a previous utterance, this may indicate that the audio data 111 does not include system-directed speech. The other data 891 may also include an indication that a voice represented in audio data 111 is the same (or different) as the voice detected in previous input audio data corresponding to a previous utterance. The other data 891 may also include directionality data, for example using beamforming or other audio processing techniques to determine a direction/location of a source of detected speech and whether that source direction/location matches a speaking user. The other data 891 may also include data indicating that a direction of a user's speech is toward a device 110 or away from a device 110, which may indicate whether the speech was system directed or not.

Other data 891 may also include image data 121. For example, if image data is detected from one or more devices that are nearby to the device 110 (which may include the device 110 itself) that captured the audio data being processed using the system directed input detector (785), the image data may be processed to determine whether a user is facing an audio capture device for purposes of determining whether speech is system-directed as further explained below.

Other data 891 may also dialog history data. For example, the other data 891 may include information about whether a speaker has changed from a previous utterance to the current audio data 111, whether a topic of conversation has changed from a previous utterance to the current audio data, how NLU results from a previous utterance compare to NLU results obtained using the current audio data 111, other system context information. The other data 891 may also include an indicator as to whether the audio data 111 was received as a result of a wake command or whether the audio data 111 was sent without the device 110 detecting a wake command (e.g., the device 110 being instructed by remote system component(s) and/or determining to send the audio data without first detecting a wake command).

Other data 891 may also include information from the user profile 670.

Other data 891 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 891 may also include acoustic feature data such as pitch, prosody, intonation, volume, or other data descriptive of the speech in the audio data 111. As a user may use a different vocal tone to speak with a machine than with another human, acoustic feature information may be useful in determining if speech is device-directed.

Other data 891 may also include an indicator that indicates whether the audio data 111 includes a wakeword. For example, if a device 110 detects a wakeword prior to sending the audio data 111 to the remote system component(s), the device 110 may send along an indicator that the device 110 detected a wakeword in the audio data 111. In another example, the remote system component(s) may include another component that processes incoming audio data 111 to determine if it includes a wakeword. If it does, the component may create an indicator indicating that the audio data 111 includes a wakeword. The indicator may then be included in other data 891 to be incorporated in the feature vector 831 and/or otherwise considered by the system directed audio detector 840.

Other data 891 may also include device history data such as information about previous operations related to the device 110 that sent the audio data 111. For example, the other data 891 may include information about a previous utterance that was just executed, where the utterance originated with the same device 110 as a current utterance and the previous utterance was within a certain time window of the current utterance. Device history data may be stored in a manner associated with the device identifier (which may also be included in other data 891), which may also be used to track other information about the device, such as device hardware, capability, location, etc.

The other data 881 used by the VAD 820 may include similar data and/or different data from the other data 891 used by the feature extractor 830. The other data 881/891 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 840 and/or the VAD 820) may be based on the data from the previous utterance. For example, a score threshold (for the system directed audio detector 840 and/or the VAD 820) may be based on acoustic data from a previous utterance.

The feature extractor 830 may output a single feature vector 831 for one utterance/instance of input audio data 111. The feature vector 831 may consistently be a fixed length, or may be a variable length vector depending on the relevant data available for particular audio data 111. Thus, the system directed audio detector 840 may output a single SDD result 842 per utterance/instance of input audio data 111. The SDD result 842 may be a binary indicator. Thus, if the incoming audio data 111 includes system-directed speech, the system directed audio detector 840 may output an indicator 842 that the audio data 111 does includes system-directed speech (e.g., a 1) and if the incoming audio data 111 does not includes system-directed speech, the system directed audio detector 840 may output an indicator 842 that the audio data 111 does not system-directed includes speech (e.g., a 0). The SDD result 842 may also be a score (e.g., a number between 0 and 1) corresponding to a likelihood that the audio data 111 includes system-directed speech. Although not illustrated in FIG. 8, the flow of data to and from the system directed input detector 785 may be managed by the orchestrator 630 or by one or more other components.

The trained model(s) of the system directed audio detector 840 may be trained on many different examples of SDD feature vectors that include both positive and negative training samples (e.g., samples that both represent system-directed speech and non-system directed speech) so that the DNN and/or other trained model of the system directed audio detector 840 may be capable of robustly detecting when speech is system-directed versus when speech is not system-directed.

A further input to the system directed input detector 785 may include output data from TTS component 680 to avoid synthesized speech output by the system being confused as system-directed speech spoken by a user. The output from the TTS component 680 may allow the system to ignore synthesized speech in its considerations of whether speech was system directed. The output from the TTS component 680 may also allow the system to determine whether a user captured utterance is responsive to the TTS output, thus improving system operation.

The system directed input detector 785 may also use echo return loss enhancement (ERLE) and/or acoustic echo cancellation (AEC) data to avoid processing of audio data generated by the system.

As shown in FIG. 8, the system directed input detector 785 may simply user audio data to determine whether an input is system directed (for example, system directed audio detector 840 may output an SDD result 842). This may be true particularly when no image data is available (for example for a device without a camera). If image data 121 is available, however, the system may also be configured to use image data 121 to determine if an input is system directed. The image data 121 may include image data captured by device 110 and/or image data captured by other device(s) in the environment of device 110. The audio data 111, image data 121 and other data 881 may be timestamped or otherwise correlated so that the system directed input detector 785 may determine that the data being analyzed all relates to a same time window so as to ensure alignment of data considered with regard to whether a particular input is system directed. For example, the system directed input detector 785 may determine system directedness scores for every frame of audio data/every image of a video stream and may align and/or window them to determine a single overall score for a particular input that corresponds to a group of audio frames/images.

Image data 121 along with other data 881 may be received by feature extractor 835. The feature extractor may create one or more feature vectors 836 which may represent the image data 121/other data 881. In certain examples, other data 881 may include data from image processing component 740 which may include information about heads, gesture, etc. detected in the image data 121. For privacy protection purposes, in certain configurations any image processing/results thereof may be obtained from an image processing component 740 located on device 110 or on a home remote component as opposed to a image processing component 640 located on a cloud or other remote system component(s) so that image data 121 is not sent remote from the user's home unless the system directed input detector component 785 has determined that the input is system directed. Though this may be adjusted depending on user preferences/system configuration.

The feature vector 836 may be passed to the user detector 825. The user detector 825 (which may use various components/operations of image processing component 740, user recognition component 195, etc.) may be configured to process image data 121 and/or feature vector 836 to determine information about the user's behavior which in turn may be used to determine if an input is system directed. For example, the user detector 825 may be configured to determine the user's position/behavior with respect to device 110/system 100. The user detector 825 may also be configured to determine whether a user's mouth is opening/closing in a manner that suggests the user is speaking. The user detector 825 may also be configured to determine whether a user is nodding or shaking his/her head. For example, the user detector 825 may include, or be configured to use data from, a gaze model 130. The user detector 825 may also be configured to determine whether a user's gaze is directed to the device 110, to another user, or to another object. For example, the use detector 825 may include, or be configured to use data from, a gaze detector. The user detector 825 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 825 may also be configured to determine a user's position/ orientation such as facing another user, facing the device 110, whether their back is turned, etc. The user detector 825 may also be configured to determine relative positions of multiple users that appear in image data (and/or are speaking in audio data 111 which may also be considered by the user detector 825 along with feature vector 831), for example which users are closer to a device 110 and which are farther away. The user detector 825 (and/or other component) may also be configured to identify other objects represented in image data and determine whether objects are relevant to a dialog or system interaction (for example determining if a user is referring to an object through a movement or speech).

The user detector 825 may operate one or more models (e.g., one or more classifiers) to determine if certain situations are represented in the image data 121. For example the user detector 825 may employ a visual directedness classifier that may determine, for each head detected in the image data 121 whether that head is looking at the device 110 or not. For example, a light-weight convolutional neural network (CNN) may be used which takes a head image cropped from the result of the head detector as input and output a [0,1] score of how likely the head is directed to the camera or not. Another technique may include to determine a three-dimensional (3D) landmark of each head, estimate the 3D angle of the head and predict a directness score based on the 3D angle.

The user detector 825 (or other component(s) such as those in image processing 740) may be configured to track a head in image data to determine which heads represented may belong to a same person. The system may user IOU based tracker, a mean-shift based tracker, a particle filter based tracker or other technique.

The user detector 825 (or other component(s) such as those in user recognition component 195) may be configured to determine whether a head represented in image data belongs to a person who is speaking or not, thus performing active speaker detection. The system may take the output from the head tracker and aggregate a sequence of head images from the same person as input and predict whether this person is speaking or not. Lip motion, user ID, detected voice data, and other data may be used to determine whether a user is speaking or not.

Figure 9:
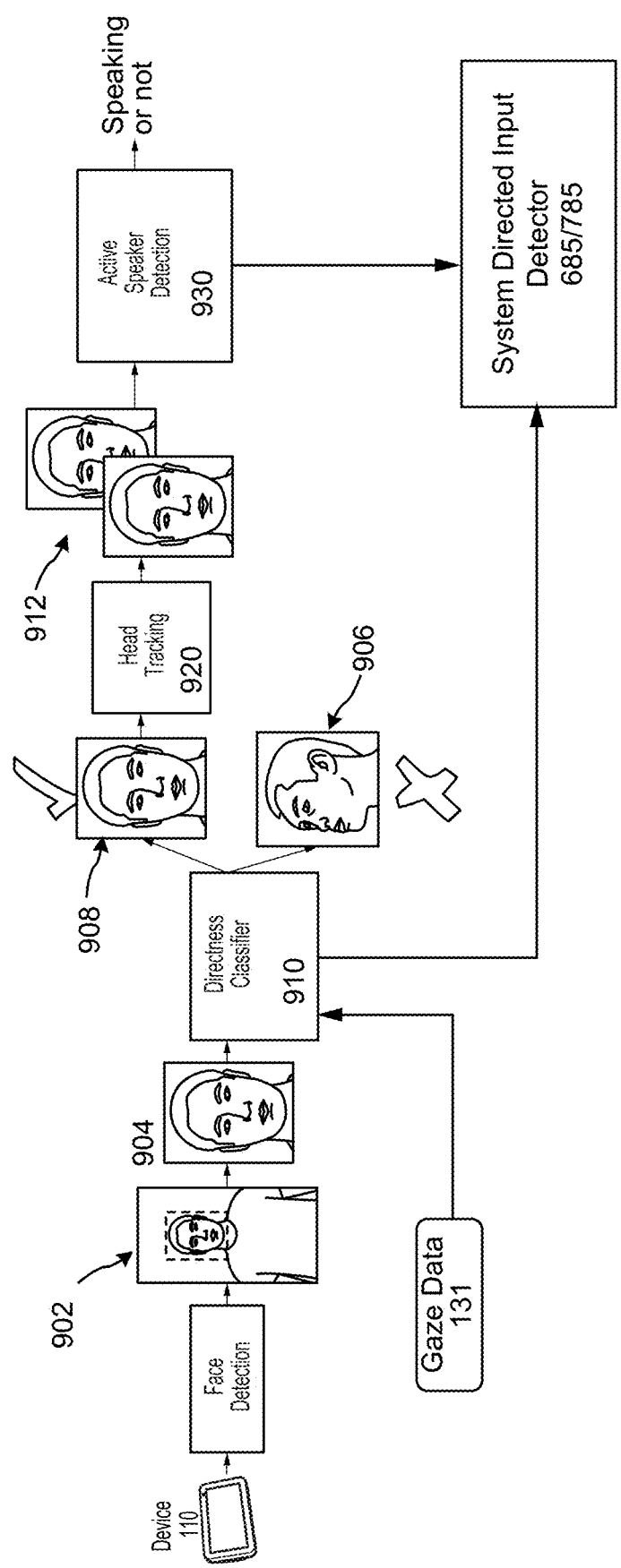
FIG. 9 illustrates techniques for using image data to determine whether an input is system directed, according to embodiments of the present disclosure.

For example, as shown in FIG. 9, device 110 may receive image data 111 from one or more camera(s) 118 and may use a head detection algorithm (executed, for example, by object detection component 1330) to detect a head in image data, as shown by bounded head 902. The device 110 may then isolate the image data 904 of the head and process that image data using a directness classifier 910 (for example as executed by object tracking component 1360 and/or user detector 825) to determine if the user's gaze is directed to the device or elsewhere. If the user is not looking at the device (e.g., as shown in image 906) then the system may determine that user's gaze is directed elsewhere and the appropriate component may output data accordingly. If the user is looking at the device (e.g., as shown in image 908) then the system may determine that user's gaze is directed at the device and may commence tracking the user's head using a head tracking component 920 (for example as part of object tracking component 1360). The system may then refer to a series of images 912 of the same head and process related image data by an active speaker detection component 930 (for example as part of user detector 825) to determine if the head represented in image data 111/904/908 is speaking. The directedness classifier 910 may also use gaze data 131 such as that determined by gaze model 130. Data output by the directness classifier 910 and active speaker detection component 930 may be sent to the system directed image detector 850 and/or system directed detector 870 to determine if an input is system directed.

The user detector 825 may thus output one or more scores or other data indicating user behavior or other data determined from the image data and pass that data to system directed image detector 850. For example, the user detector 8 may pass a variety of score representing the image data. For example:

<Head 1: Gazing at Device [1: Yes]>
<Head 2: Gazing at Device [0: No]>
<Head 3: Gazing at Device [1: Yes]>
<Head 1: Speaking [1: Yes]>
<Head 2: Speaking [0: No]>
<Head 3: Speaking [0: No]>
<Head 1: User pointing at device [0.875]>

And/or the like. The scores may each be associated with time data (such as a timestamp, frame number, etc.) so the data from the user detector 825/system directed image detector 850 may be aligned with the data from the feature extractor 830/system directed audio detector 840.

The system directed image detector 850 may then determine, based on information from the user detector 825 as based on the image data whether an input relating to the image data is system directed. The system directed image detector 850 may also operate on other input data, for example image data including raw image data 121, image data including feature data 836 based on raw image data, other data 881, or other data. The determination by the system directed image detector 850 may result in a score indicating whether the input is system directed based on the image data. If no audio data is available, the indication may be output as SDD result 842. If audio data is available, the indication may be sent to system directed detector 870 which may consider information from both system directed audio detector 840 and system directed image detector 850. The system directed detector 870 may then process the data from both system directed audio detector 840 and system directed image detector 850 to come up with an overall determination as to whether an input was system directed, which may be output as SDD result 842. The system directed detector 870 may consider not only data output from system directed audio detector 840 and system directed image detector 850 but also other data/metadata corresponding to the input (for example, image data/feature data 836, audio data/feature data 831, image data 121, audio data 111, or the like discussed with regard to FIG. 8. The system directed detector 870 may include one or more models which may analyze the various input data to make a determination regarding SDD result 842.

In one example the determination of the system directed detector 870 may be based on "AND" logic, for example determining an input is system directed only if affirmative data is received from both system directed audio detector 840 and system directed image detector 850. In another example the determination of the system directed detector 870 may be based on "OR" logic, for example determining an input is system directed if affirmative data is received from either system directed audio detector 840 or system directed image detector 850. In another example the data received from system directed audio detector 840 and system directed image detector 850 are weighted individually based on other information available to system directed detector 870 to determine to what extend audio and/or image data should impact the decision of whether an input is system directed.

The system directed input detector 785 may also receive information from a wakeword component 620. For example, an indication that a wakeword was detected (e.g., WW data 844) may be considered by the system directed input detector 785 (e.g., by system directed audio detector 840, system directed detector 870, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 692). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 111 or image data 121) sent to a remote system component(s) that is outside a user's home or other direct control.

Figure 10:
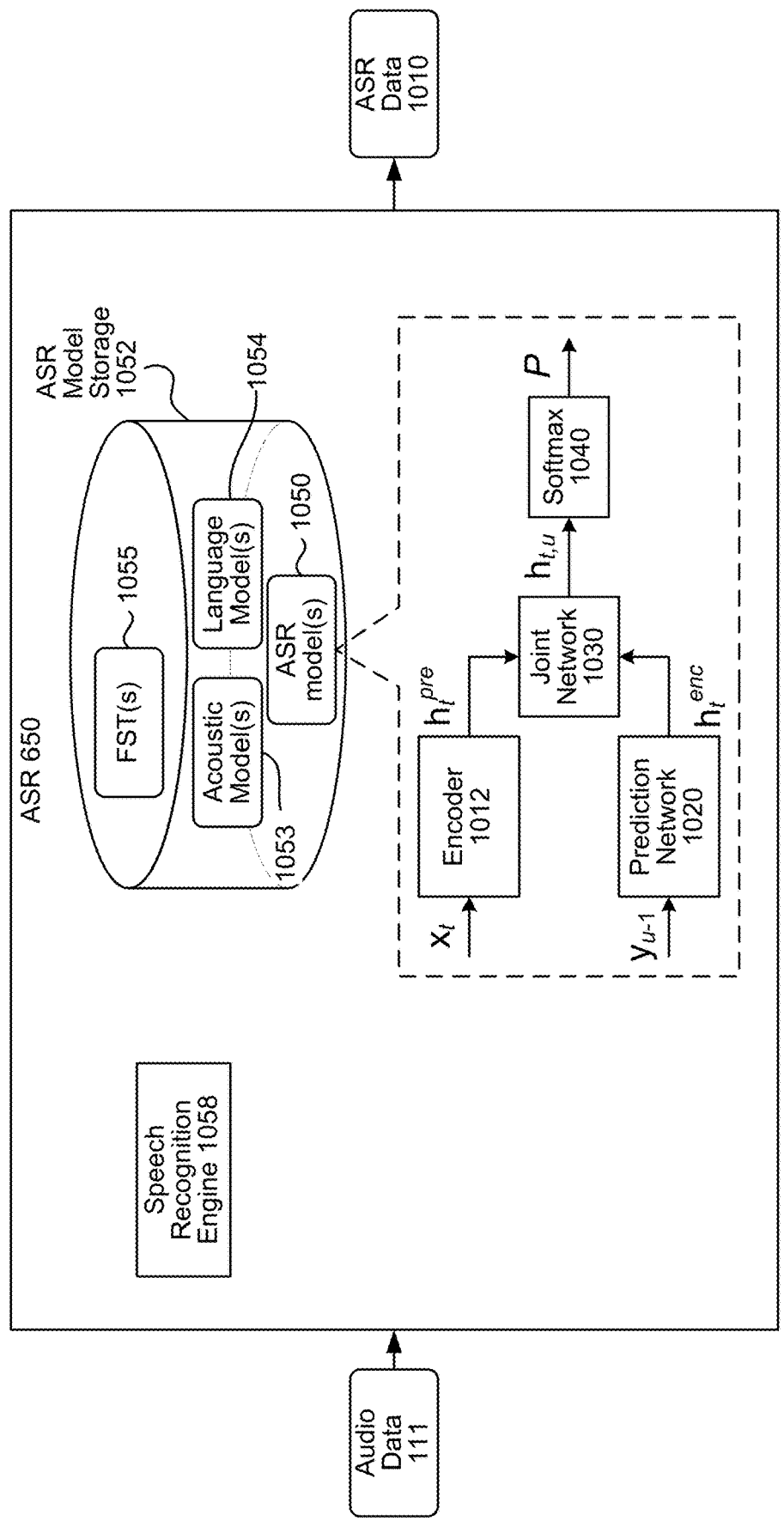
FIG. 10 is a conceptual diagram of an ASR component, according to embodiments of the present disclosure.

FIG. 10 is a conceptual diagram of an ASR component 650, according to embodiments of the present disclosure. The ASR component 650 may interpret a spoken natural language input based on the similarity between the spoken natural language input and pre-established language models 1054 stored in an ASR model storage 1052. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 1055 to implement the language model functions.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1053 stored in the ASR model storage 1052), and the likelihood that a particular word, which matches the sounds, would be included in the sentence at the specific location (e.g., using a language or grammar model 1054). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may include a speech recognition engine 1058. The ASR component 650 receives audio data 111 (for example, received from a local device 110 having processed audio detected by a microphone by an acoustic front end (AFE) or other component). The speech recognition engine 1058 compares the audio data 111 with acoustic models 1053, language models 1054, FST(s) 1055, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 1058 and/or prior to processing by the speech recognition engine 1058.

In some implementations, the ASR component 650 may process the audio data 111 using the ASR model 1050. The ASR model 1050 may be, for example, a recurrent neural network such as an RNN-T. An example RNN-T architecture is illustrated in FIG. 10. The ASR model 1050 may predict a probability (y|x) of labels y=($y_1$, ... $y_u$) given acoustic features x=($x_1$, ..., $x_t$). During inference, the ASR model 1050 can generate an N-best list using, for example, a beam search decoding algorithm. The ASR model 1050 may include an encoder 1012, a prediction network 1020, a joint network 1030, and a softmax 1040. The encoder 1012 may be similar or analogous to an acoustic model (e.g., similar to the acoustic model 1053 described below), and may process a sequence of acoustic input features to generate encoded hidden representations. The prediction network 1020 may be similar or analogous to a language model (e.g., similar to the language model 1054 described below), and may process the previous output label predictions, and map them to corresponding hidden representations. The joint network 1030 may be, for example, a feed forward neural network (NN) that may process hidden representations from both the encoder 1012 and prediction network 1020, and predict output label probabilities. The softmax 1040 may be a function implemented (e.g., as a layer of the joint network 1030) to normalize the predicted output probabilities.

The speech recognition engine 1058 may process the audio data 111 with reference to information stored in the ASR model storage 1052. Feature vectors of the audio data 111 may arrive at the system component(s) encoded, in which case they may be decoded prior to processing by the speech recognition engine 1058.

The speech recognition engine 1058 attempts to match received feature vectors to language acoustic units (e.g., phonemes) and words as known in the stored acoustic models 1053, language models 1054, and FST(s) 1055. For example, audio data 111 may be processed by one or more acoustic model(s) 1053 to determine acoustic unit data. The acoustic unit data may include indicators of acoustic units detected in the audio data 111 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 1054 (and/or using FST 1055) to determine ASR data 1010. The ASR data 1010 can include one or more hypotheses. One or more of the hypotheses represented in the ASR data 1010 may then be sent to further components (such as the NLU component 660) for further processing as discussed herein. The ASR data 1010 may include representations of text of an utterance, such as words, subword units, or the like.

The speech recognition engine 1058 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1058 may use the acoustic model(s) 1053 to attempt to match received audio feature vectors to words or subword acoustic units. An acoustic unit may be a senone, phoneme, phoneme in context, syllable, part of a syllable, syllable in context, or any other such portion of a word. The speech recognition engine 1058 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 1058 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1058, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1058 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 11:
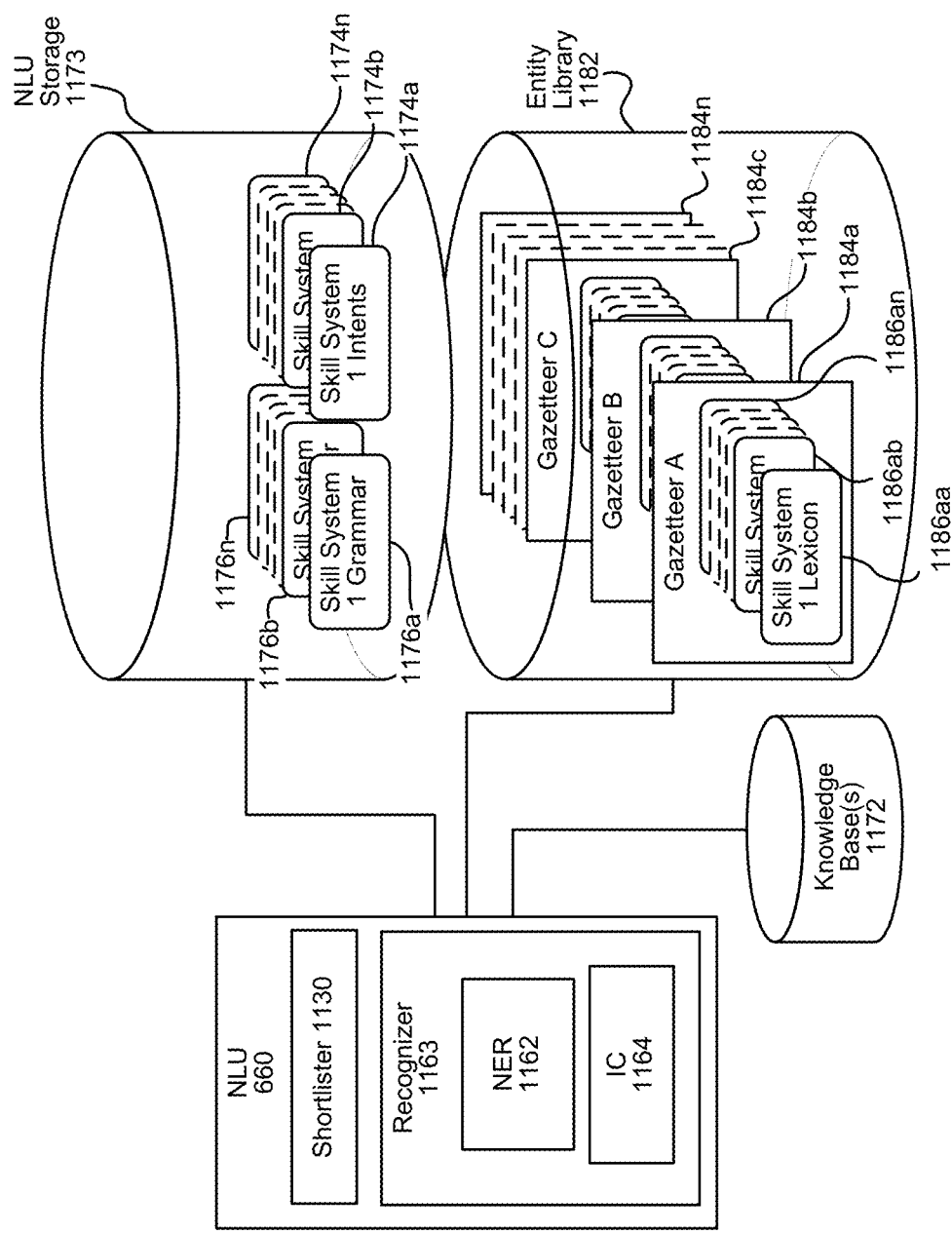
FIG. 11 is a conceptual diagram of how natural language processing is performed, according to embodiments of the present disclosure.
Figure 12:
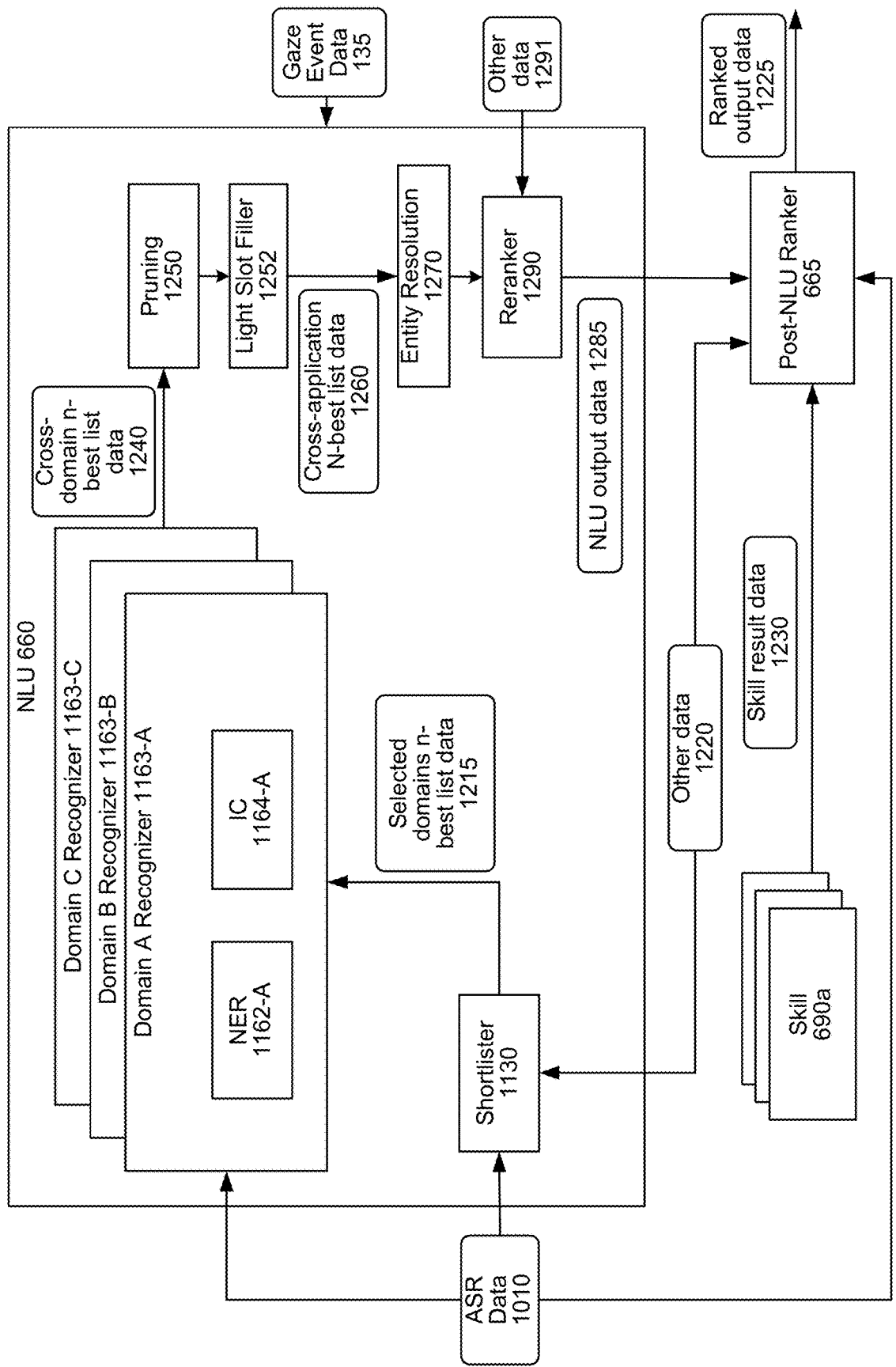
FIG. 12 is a conceptual diagram of how natural language processing is performed, according to embodiments of the present disclosure.

FIGS. 11 and 12 illustrates how the NLU component 660 may perform NLU processing. FIG. 11 is a conceptual diagram of how natural language processing is performed, according to embodiments of the present disclosure. And FIG. 12 is a conceptual diagram of how natural language processing is performed, according to embodiments of the present disclosure.

FIG. 11 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather> intent as well as separately tag "Seattle" as a location for the weather information.

The NLU component 660 may include a shortlister component 1150. The shortlister component 1150 selects skills that may execute with respect to ASR output data 1010 input to the NLU component 660 (e.g., applications that may execute with respect to the user input). The ASR output data 1010 (which may also be referred to as ASR data 1010) may include representations of text of an utterance, such as words, subword units, or the like. The shortlister component 1150 thus limits downstream, more resource intensive NLU processes to being performed with respect to skills that may execute with respect to the user input.

Without a shortlister component 1150, the NLU component 660 may process ASR output data 1010 input thereto with respect to every skill of the system, either in parallel, in series, or using some combination thereof. By implementing a shortlister component 1150, the NLU component 660 may process ASR output data 1010 with respect to only the skills that may execute with respect to the user input. This reduces total compute power and latency attributed to NLU processing.

The shortlister component 1150 may include one or more trained models. The model(s) may be trained to recognize various forms of user inputs that may be received by the system component(s) 120. For example, during a training period skill system component(s) 125 associated with a skill may provide the system component(s) 120 with training text data representing sample user inputs that may be provided by a user to invoke the skill. For example, for a ride sharing skill, a skill system component(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 1150 may be trained, using the training text data representing sample user inputs, to determine other potentially related user input structures that users may try to use to invoke the particular skill. During training, the system component(s) 120 may solicit the skill system component(s) 125 associated with the skill regarding whether the determined other user input structures are permissible, from the perspective of the skill system component(s) 125, to be used to invoke the skill. The alternate user input structures may be derived by one or more trained models during model training and/or may be based on user input structures provided by different skills. The skill system component(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1150 may be trained with respect to a different skill. Alternatively, the shortlister component 1150 may use one trained model per domain, such as one trained model for skills associated with a weather domain, one trained model for skills associated with a ride sharing domain, etc.

The system component(s) 120 may use the sample user inputs provided by a skill system component(s) 125, and related sample user inputs potentially determined during training, as binary examples to train a model associated with a skill associated with the skill system component(s) 125. The model associated with the particular skill may then be operated at runtime by the shortlister component 1150. For example, some sample user inputs may be positive examples (e.g., user inputs that may be used to invoke the skill). Other sample user inputs may be negative examples (e.g., user inputs that may not be used to invoke the skill).

As described above, the shortlister component 1150 may include a different trained model for each skill of the system, a different trained model for each domain, or some other combination of trained model(s). For example, the shortlister component 1150 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1150 to output indications of only a portion of the skills that the ASR output data 1010 may relate to. For example, a user input may correspond to "tell me about Tom Collins." If the model is clustered based on domain, the shortlister component 1150 may determine the user input corresponds to a recipe skill (e.g., a drink recipe) even though the user input may also correspond to an information skill (e.g., including information about a person named Tom Collins).

The NLU component 660 may include one or more recognizers 1163. In at least some embodiments, a recognizer 1163 may be associated with a skill system component(s) 125 (e.g., the recognizer may be configured to interpret text data to correspond to the skill system component(s) 125). In at least some other examples, a recognizer 1163 may be associated with a domain such as smart home, video, music, weather, custom, etc. (e.g., the recognizer may be configured to interpret text data to correspond to the domain).

If the shortlister component 1150 determines ASR output data 1010 is potentially associated with multiple domains, the recognizers 1163 associated with the domains may process the ASR output data 1010, while recognizers 1163 not indicated in the shortlister component 1150's output may not process the ASR output data 1010. The "shortlisted" recognizers 1163 may process the ASR output data 1010 in parallel, in series, partially in parallel, etc. For example, if ASR output data 1010 potentially relates to both a communications domain and a music domain, a recognizer associated with the communications domain may process the ASR output data 1010 in parallel, or partially in parallel, with a recognizer associated with the music domain processing the ASR output data 1010.

Each recognizer 1163 may include a named entity recognition (NER) component 1162. The NER component 1162 attempts to identify grammars and lexical information that may be used to construe meaning with respect to text data input therein. The NER component 1162 identifies portions of text data that correspond to a named entity associated with a domain, associated with the recognizer 1163 implementing the NER component 1162. The NER component 1162 (or other component of the NLU component 660) may also determine whether a word refers to an entity whose identity is not explicitly mentioned in the text data, for example "him," "her," "it" or other anaphora, exophora, or the like.

Each recognizer 1163, and more specifically each NER component 1162, may be associated with a particular grammar database 1176, a particular set of intents/actions 1174, and a particular personalized lexicon 1186. The grammar databases 1176, and intents/actions 1174 may be stored in an NLU storage 1173. Each gazetteer 1184 may include domain/skill-indexed lexical information associated with a particular user and/or device 110. For example, a Gazetteer A (1184a) includes skill-indexed lexical information 1186aa to 1186an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1162 applies grammar information 1176 and lexical information 1186 associated with a domain (associated with the recognizer 1163 implementing the NER component 1162) to determine a mention of one or more entities in text data. In this manner, the NER component 1162 identifies "slots" (each corresponding to one or more particular words in text data) that may be useful for later processing. The NER component 1162 may also label each slot with a type (e.g., noun, place, city, artist name, song name, etc.).

Each grammar database 1176 includes the names of entities (i.e., nouns) commonly found in speech about the particular domain to which the grammar database 1176 relates, whereas the lexical information 1186 is personalized to the user and/or the device 110 from which the user input originated. For example, a grammar database 1176 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (1184a-1184n) stored in an entity library storage 1182. The gazetteer information 1184 may be used to match text data (representing a portion of the user input) with text data representing known entities, such as song titles, contact names, etc. Gazetteers 1184 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1163 may also include an intent classification (IC) component 1164. An IC component 1164 parses text data to determine an intent(s) (associated with the domain associated with the recognizer 1163 implementing the IC component 1164) that potentially represents the user input. An intent represents to an action a user desires be performed. An IC component 1164 may communicate with a database 1174 of words linked to intents. For example, a music intent database may link words and phrases such as "quiet," "volume off," and "mute" to a <Mute> intent. An IC component 1164 identifies potential intents by comparing words and phrases in text data (representing at least a portion of the user input) to the words and phrases in an intents database 1174 (associated with the domain that is associated with the recognizer 1163 implementing the IC component 1164).

The intents identifiable by a specific IC component 1164 are linked to domain-specific (i.e., the domain associated with the recognizer 1163 implementing the IC component 1164) grammar frameworks 1176 with "slots" to be filled. Each slot of a grammar framework 1176 corresponds to a portion of text data that the system believes corresponds to an entity. For example, a grammar framework 1176 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1176 may not be structured as sentences, but rather based on associating slots with grammatical tags.

For example, an NER component 1162 may parse text data to identify words as subject, object, verb, preposition, etc. based on grammar rules and/or models prior to recognizing named entities in the text data. An IC component 1164 (implemented by the same recognizer 1163 as the NER component 1162) may use the identified verb to identify an intent. The NER component 1162 may then determine a grammar model 1176 associated with the identified intent. For example, a grammar model 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component 1162 may then search corresponding fields in a lexicon 1186 (associated with the domain associated with the recognizer 1163 implementing the NER component 1162), attempting to match words and phrases in text data the NER component 1162 previously tagged as a grammatical object or object modifier with those identified in the lexicon 1186.

An NER component 1162 may perform semantic tagging, which is the labeling of a word or combination of words according to their type/semantic meaning. An NER component 1162 may parse text data using heuristic grammar rules, or a model may be constructed using techniques such as Hidden Markov Models, maximum entropy models, log linear models, conditional random fields (CRF), and the like. For example, an NER component 1162 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 identifies "Play" as a verb based on a word database associated with the music domain, which an IC component 1164 (also implemented by the music domain recognizer) may determine corresponds to a <PlayMusic> intent. At this stage, no determination has been made as to the meaning of "mother's little helper" or "the rolling stones," but based on grammar rules and models, the NER component 1162 has determined the text of these phrases relates to the grammatical object (i.e., entity) of the user input represented in the text data.

An NER component 1162 may tag text data to attribute meaning thereto. For example, an NER component 1162 may tag "play mother's little helper by the rolling stones" as: {domain} Music, {intent}<PlayMusic>, {artist name} rolling stones, {media type} SONG, and {song title} mother's little helper. For further example, the NER component 1162 may tag "play songs by the rolling stones" as: {domain} Music, {intent}<PlayMusic>, {artist name} rolling stones, and {media type} SONG.

The shortlister component 1150 may receive ASR output data 1010 output from the ASR component 650 or output from the device 110b (as illustrated in FIG. 12). The ASR component 650 may embed the ASR output data 1010 into a form processable by a trained model(s) using sentence embedding techniques as known in the art. Sentence embedding results in the ASR output data 1010 including text in a structure that enables the trained models of the shortlister component 1150 to operate on the ASR output data 1010. For example, an embedding of the ASR output data 1010 may be a vector representation of the ASR output data 1010.

The shortlister component 1150 may make binary determinations (e.g., yes or no) regarding which domains relate to the ASR output data 1010. The shortlister component 1150 may make such determinations using the one or more trained models described herein above. If the shortlister component 1150 implements a single trained model for each domain, the shortlister component 1150 may simply run the models that are associated with enabled domains as indicated in a user profile associated with the device 110 and/or user that originated the user input.

The shortlister component 1150 may generate n-best list data 1215 representing domains that may execute with respect to the user input represented in the ASR output data 1010. The size of the n-best list represented in the n-best list data 1215 is configurable. In an example, the n-best list data 1215 may indicate every domain of the system as well as contain an indication, for each domain, regarding whether the domain is likely capable to execute the user input represented in the ASR output data 1010. In another example, instead of indicating every domain of the system, the n-best list data 1215 may only indicate the domains that are likely to be able to execute the user input represented in the ASR output data 1010. In yet another example, the shortlister component 1150 may implement thresholding such that the n-best list data 1215 may indicate no more than a maximum number of domains that may execute the user input represented in the ASR output data 1010. In an example, the threshold number of domains that may be represented in the n-best list data 1215 is ten. In another example, the domains included in the n-best list data 1215 may be limited by a threshold a score, where only domains indicating a likelihood to handle the user input is above a certain score (as determined by processing the ASR output data 1010 by the shortlister component 1150 relative to such domains) are included in the n-best list data 1215.

The ASR output data 1010 may correspond to more than one ASR hypothesis. When this occurs, the shortlister component 1150 may output a different n-best list (represented in the n-best list data 1215) for each ASR hypothesis. Alternatively, the shortlister component 1150 may output a single n-best list representing the domains that are related to the multiple ASR hypotheses represented in the ASR output data 1010.

As indicated above, the shortlister component 1150 may implement thresholding such that an n-best list output therefrom may include no more than a threshold number of entries. If the ASR output data 1010 includes more than one ASR hypothesis, the n-best list output by the shortlister component 1150 may include no more than a threshold number of entries irrespective of the number of ASR hypotheses output by the ASR component 650. Alternatively or in addition, the n-best list output by the shortlister component 1150 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1010, the shortlister component 1150 may generate confidence scores representing likelihoods that domains relate to the ASR output data 1010. If the shortlister component 1150 implements a different trained model for each domain, the shortlister component 1150 may generate a different confidence score for each individual domain trained model that is run. If the shortlister component 1150 runs the models of every domain when ASR output data 1010 is received, the shortlister component 1150 may generate a different confidence score for each domain of the system. If the shortlister component 1150 runs the models of only the domains that are associated with skills indicated as enabled in a user profile associated with the device 110 and/or user that originated the user input, the shortlister component 1150 may only generate a different confidence score for each domain associated with at least one enabled skill. If the shortlister component 1150 implements a single trained model with domain specifically trained portions, the shortlister component 1150 may generate a different confidence score for each domain who's specifically trained portion is run. The shortlister component 1150 may perform matrix vector modification to obtain confidence scores for all domains of the system in a single instance of processing of the ASR output data 1010.

N-best list data 1215 including confidence scores that may be output by the shortlister component 1150 may be represented as, for example:

Search domain, 0.67
Recipe domain, 0.62
Information domain, 0.57
Shopping domain, 0.42

As indicated, the confidence scores output by the shortlister component 1150 may be numeric values. The confidence scores output by the shortlister component 1150 may alternatively be binned values (e.g., high, medium, low).

The n-best list may only include entries for domains having a confidence score satisfying (e.g., equaling or exceeding) a minimum threshold confidence score. Alternatively, the shortlister component 1150 may include entries for all domains associated with user enabled skills, even if one or more of the domains are associated with confidence scores that do not satisfy the minimum threshold confidence score.

The shortlister component 1150 may consider other data 1220 when determining which domains may relate to the user input represented in the ASR output data 1010 as well as respective confidence scores. The other data 1220 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1220 may include an indicator of the user associated with the ASR output data 1010, for example as determined by the user recognition component 195.

The other data 1220 may be character embedded prior to being input to the shortlister component 1150. The other data 1220 may alternatively be embedded using other techniques known in the art prior to being input to the shortlister component 1150.

The other data 1220 may also include data indicating the domains associated with skills that are enabled with respect to the device 110 and/or user that originated the user input. The shortlister component 1150 may use such data to determine which domain-specific trained models to run. That is, the shortlister component 1150 may determine to only run the trained models associated with domains that are associated with user-enabled skills. The shortlister component 1150 may alternatively use such data to alter confidence scores of domains.

As an example, considering two domains, a first domain associated with at least one enabled skill and a second domain not associated with any user-enabled skills of the user that originated the user input, the shortlister component 1150 may run a first model specific to the first domain as well as a second model specific to the second domain. Alternatively, the shortlister component 1150 may run a model configured to determine a score for each of the first and second domains. The shortlister component 1150 may determine a same confidence score for each of the first and second domains in the first instance. The shortlister component 1150 may then alter those confidence scores based on which domains is associated with at least one skill enabled by the present user. For example, the shortlister component 1150 may increase the confidence score associated with the domain associated with at least one enabled skill while leaving the confidence score associated with the other domain the same. Alternatively, the shortlister component 1150 may leave the confidence score associated with the domain associated with at least one enabled skill the same while decreasing the confidence score associated with the other domain. Moreover, the shortlister component 1150 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 1150 receives the ASR output data 1010, the shortlister component 1150 may determine whether profile data associated with the user and/or device 110 that originated the command includes an indication of enabled skills.

The other data 1220 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1150 may use such data to determine which domain-specific trained models to run. For example, if the device 110 corresponds to a displayless type device, the shortlister component 1150 may determine not to run trained models specific to domains that output video data. The shortlister component 1150 may alternatively use such data to alter confidence scores of domains.

As an example, considering two domains, one that outputs audio data and another that outputs video data, the shortlister component 1150 may run a first model specific to the domain that generates audio data as well as a second model specific to the domain that generates video data. Alternatively the shortlister component 1150 may run a model configured to determine a score for each domain. The shortlister component 1150 may determine a same confidence score for each of the domains in the first instance. The shortlister component 1150 may then alter the original confidence scores based on the type of the device 110 that originated the user input corresponding to the ASR output data 1010. For example, if the device 110 is a displayless device, the shortlister component 1150 may increase the confidence score associated with the domain that generates audio data while leaving the confidence score associated with the domain that generates video data the same. Alternatively, if the device 110 is a displayless device, the shortlister component 1150 may leave the confidence score associated with the domain that generates audio data the same while decreasing the confidence score associated with the domain that generates video data. Moreover, if the device 110 is a displayless device, the shortlister component 1150 may increase the confidence score associated with the domain that generates audio data as well as decrease the confidence score associated with the domain that generates video data.

The type of device information represented in the other data 1220 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1220 may represent the smart TV of other display device, and not the displayless device that captured the spoken user input.

The other data 1220 may also include data indicating the user input originating device's speed, location, or other mobility information. For example, the device may correspond to a vehicle including a display. If the vehicle is moving, the shortlister component 1150 may decrease the confidence score associated with a domain that generates video data as it may be undesirable to output video content to a user while the user is driving. The device may output data to the system component(s) 120 indicating when the device is moving.

The other data 1220 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1150 may use such data to alter confidence scores of domains. For example, the shortlister component 1150 may run a first model specific to a first domain as well as a second model specific to a second domain. Alternatively, the shortlister component 1150 may run a model configured to determine a score for each domain. The shortlister component 1150 may also determine a same confidence score for each of the domains in the first instance. The shortlister component 1150 may then alter the original confidence scores based on the first domain being invoked to cause the system to output content while the current user input was received. Based on the first domain being invoked, the shortlister component 1150 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1215 generated by the shortlister component 1150 as well as the different types of other data 1220 considered by the shortlister component 1150 are configurable. For example, the shortlister component 1150 may update confidence scores as more other data 1220 is considered. For further example, the n-best list data 1215 may exclude relevant domains if thresholding is implemented. Thus, for example, the shortlister component 1150 may include an indication of a domain in the n-best list 1215 unless the shortlister component 1150 is one hundred percent confident that the domain may not execute the user input represented in the ASR output data 1010 (e.g., the shortlister component 1150 determines a confidence score of zero for the domain).

The shortlister component 1150 may send the ASR output data 1010 to recognizers 1163 associated with domains represented in the n-best list data 1215. Alternatively, the shortlister component 1150 may send the n-best list data 1215 or some other indicator of the selected subset of domains to another component (such as the orchestrator component 630) which may in turn send the ASR output data 1010 to the recognizers 1163 corresponding to the domains included in the n-best list data 1215 or otherwise indicated in the indicator. If the shortlister component 1150 generates an n-best list representing domains without any associated confidence scores, the shortlister component 1150/orchestrator component 630 may send the ASR output data 1010 to recognizers 1163 associated with domains that the shortlister component 1150 determines may execute the user input. If the shortlister component 1150 generates an n-best list representing domains with associated confidence scores, the shortlister component 1150/orchestrator component 630 may send the ASR output data 1010 to recognizers 1163 associated with domains associated with confidence scores satisfying (e.g., meeting or exceeding) a threshold minimum confidence score.

A recognizer 1163 may output tagged text data generated by an NER component 1162 and an IC component 1164, as described herein above. The NLU component 660 may compile the output tagged text data of the recognizers 1163 into a single cross-domain n-best list 1240 and may send the cross-domain n-best list 1240 to a pruning component 1250. Each entry of tagged text (e.g., each NLU hypothesis) represented in the cross-domain n-best list data 1240 may be associated with a respective score indicating a likelihood that the NLU hypothesis corresponds to the domain associated with the recognizer 1163 from which the NLU hypothesis was output. For example, the cross-domain n-best list data 1240 may be represented as (with each line corresponding to a different NLU hypothesis):

[0.95] Intent: <PlayMusic> ArtistName: Beethoven SongName: Waldstein Sonata

[0.70] Intent: <Play Video> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1250 may sort the NLU hypotheses represented in the cross-domain n-best list data 1240 according to their respective scores. The pruning component 1250 may perform score thresholding with respect to the cross-domain NLU hypotheses. For example, the pruning component 1250 may select NLU hypotheses associated with scores satisfying (e.g., meeting and/or exceeding) a threshold score. The pruning component 1250 may also or alternatively perform number of NLU hypothesis thresholding. For example, the pruning component 1250 may select the top scoring NLU hypothesis(es). The pruning component 1250 may output a portion of the NLU hypotheses input thereto. The purpose of the pruning component 1250 is to create a reduced list of NLU hypotheses so that downstream, more resource intensive, processes may only operate on the NLU hypotheses that most likely represent the user's intent.

The NLU component 660 may include a light slot filler component 1252. The light slot filler component 1252 can take text from slots represented in the NLU hypotheses output by the pruning component 1250 and alter them to make the text more easily processed by downstream components. The light slot filler component 1252 may perform low latency operations that do not involve heavy operations such as reference to a knowledge base (e.g., 1172. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-domain n-best list data 1260.

The cross-domain n-best list data 1260 may be input to an entity resolution component 1270. The entity resolution component 1270 can apply rules or other instructions to standardize labels or tokens from previous stages into an intent/slot representation. The precise transformation may depend on the domain. For example, for a travel domain, the entity resolution component 1270 may transform text corresponding to "Boston airport" to the standard BOS three-letter code referring to the airport. The entity resolution component 1270 can refer to a knowledge base (e.g., 1172) that is used to specifically identify the precise entity referred to in each slot of each NLU hypothesis represented in the cross-domain n-best list data 1260. Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output an altered n-best list that is based on the cross-domain n-best list 1260 but that includes more detailed information (e.g., entity IDs) about the specific entities mentioned in the slots and/or more detailed slot data that can eventually be used by a skill. The NLU component 660 may include multiple entity resolution components 1270 and each entity resolution component 1270 may be specific to one or more domains.

The NLU component 660 may include a reranker 1290. The reranker 1290 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1270.

The reranker 1290 may apply re-scoring, biasing, or other techniques. The reranker 1290 may consider not only the data output by the entity resolution component 1270, but may also consider other data 1291. The other data 1291 may include a variety of information. For example, the other data 1291 may include skill rating or popularity data. For example, if one skill has a high rating, the reranker 1290 may increase the score of a NLU hypothesis that may be processed by the skill. The other data 1291 may also include information about skills that have been enabled by the user that originated the user input. For example, the reranker 1290 may assign higher scores to NLU hypothesis that may be processed by enabled skills than NLU hypothesis that may be processed by non-enabled skills. The other data 1291 may also include data indicating user usage history, such as if the user that originated the user input regularly uses a particular skill or does so at particular times of day. The other data 1291 may additionally include data indicating date, time, location, weather, type of device 110, user identifier, context, as well as other information. For example, the reranker 1290 may consider when any particular skill is currently active (e.g., music being played, a game being played, etc.).

As illustrated and described, the entity resolution component 1270 is implemented prior to the reranker 1290. The entity resolution component 1270 may alternatively be implemented after the reranker 1290. Implementing the entity resolution component 1270 after the reranker 1290 limits the NLU hypotheses processed by the entity resolution component 1270 to only those hypotheses that successfully pass through the reranker 1290.

The reranker 1290 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the system component(s) 120 (e.g., designated 690 in FIG. 6). The NLU component 660 may separately perform NLU processing described above with respect to domains associated with skills that are at least partially implemented as part of the skill system component(s) 125. In an example, the shortlister component 1150 may only process with respect to these latter domains. Results of these two NLU processing paths may be merged into NLU output data 1285, which may be sent to a post-NLU ranker 665, which may be implemented by the system component(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 1285, skill result data 1230, and the other data 1220 in order to output ranked output data 1225. The ranked output data 1225 may include an n-best list where the NLU hypotheses in the NLU results data 1285 are reordered such that the n-best list in the ranked output data 1225 represents a prioritized list of skills to respond to a user input as determined by the post-NLU ranker 665. The ranked output data 1225 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 1285 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data 1230 based on the first NLU hypothesis and the second NLU hypothesis, respectively. For example, the post-NLU ranker 665 may send the first NLU hypothesis to the first skill 690a along with a request for the first skill 690a to at least partially execute with respect to the first NLU hypothesis. The post-NLU ranker 665 may also send the second NLU hypothesis to the second skill 690b along with a request for the second skill 690b to at least partially execute with respect to the second NLU hypothesis. The post-NLU ranker 665 receives, from the first skill 690*a*, first result data 1230*a* generated from the first skill 690*a*'s execution with respect to the first NLU hypothesis. The post-NLU ranker 665 also receives, from the second skill 690*b*, second results data 1230*b* generated from the second skill 690*b*'s execution with respect to the second NLU hypothesis.

The result data 1230 may include various portions. For example, the result data 1230 may include content (e.g., audio data, text data, and/or video data) to be output to a user. The result data 1230 may also include a unique identifier used by the system component(s) 120 and/or the skill system component(s) 125 to locate the data to be output to a user. The result data 1230 may also include an instruction. For example, if the user input corresponds to "turn on the light," the result data 1230 may include an instruction causing the system to turn on a light associated with a profile of the device (110*a*/110*b*) and/or user.

The post-NLU ranker 665 may consider the first result data 1230*a* and the second result data 1230*b* to alter the first confidence score and the second confidence score of the first NLU hypothesis and the second NLU hypothesis, respectively. That is, the post-NLU ranker 665 may generate a third confidence score based on the first result data 1230*a* and the first confidence score. The third confidence score may correspond to how likely the post-NLU ranker 665 determines the first skill will correctly respond to the user input. The post-NLU ranker 665 may also generate a fourth confidence score based on the second result data 1230*b* and the second confidence score. One skilled in the art will appreciate that a first difference between the third confidence score and the fourth confidence score may be greater than a second difference between the first confidence score and the second confidence score. The post-NLU ranker 665 may also consider the other data 1220 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1230 associated with the skill 690 with the highest altered confidence score to be the data output in response to the current user input. The post-NLU ranker 665 may also consider the ASR output data 1010 to alter the NLU hypotheses confidence scores.

The orchestrator component 630 may, prior to sending the NLU results data 1285 to the post-NLU ranker 665, associate intents in the NLU hypotheses with skills 690. For example, if a NLU hypothesis includes a <PlayMusic> intent, the orchestrator component 630 may associate the NLU hypothesis with one or more skills 690 that can execute the <PlayMusic> intent. Thus, the orchestrator component 630 may send the NLU results data 1285, including NLU hypotheses paired with skills 690, to the post-NLU ranker 665. In response to ASR output data 1010 corresponding to "what should I do for dinner today," the orchestrator component 630 may generates pairs of skills 690 with associated NLU hypotheses corresponding to:

Skill 1/NLU hypothesis including <Help> intent
    Skill 2/NLU hypothesis including <Order> intent
    Skill 3/NLU hypothesis including <DishType> intent The post-NLU ranker 665 queries each skill 690, paired with a NLU hypothesis in the NLU output data 1285, to provide result data 1230 based on the NLU hypothesis with which it is associated. That is, with respect to each skill, the post-NLU ranker 665 colloquially asks the each skill "if given this NLU hypothesis, what would you do with it."

According to the above example, the post-NLU ranker 665 may send skills 690 the following data:

Skill 1: First NLU hypothesis including <Help> intent indicator
    Skill 2: Second NLU hypothesis including <Order> intent indicator
    Skill 3: Third NLU hypothesis including <DishType> intent indicator The post-NLU ranker 665 may query each of the skills 690 in parallel or substantially in parallel.

A skill 690 may provide the post-NLU ranker 665 with various data and indications in response to the post-NLU ranker 665 soliciting the skill 690 for result data 1230. A skill 690 may simply provide the post-NLU ranker 665 with an indication of whether or not the skill can execute with respect to the NLU hypothesis it received. A skill 690 may also or alternatively provide the post-NLU ranker 665 with output data generated based on the NLU hypothesis it received. In some situations, a skill 690 may need further information in addition to what is represented in the received NLU hypothesis to provide output data responsive to the user input. In these situations, the skill 690 may provide the post-NLU ranker 665 with result data 1230 indicating slots of a framework that the skill 690 further needs filled or entities that the skill 690 further needs resolved prior to the skill 690 being able to provided result data 1230 responsive to the user input. The skill 690 may also provide the post-NLU ranker 665 with an instruction and/or computer-generated speech indicating how the skill 690 recommends the system solicit further information needed by the skill 690. The skill 690 may further provide the post-NLU ranker 665 with an indication of whether the skill 690 will have all needed information after the user provides additional information a single time, or whether the skill 690 will need the user to provide various kinds of additional information prior to the skill 690 having all needed information. According to the above example, skills 690 may provide the post-NLU ranker 665 with the following:

Skill 1: indication representing the skill can execute with respect to a NLU hypothesis including the <Help> intent indicator
    Skill 2: indication representing the skill needs to the system to obtain further information
    Skill 3: indication representing the skill can provide numerous results in response to the third NLU hypothesis including the <DishType> intent indicator Result data 1230 includes an indication provided by a skill 690 indicating whether or not the skill 690 can execute with respect to a NLU hypothesis; data generated by a skill 690 based on a NLU hypothesis; as well as an indication provided by a skill 690 indicating the skill 690 needs further information in addition to what is represented in the received NLU hypothesis.

The post-NLU ranker 665 uses the result data 1230 provided by the skills 690 to alter the NLU processing confidence scores generated by the reranker 1290. That is, the post-NLU ranker 665 uses the result data 1230 provided by the queried skills 690 to create larger differences between the NLU processing confidence scores generated by the reranker 1290.

Without the post-NLU ranker 665, the system may not be confident enough to determine an output in response to a user input, for example when the NLU hypotheses associated with multiple skills are too close for the system to confidently determine a single skill 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 690 that provide result data 1230 responsive to NLU hypotheses over skills 690 that provide result data 1230 corresponding to an indication that further information is needed, as well as skills 690 that provide result data 1230 indicating they can provide multiple responses to received NLU hypotheses. For example, the post-NLU ranker 665 may generate a first score for a first skill 690a that is greater than the first skill's NLU confidence score based on the first skill 690a providing result data 1230a including a response to a NLU hypothesis. For further example, the post-NLU ranker 665 may generate a second score for a second skill 690b that is less than the second skill's NLU confidence score based on the second skill 690b providing result data 1230b indicating further information is needed for the second skill 690b to provide a response to a NLU hypothesis. Yet further, for example, the post-NLU ranker 665 may generate a third score for a third skill 690c that is less than the third skill's NLU confidence score based on the third skill 690c providing result data 1230c indicating the third skill 690c can provide multiple responses to a NLU hypothesis.

The post-NLU ranker 665 may consider other data 1220 in determining scores. The other data 1220 may include rankings associated with the queried skills 690. A ranking may be a system ranking or a user-specific ranking. A ranking may indicate a veracity of a skill from the perspective of one or more users of the system. For example, the post-NLU ranker 665 may generate a first score for a first skill 690a that is greater than the first skill's NLU processing confidence score based on the first skill 690a being associated with a high ranking. For further example, the post-NLU ranker 665 may generate a second score for a second skill 690b that is less than the second skill's NLU processing confidence score based on the second skill 690b being associated with a low ranking.

The other data 1220 may include information indicating whether or not the user that originated the user input has enabled one or more of the queried skills 690. For example, the post-NLU ranker 665 may generate a first score for a first skill 690a that is greater than the first skill's NLU processing confidence score based on the first skill 690a being enabled by the user that originated the user input. For further example, the post-NLU ranker 665 may generate a second score for a second skill 690b that is less than the second skill's NLU processing confidence score based on the second skill 690b not being enabled by the user that originated the user input. When the post-NLU ranker 665 receives the NLU results data 1285, the post-NLU ranker 665 may determine whether profile data, associated with the user and/or device that originated the user input, includes indications of enabled skills.

The other data 1220 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1220 may include information indicating the veracity of the result data 1230 provided by a skill 690. For example, if a user says "tell me a recipe for pasta sauce," a first skill 690a may provide the post-NLU ranker 665 with first result data 1230a corresponding to a first recipe associated with a five star rating and a second skill 690b may provide the post-NLU ranker 665 with second result data 1230b corresponding to a second recipe associated with a one star rating. In this situation, the post-NLU ranker 665 may increase the NLU processing confidence score associated with the first skill 690a based on the first skill 690a providing the first result data 1230a associated with the five star rating and/or decrease the NLU processing confidence score associated with the second skill 690b based on the second skill 690b providing the second result data 1230b associated with the one star rating.

The other data 1220 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 690a corresponding to a room service skill associated with the hotel and/or decrease the NLU processing confidence score associated with a second skill 690b corresponding to a food skill not associated with the hotel.

The other data 1220 may include information indicating a location of the device and/or user that originated the user input. The system may be configured with skills 690 that may only operate with respect to certain geographic locations. For example, a user may provide a user input corresponding to "when is the next train to Portland." A first skill 690a may operate with respect to trains that arrive at, depart from, and pass through Portland, Oregon. A second skill 690b may operate with respect to trains that arrive at, depart from, and pass through Portland, Maine. If the device and/or user that originated the user input is located in Seattle, Washington, the post-NLU ranker 665 may increase the NLU processing confidence score associated with the first skill 690a and/or decrease the NLU processing confidence score associated with the second skill 690b. Likewise, if the device and/or user that originated the user input is located in Boston, Massachusetts, the post-NLU ranker 665 may increase the NLU processing confidence score associated with the second skill 690b and/or decrease the NLU processing confidence score associated with the first skill 690a.

The other data 1220 may include information indicating a time of day. The system may be configured with skills 690 that operate with respect to certain times of day. For example, a user may provide a user input corresponding to "order me food." A first skill 690a may generate first result data 1230a corresponding to breakfast. A second skill 690b may generate second result data 1230b corresponding to dinner. If the system component(s) 120 receives the user input in the morning, the post-NLU ranker 665 may increase the NLU processing confidence score associated with the first skill 690a and/or decrease the NLU processing score associated with the second skill 690b. If the system component(s) 120 receives the user input in the afternoon or evening, the post-NLU ranker 665 may increase the NLU processing confidence score associated with the second skill 690*b* and/or decrease the NLU processing confidence score associated with the first skill 690*a*.

The other data 1220 may include information indicating user preferences. The system may include multiple skills 690 configured to execute in substantially the same manner. For example, a first skill 690*a* and a second skill 690*b* may both be configured to order food from respective restaurants. The system may store a user preference (e.g., in the profile storage 670) that is associated with the user that provided the user input to the system component(s) 120 as well as indicates the user prefers the first skill 690*a* over the second skill 690*b*. Thus, when the user provides a user input that may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1220 may include information indicating system usage history associated with the user that originated the user input. For example, the system usage history may indicate the user originates user inputs that invoke a first skill 690*a* more often than the user originates user inputs that invoke a second skill 690*b*. Based on this, if the present user input may be executed by both the first skill 690*a* and the second skill 690*b*, the post-NLU ranker 665 may increase the NLU processing confidence score associated with the first skill 690*a* and/or decrease the NLU processing confidence score associated with the second skill 690*b*.

The other data 1220 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 665 may increase the NLU processing confidence score associated with a first skill 690*a* that generates audio data. The post-NLU ranker 665 may also or alternatively decrease the NLU processing confidence score associated with a second skill 690*b* that generates image data or video data.

The other data 1220 may include information indicating how long it took a skill 690 to provide result data 1230 to the post-NLU ranker 665. When the post-NLU ranker 665 multiple skills 690 for result data 1230, the skills 690 may respond to the queries at different speeds. The post-NLU ranker 665 may implement a latency budget. For example, if the post-NLU ranker 665 determines a skill 690 responds to the post-NLU ranker 665 within a threshold amount of time from receiving a query from the post-NLU ranker 665, the post-NLU ranker 665 may increase the NLU processing confidence score associated with the skill 690. Conversely, if the post-NLU ranker 665 determines a skill 690 does not respond to the post-NLU ranker 665 within a threshold amount of time from receiving a query from the post-NLU ranker 665, the post-NLU ranker 665 may decrease the NLU processing confidence score associated with the skill 690.

It has been described that the post-NLU ranker 665 uses the other data 1220 to increase and decrease NLU processing confidence scores associated with various skills 690 that the post-NLU ranker 665 has already requested result data from. Alternatively, the post-NLU ranker 665 may use the other data 1220 to determine which skills 690 to request result data from. For example, the post-NLU ranker 665 may use the other data 1220 to increase and/or decrease NLU processing confidence scores associated with skills 690 associated with the NLU results data 1285 output by the NLU component 660. The post-NLU ranker 665 may select n-number of top scoring altered NLU processing confidence scores. The post-NLU ranker 665 may then request result data 1230 from only the skills 690 associated with the selected n-number of NLU processing confidence scores.

As described, the post-NLU ranker 665 may request result data 1230 from all skills 690 associated with the NLU results data 1285 output by the NLU component 660. Alternatively, the system component(s) 120 may prefer result data 1230 from skills implemented entirely by the system component(s) 120 rather than skills at least partially implemented by the skill system component(s) 125. Therefore, in the first instance, the post-NLU ranker 665 may request result data 1230 from only skills associated with the NLU results data 1285 and entirely implemented by the system component(s) 120. The post-NLU ranker 665 may only request result data 1230 from skills associated with the NLU results data 1285, and at least partially implemented by the skill system component(s) 125, if none of the skills, wholly implemented by the system component(s) 120, provide the post-NLU ranker 665 with result data 1230 indicating either data response to the NLU results data 1285, an indication that the skill can execute the user input, or an indication that further information is needed.

As indicated above, the post-NLU ranker 665 may request result data 1230 from multiple skills 690. If one of the skills 690 provides result data 1230 indicating a response to a NLU hypothesis and the other skills provide result data 1230 indicating either they cannot execute or they need further information, the post-NLU ranker 665 may select the result data 1230 including the response to the NLU hypothesis as the data to be output to the user. If more than one of the skills 690 provides result data 1230 indicating responses to NLU hypotheses, the post-NLU ranker 665 may consider the other data 1220 to generate altered NLU processing confidence scores, and select the result data 1230 of the skill associated with the greatest score as the data to be output to the user.

A system that does not implement the post-NLU ranker 665 may select the highest scored NLU hypothesis in the NLU results data 1285. The system may send the NLU hypothesis to a skill 690 associated therewith along with a request for output data. In some situations, the skill 690 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 1285 to provide result data 1230 to the post-NLU ranker 665 prior to the post-NLU ranker 665 ultimately determining the skill 690 to be invoked to respond to the user input. Some of the skills 690 may provide result data 1230 indicating responses to NLU hypotheses while other skills 690 may providing result data 1230 indicating the skills cannot provide responsive data. Whereas a system not implementing the post-NLU ranker 665 may select one of the skills 690 that could not provide a response, the post-NLU ranker 665 only selects a skill 690 that provides the post-NLU ranker 665 with result data corresponding to a response, indicating further information is needed, or indicating multiple responses can be generated.

The post-NLU ranker 665 may select result data 1230, associated with the skill 690 associated with the highest score, for output to the user. Alternatively, the post-NLU ranker 665 may output ranked output data 1225 indicating skills 690 and their respective post-NLU ranker rankings. Since the post-NLU ranker 665 receives result data 1230, potentially corresponding to a response to the user input, from the skills 690 prior to post-NLU ranker 665 selecting one of the skills or outputting the ranked output data 1225, little to no latency occurs from the time skills provide result data 1230 and the time the system outputs responds to the user.

If the post-NLU ranker 665 selects result audio data to be output to a user and the system determines content should be output audibly, the post-NLU ranker 665 (or another component of the system component(s) 120) may cause the device 110a and/or the device 110b to output audio corresponding to the result audio data. If the post-NLU ranker 665 selects result text data to output to a user and the system determines content should be output visually, the post-NLU ranker 665 (or another component of the system component(s) 120) may cause the device 110b to display text corresponding to the result text data. If the post-NLU ranker 665 selects result audio data to output to a user and the system determines content should be output visually, the post-NLU ranker 665 (or another component of the system component(s) 120) may send the result audio data to the ASR component 650. The ASR component 650 may generate output text data corresponding to the result audio data. The system component(s) 120 may then cause the device 110b to display text corresponding to the output text data. If the post-NLU ranker 665 selects result text data to output to a user and the system determines content should be output audibly, the post-NLU ranker 665 (or another component of the system component(s) 120) may send the result text data to the TTS component 680. The TTS component 680 may generate output audio data (corresponding to computer-generated speech) based on the result text data. The system component(s) 120 may then cause the device 110a and/or the device 110b to output audio corresponding to the output audio data.

As described, a skill 690 may provide result data 1230 either indicating a response to the user input, indicating more information is needed for the skill 690 to provide a response to the user input, or indicating the skill 690 cannot provide a response to the user input. If the skill 690 associated with the highest post-NLU ranker score provides the post-NLU ranker 665 with result data 1230 indicating a response to the user input, the post-NLU ranker 665 (or another component of the system component(s) 120, such as the orchestrator component 630) may simply cause content corresponding to the result data 1230 to be output to the user. For example, the post-NLU ranker 665 may send the result data 1230 to the orchestrator component 630. The orchestrator component 630 may cause the result data 1230 to be sent to the device (110a/110b), which may output audio and/or display text corresponding to the result data 1230. The orchestrator component 630 may send the result data 1230 to the ASR component 650 to generate output text data and/or may send the result data 1230 to the TTS component 680 to generate output audio data, depending on the situation.

The skill 690 associated with the highest post-NLU ranker score may provide the post-NLU ranker 665 with result data 1230 indicating more information is needed as well as instruction data. The instruction data may indicate how the skill 690 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 665 may simply cause the received instruction data be output by the device (110a/110b). Alternatively, the instruction data may be in a format that is not capable of being output by the device (110a/110b). When this occurs, the post-NLU ranker 665 may cause the ASR component 650 or the TTS component 680 to process the instruction data, depending on the situation, to generate instruction data that may be output by the device (110a/110b). Once the user provides the system with all further information needed by the skill 690, the skill 690 may provide the system with result data 1230 indicating a response to the user input, which may be output by the system as detailed above.

The system may include "informational" skills 690 that simply provide the system with information, which the system outputs to the user. The system may also include "transactional" skills 690 that require a system instruction to execute the user input. Transactional skills 690 include ride sharing skills, flight booking skills, etc. A transactional skill 690 may simply provide the post-NLU ranker 665 with result data 1230 indicating the transactional skill 690 can execute the user input. The post-NLU ranker 665 may then cause the system to solicit the user for an indication that the system is permitted to cause the transactional skill 690 to execute the user input. The user-provided indication may be an audible indication or a tactile indication (e.g., activation of a virtual button or input of text via a virtual keyboard). In response to receiving the user-provided indication, the system may provide the transactional skill 690 with data corresponding to the indication. In response, the transactional skill 690 may execute the command (e.g., book a flight, book a train ticket, etc.). Thus, while the system may not further engage an informational skill 690 after the informational skill 690 provides the post-NLU ranker 665 with result data 1230, the system may further engage a transactional skill 690 after the transactional skill 690 provides the post-NLU ranker 665 with result data 1230 indicating the transactional skill 690 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

To assist the NLU 660 with its operations, and to provide a better user experience the NLU 660 may use the gaze event data 135 to assist in interpreting a user command. The gaze event data 135 may be incorporated in other data 1220, other data 1291, and/or used by some other component of NLU 660 to more precisely interpret a user utterance. For example, if a user says "Alexa, send that one to my mom" or "tell me more about these", the gaze event data 135 may indicate to the NLU 660 where the user's gaze was directed at the time of the utterance, what specific information was displayed, what application was the source of the information, what other information was displayed on the screen at the time, etc. Thus the NLU 660 may use the gaze event data 135 to determine an improved interpretation of the user utterance.

The device 110 may include image processing component 740. The system component(s) 120 may include image processing component 640. The image processing component 640 may located across different physical and/or virtual machines. The image processing components 640/740 may operate in a similar manner, though for ease of explanation reference may be made herein to the operation of image processing component 640. The image processing component 640 may receive and analyze image data (which may include single images or a plurality of images such as in a video feed). The image processing component 640 may work with other components of the system component(s) to perform various operations. For example the image processing component 640 may work with user recognition component 195 to assist with user recognition using image data. The image processing component 640 may also include or otherwise be associated with image data storage 1370 which may store aspects of image data used by image processing component 640. The image data may be of different formats such as JPEG, GIF, BMP, MPEG, video formats, and the like.

Image matching algorithms, such as those used by image processing component 640, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 1370, profile storage 670, or other storage component.

Figure 13:
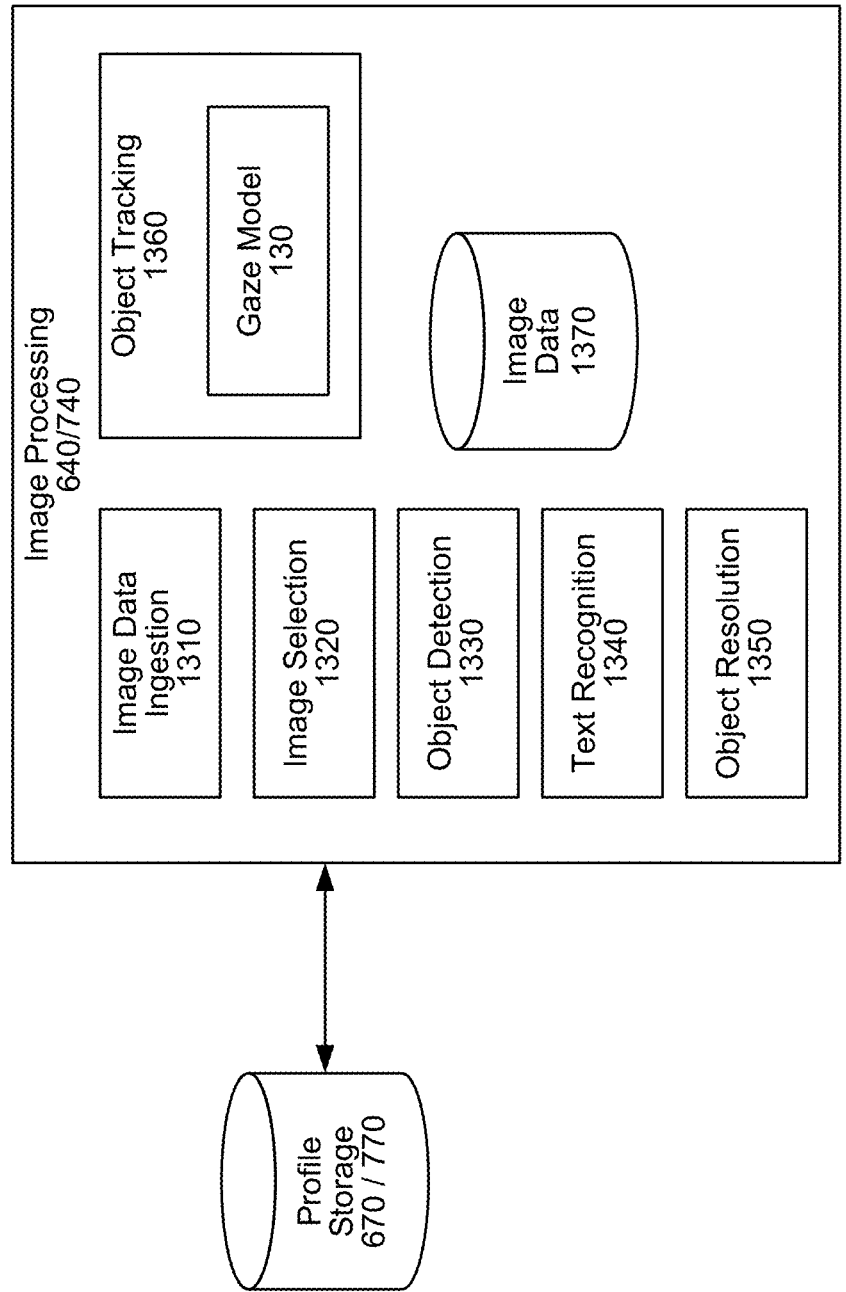
FIG. 13 is a conceptual diagram of components of an image processing component, according to embodiments of the present disclosure.

Image selection component 1320 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 640 may be configured to select or discard an image quickly so that the system can, in turn, quickly process the selected image and deliver results to a user. The image selection component 1320 may select an image for object recognition by computing a metric/feature for each frame in the video feed and selecting an image for processing if the metric exceeds a certain threshold. While FIG. 13 illustrates image selection component 1320 as part of system component(s), it may also be located on device 110 so that the device may select only desired image(s) to send to system component(s), thus avoiding sending too much image data to system component(s) (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1320 may perform various operations to detect potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 1320 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 1320 for sending to another component (e.g., from device to system component(s)) and/or for further processing, such as text recognition, object detection/resolution, etc.

The feature data calculated by image selection component 1320 may be sent to other components such as text recognition component 1340, objection detection component 1330, object resolution component 1350, etc. so that those components may use the feature data in their operations. Other preprocessing operations such as masking, binarization, etc. may be performed on image data prior to recognition/resolution operations. Those preprocessing operations may be performed by the device prior to sending image data or by system component(s).

Object detection component 1330 may be configured to analyze image data to detect and/or identify one or more objects represented in the image data. Various approaches can be used to attempt to detect/recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1330 may process at least a portion of the image data to determine feature data. The feature data is indicative of one or more features that are depicted in the image data. For example, the features may be head data, or other objects, for example as represented by stored data in profile storage 670. Other examples of features may include shapes of body parts or other such features that indicate the presence of a human. Other examples of features may include edges of doors, shadows on the wall, texture on the walls, portions of artwork in the environment, and so forth to identify a space. The object detection component 1330 may compare detected features to stored data (e.g., in profile storage 670, image data 1370, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1330 the system may determine which object is actually seen using object resolution component 1350. Thus one component, such as object detection component 1330, may detect if an object is represented in an image while another component, object resolution component 1350 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1330 may determine that a type of object is represented in image data and object resolution component 1350 may then determine which specific object is represented. The object resolution component 1350 may also make available specific data about a recognized object to further components so that further operations may be performed with regard to the resolved object.

Object detection component 1330 may be configured to process image data to detect a representation of an approximately two-dimensional (2D) object (such as a piece of paper) or a three-dimensional (3D) object (such as a head). Such recognition may be based on available stored data (e.g., 670, 1370, etc.) which in turn may have been provided through an image data ingestion process managed by image data ingestion component 1310. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

In various embodiments, the object detection component 1330 may be configured to detect a user or a portion of a user (e.g., head, head, hands) in image data and determine an initial position and/or orientation of the user in the image data. Various approaches can be used to detect a user within the image data. Techniques for detecting a user can sometimes be characterized as either feature-based or appearance-based. Feature-based approaches generally involve extracting features from an image and applying various rules, metrics, or heuristics to determine whether a person is present in an image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the grouping of edges method. In the grouping of edges method, an edge map (generated via, e.g., a Canny detector, Sobel filter, Marr-Hildreth edge operator) and heuristics are used to remove and group edges from an input image so that only the edges of the contour of a head remain. A box or ellipse is then fit to the boundary between the head region and the background. Low-level feature-based methods can also be based on gray level information or skin color. For example, facial features such as eyebrows, pupils, and lips generally appear darker than surrounding regions of the head and this observation can be used to detect a head within an image. In one such approach, a low resolution Gaussian or Laplacian of an input image is utilized to locate linear sequences of similarly oriented blobs and streaks, such as two dark blobs and three light blobs to represent eyes, cheekbones, and nose and streaks to represent the outline of the head, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of a user, such as eyes, nose, and/or mouth. Certain high-level feature-based methods can be characterized as top-down or bottom-up. A top-down approach first attempts to detect a particular user feature (e.g., head or face) and then validates existence of a person in an image by detecting constituent components of that user feature (e.g., eyes, nose, mouth). In contrast, a bottom-up approach begins by extracting the constituent components first and then confirming the presence of a person based on the constituent components being correctly arranged. For example, one top-down feature-based approach is the multi-resolution rule-based method. In this embodiment, a person is detected as present within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a head may include the upper round part of a head comprising a set of pixels of uniform intensity, the center part of a head comprising a set of pixels of a second uniform intensity, and the difference between the intensities of the upper round part and the center part of the head being within a threshold intensity difference. The image pyramid or hierarchy is descended and head candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another top-down approach, head candidates are located based on the Kanade projection method for locating the boundary of a head. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a head.

Some feature-based and appearance-based methods use template matching to determine whether a user is represented in an image. Template matching is based on matching a pre-defined head pattern or parameterized function to locate the user within an image. Templates are typically prepared manually "offline." In template matching, correlation values for the head and facial features are obtained by comparing one or more templates to an input image, and the presence of a head is determined from the correlation values.

One template-based approach for detecting a user within an image is the Yuille method, which matches a parameterized head template to head candidate regions of an input image. Two additional templates are used for matching the eyes and mouth respectively. An energy function is defined that links edges, peaks, and valleys in the image intensity profile to the corresponding characteristics in the templates, and the energy function is minimized by iteratively adjusting the parameters of the template to the fit to the image. Another template-matching method is the active shape model (ASM). ASMs statistically model the shape of the deformable object (e.g., user's head, face, other user features) and are built offline with a training set of images having labeled landmarks. The shape of the deformable object can be represented by a vector of the labeled landmarks. The shape vector can be normalized and projected onto a low dimensional subspace using principal component analysis (PCA). The ASM is used as a template to determine whether a person is located in an image. The ASM has led to the use of Active Appearance Models (AAMs), which further include defining a texture or intensity vector as part of the template. Based on a point distribution model, images in the training set of images can be transformed to the mean shape to produce shape-free patches. The intensities from these patches can be sampled to generate the intensity vector, and the dimensionality of the intensity vector may be reduced using PCA. The parameters of the AAM can be optimized and the AAM can be fit to an object appearing in the new image using, for example, a gradient descent technique or linear regression.

Various other appearance-based methods can also be used to locate whether a user is represented in an image. Appearance-based methods typically use classifiers that are trained from positive examples of persons represented in images and negative examples of images with no persons. Application of the classifiers to an input image can determine whether a user exists in an image. Appearance-based methods can be based on PCA, neural networks, support vector machines (SVMs), naïve Bayes classifiers, the Hidden Markov model (HMM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all location in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include Rowley's multilayer neural network, the autoassociative neural network, the probabilistic decision-based neural network (PDBNN), the sparse network of winnows (SNOW). A variation of neural networks are deep belief networks (DBNs) which use unsupervised pre-training to generate a neural network to first learn useful features, and training the DBN further by backpropagation with trained data.

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of head patterns at multiple resolutions. At each scale, a head image is decomposed into subregions and the subregions are further decomposed according to space, frequency, and orientation. The statistics of each projected subregion are estimated from the projected samples to learn the joint distribution of object and position. A head is determined to be within an image if the likelihood ratio is greater than the ratio of prior probabilities, i.e., $$\frac{P(\text{image} \mid \text{object})}{P(\text{image} \mid \text{non-object})} > \frac{P(\text{non-object})}{P(\text{object})}.$$

In HMM-based approaches, head patterns are treated as sequences of observation vectors each comprising a strip of pixels. Each strip of pixels is treated as an observation or state of the HMM and boundaries between strips of pixels are represented by transitions between observations or states according to statistical modeling. Inductive learning approaches, such as those based on Quinlan's C4.5 algorithm or Mitchell's Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector.

Figure 14A:
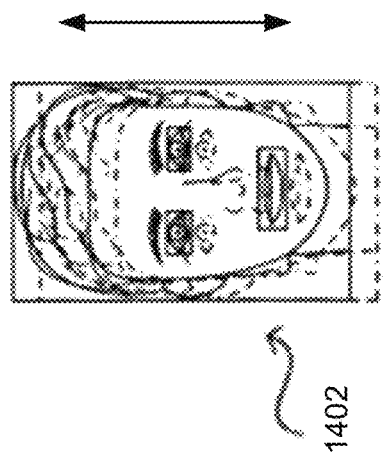
FIGS. 14A-14F illustrate examples of tracking a user's head in image data in accordance various embodiments.

After at least a portion of a user has been detected in image data captured by a computing device, approaches in accordance with various embodiments track the detected portion of the user, for example using object tracking component 1360. The object tracking component 1360, gaze model 130, or other component(s), may use user recognition data 197 or other information related to the user recognition component to identify and/or track a user using image data. FIGS. 14A-F illustrate certain approaches that can be utilized for detecting and tracking a user/user gaze in accordance with various embodiments. FIG. 14A illustrates an example wherein the approximate position and orientation of the head of a user 1402 has been determined and a virtual "box" 1420 is placed around the user's head using one or more of the various user detection processes discussed herein. A similar or different approach can also be used to determine an approximate location and area 1422 of each of the user's eyes (or in some cases the eyes in tandem) and mouth or other facial features. By determining the location of the user's eyes and mouth as part of facial detection, advantages may be obtained as it can be more likely that the image determined to be the user's head actually includes the user's head, and it can be determined that the user is in front of the device. Further, the relative movement of the user's eyes and mouth can be easier to detect than the overall movement of the user's head when the user is performing motions such as nodding or shaking the head back and forth.

Figure 14B:
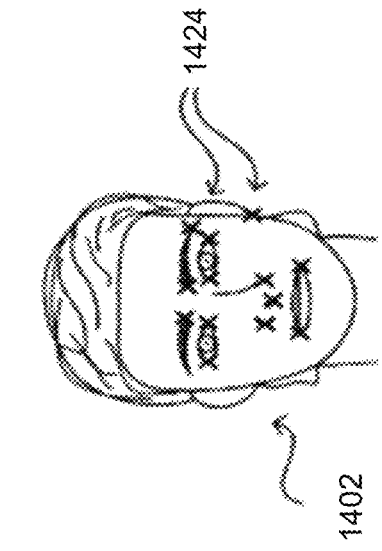

Various other approaches can also be used to track the user/user gaze. For example, FIG. 14B illustrates an example wherein various features on a user's head are detected and assigned a point 1424 in the image. The system thus can detect various aspects of user facial features and can determine changes such as movement or change in shape or expression. Such an approach can provide advantages over the general approach of FIG. 14A in certain situations, as various points along a facial feature can be determined, such as the end points and at least one center point of a user's mouth. Accordingly, expressions such as a smile or frown can be captured even though the overall position of the user's mouth or head did not move.

Figure 14C:
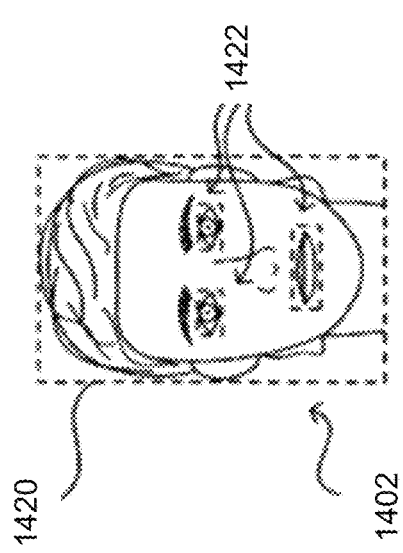
Figure 14D:
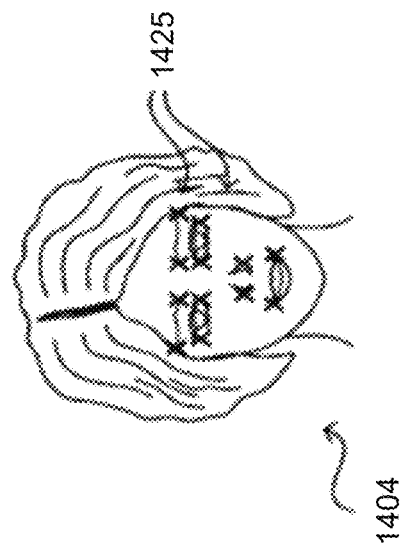
Figure 14E:
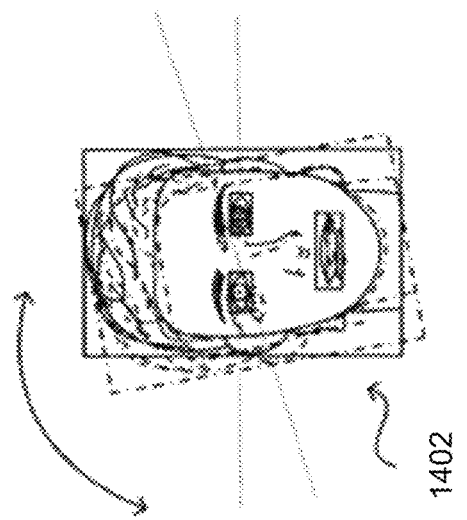

Once the facial features of a user are detected, relative motion or changes in facial expression can be tracked and utilized as input in accordance with various embodiments. For example, FIG. 14C illustrates an example where the user's head 1402 is moving up and down with respect to the viewable area of the imaging element. As discussed, this could be the result of the user shaking his or her head, or the user moving the device up and down, etc. FIG. 14D illustrates a similar example wherein the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements. FIG. 14E further illustrates an example wherein the user tilts the device and/or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 14F:
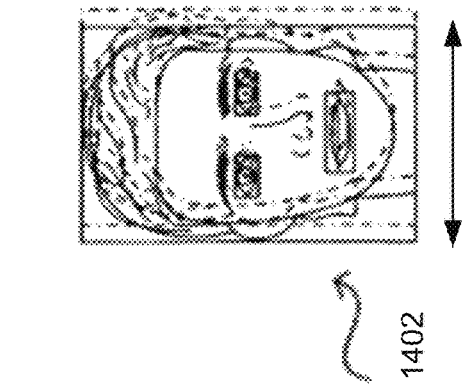

FIG. 14F illustrates another advantage of using an approach such as that described with respect to FIG. 14B to determine the position of various features on a user's head. In this example, it can be seen that the features 1425 of a head of a second user 1404 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial/gaze tracking.

Figure 15A:
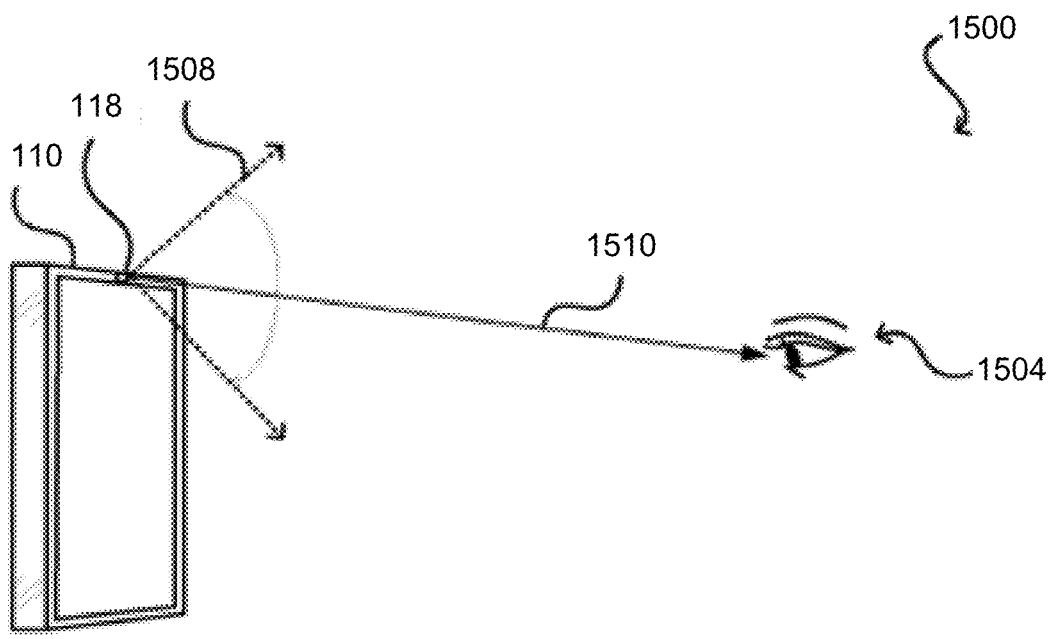
FIGS. 15A-15B illustrate an example approach to determining eye position of a user that can be utilized in accordance with various embodiments.

For example, FIG. 15A illustrates an example situation 1500 wherein the device 110 is configured to utilize at least one camera 118 to attempt to locate a user's eyes, for purposes of gaze detection. In this example, the user's eyes 1504 are located within the field of view 1508 of a camera of the device 110. The point of view of a user can be determined using positions of the user's eyes, pupils, head, or other such features that can be indicative of a gaze direction/location. In some embodiments, depending on device configuration, the device 110 might utilize at least two different cameras positioned on the device with a sufficient separation such that the device can utilize stereoscopic imaging (or anther such approach) to determine a relative position of one or more features (e.g., an eye), with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 1510 of at least one of the user's eyes with respect to the camera. It may be desirable to determine distance to the user in order to provide a more consistent and accurate determination of gaze location, such as using a gaze vector discussed below. In some embodiments, methods such as ultrasonic detection, feature size analysis, luminance analysis through active illumination, or other such distance measurement approaches can be used to assist with position determination, for example using data from a proximity sensor and/or other sensor(s). In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature.

Figure 15B:
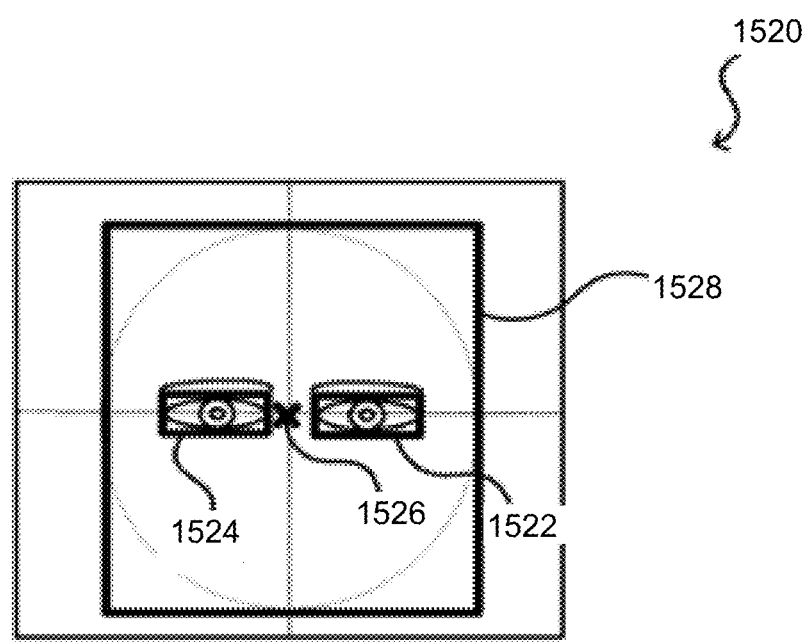

Further illustrating such an example approach, FIG. 15B illustrates an example image 1520 that could be captured of the user's head and eyes using the camera(s) 118 of the device 110. One or more image analysis algorithms can be used to analyze the image to perform pattern recognition, shape recognition, or another such process to determine a feature of interest, such as the user's eyes. Approaches to determining a feature in an image, such may include feature detection, facial feature extraction, feature recognition, stereo vision sensing, character recognition, attribute estimation, or radial basis function (RBF) analysis approaches, are well known in the art and will not be discussed herein in detail. Such analysis may be performed by image processing component 640/740 (e.g., using gaze model 130) and/or another component. As illustrated in this example, both eyes of the user might be able to be located in the captured image information. At least some algorithms are able to determine an approximate location or region 1522, 1524 for each eye, or at least an approximate location 1528 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 1526 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in gaze location determination.

Figure 16C:
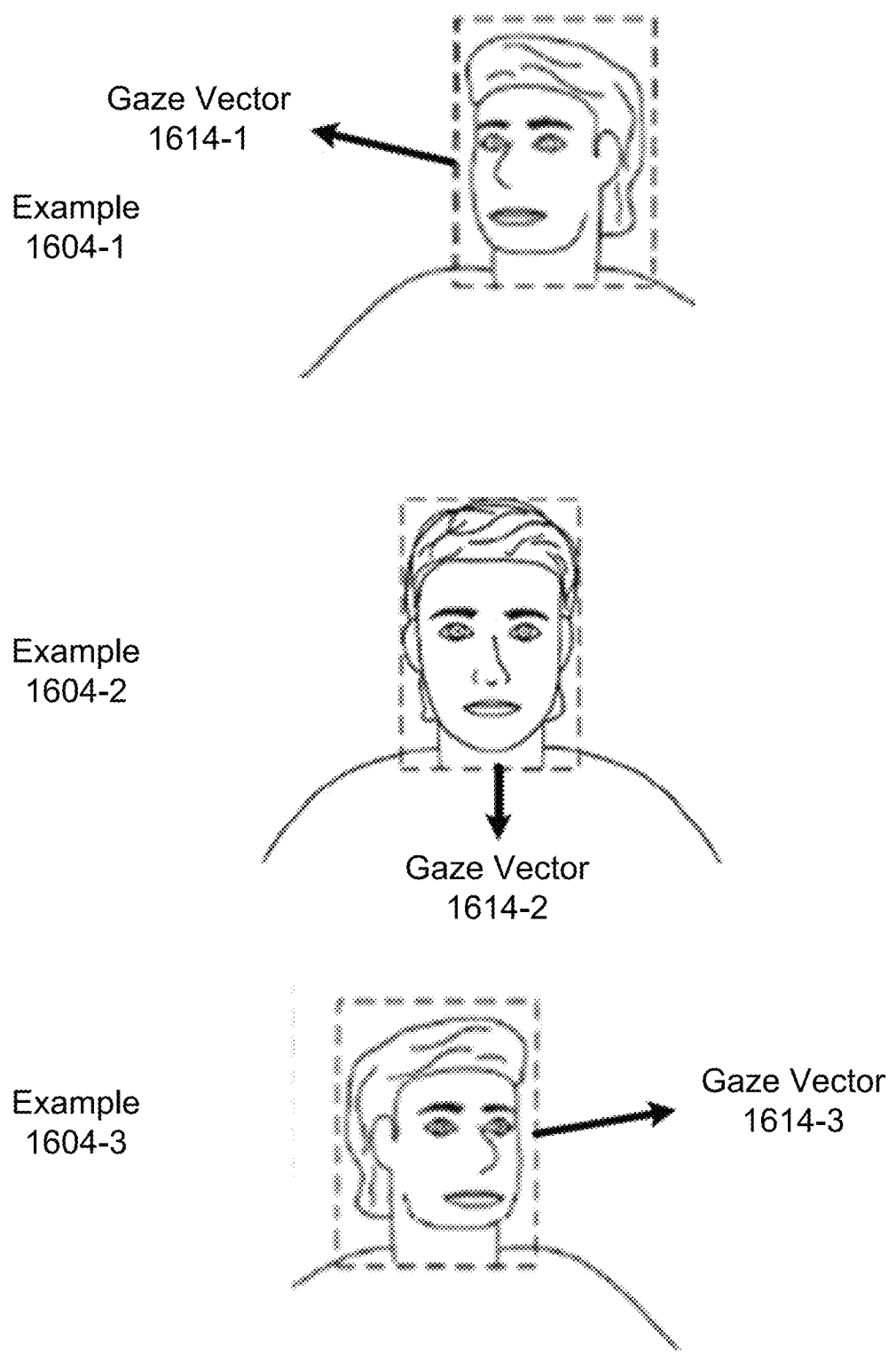

FIGS. 16A-16C illustrates examples of gaze tracking according to embodiments of the present disclosure. Such gaze tracking may be performed by gaze model 130 or other component. The system 100 (e.g., the device 110) may use a variety of techniques to determine a gaze vector, only a few of which are illustrated herein. The gaze vector may point from a user's eye to a location on a display 102, thus indicating the gaze location (e.g., 112) on the display where the user is gazing. The ultimate gaze data 131 may reflect the gaze vector, gaze location, and/or other data. The system may also use additional information such as estimated distance from the user to the device, which may be determined using a proximity/distance sensor of the device 110 and/or by processing the image data to estimate a user distance from the device. The distance information and/or other information (such as other position information determined from similar sources) may be used with the gaze vector to determine the gaze location.

In a first example, the device 110 may determine a position of a head and eyes and may determine a gaze vector based on the position of the eyes relative to the position of the head. In a second example, the device 110 may determine a direction that a head is pointing and may determine a gaze location based on the direction that the head is pointing. In a third example, the device 110 may determine a first area associated with a left portion of a head and a second area associated with a right portion of the head and may determine a gaze based on a ratio between the first area and the second area. In a fourth example, the device 110 may not detect a face and may instead detect a head and determine a gaze vector based on a direction that the head is pointing. However, the present disclosure is not limited thereto and the device 110 may perform gaze tracking using techniques known to one of skill in the art without departing from the disclosure.

Although FIGS. 16A-16B show a head in profile, this is done for illustration purposes and the techniques described herein may be used when the user is facing the device to determine a gaze location with respect to a display. As illustrated in FIG. 16A, a person's head may be positioned identically in a first example 1600-1 and a second example 1600-2, but the person may be looking in a first direction in the first example 1600-1 and looking in a second direction in the second example 1600-2. To accurately determine what the person is viewing, the device 110 may identify an eye position relative to the head and may determine a gaze vector based on the eye position, using techniques described above in reference to FIGS. 14A-15B. For example, in the first example 1600-1 the device 110 may determine a first position of the eyes relative to the head and may therefore determine a first gaze vector 1610-1. In contrast, in the second example 1600-2 the device 110 may determine a second position of the eyes relative to the head and may therefore determine a second gaze vector 1610-2. Therefore, by determining a position of eyes relative to a head, the device 110 may determine gaze vectors that correspond to where the person is viewing on the display 102. The device 110 may identify the eye position using a variety of techniques, such as identifying a pupil in the eye and/or based on non-uniform roundness of eyes using reflections of point-source lights or the like. For example, an eye may be non-spherical and if multiple lights are reflected by the eye, the device 110 may determine a gaze vector associated with the eye based on a location of the lights.

As illustrated in FIG. 16B, a person's head may be positioned differently between a first example 1602-1 and a second example 1602-2, such that the person may be looking in a first direction in the first example 1602-1 and looking in a second direction in the second example 1602-2. The system 100 may identify a direction that the head is pointed and may determine a gaze vector based on the direction. For example, in the first example 1602-1 the device 110 may determine a first direction of the head and may therefore determine a first gaze vector 1612-1. In contrast, in the second example 1602-2 the device 110 may determine a second direction of the head and may therefore determine a second gaze vector 1612-2. Therefore, by determining a direction that a head is pointing, the device 110 may determine gaze vectors that correspond to where the person is viewing.

As illustrated in FIG. 16C, a person's head may be positioned differently between a first example 1604-1, a second example 1604-2 and a third example 1604-3, such that the person may be looking in a first direction in the first example 1604-1, looking in a second direction in the second example 1604-2 and looking in a third direction in the third example 1604-3. The device 110 may identify a direction that the head is pointed based on portions of the head visible in the video frame and may determine a gaze vector based on the direction. For example, the device 110 may determine a first area associated with a left portion of the head and a second area associated with the right portion of the head and determine a ratio between the first area and the second area. In the first example 1604-1, the first area (e.g., left portion) is smaller than the second area (e.g., right portion) and therefore the system 100 may determine a first gaze vector 1614-1 indicating that the head is looking to the left (relative to the video frame). In the second example 1604-2, the first area (e.g., left portion) is approximately equal to the second area (e.g., right portion) and therefore the device 110 may determine a second gaze vector 1614-2 indicating that the head is looking straight (e.g., out of the video frame). In the third example 1604-3, the first area (e.g., left portion) is larger than the second area (e.g., right portion) and therefore the device 110 may determine a third gaze vector 1614-3 indicating that the head is looking to the right (relative to the video frame).

While FIGS. 16A-16C illustrate several examples of gaze tracking, the present disclosure is not limited thereto and the device 110 may determine gaze vectors/regions of a display to which a gaze is directed using other techniques. In addition, while FIGS. 16A-16C illustrate multiple examples individually, the device 110 may determine gaze vectors using any of the examples illustrated or a combination thereof without departing from the present disclosure.

In some embodiments, information from other sensors of the computing device, such as information about the motion of the computing device may be used to enhance the head/face tracking, or other object tracking being performed by the device. For example, the computing device may include one or more cameras capable of capturing images of the user's head or other features (e.g., hands, fingers, facial features, etc.). The image data can be processed to perform facial recognition or gesture recognition for gestures that do not require a physical touch of the device, among other functionality. Conventionally, user detection and/or tracking can be computationally intensive and it may be desirable to optimize these processes by using the information about the motion of the computing device. For instance, if the computing device detects, based on inertial sensor data (e.g., accelerometer, gyroscope, inclinometer, and/or magnetometer), that the user has rotated the computing device such that the user's head is not likely to be within the view of the camera, the computing device may stop the process of user detection and/or tracking to conserve resources (e.g., CPU utilization, power, etc.). Similarly, if the device determines that the user is on a moving bus (e.g., as determined by a mobile payment application for bus fare) or other changing environment where the amount of light is periodically changing (e.g., as determined by an ambient light sensor), the computing device may choose to continue executing the head tracking process even though the user's head (or other features) may become undetectable during certain time intervals due to lack of light. In this manner, the computing device may utilize information about the motion of the device and other context to assist the processes for user detection and tracking.

Object tracking component 1360 may also track other objects represented in image data. An object identified in image data (for example by object detection component 1330) may appear in different position(s) in image data captured by a camera of device 110. Object tracking component 1360 may track the object across image data and may (along with other component(s) of the system) attempt to determine a relative position of the object to the device 110 (or other reference point) over time using various techniques.

Object tracking component 1360 may also include the gaze model 130. The gaze model 130 may also be located elsewhere in the system design. The gaze model 130 may include a classifier or other component (for example including one or more trained model(s)) that is configured to track the gaze of a user using image data and/or feature data corresponding to image data. The gaze model 130 may output data indicating that a user is looking at a device or looking elsewhere (for example at another user). If operated on device 110, the gaze model 130 may process image data (which may including raw image data captured by a camera or may include feature data representing raw image data) to determine that the user is gazing at a camera of the device. If operated on another device, the gaze model 130 may process image data to determine a user is looking at device 110, for example looking at device 110 while speaking an utterance. In this manner processing by a second device may be used to determine that a user is looking at a first device while speaking to the first device. Thus, for example, in a smart-home situation image data from a camera removed from a speech-capture device (e.g., device 110) may be used to determine a user was looking at the speech-capture device when speaking. Data from the gaze model 130 may be used, for example, by system directed input detector 685/785.

The device 110 and/or the system component(s) 120 may include a user recognition component 195 that recognizes one or more users using a variety of data. As illustrated in FIG. 17, the user recognition component 195 may include one or more subcomponents including a vision component 1708, an audio component 1710, a biometric component 1712, a radio frequency (RF) component 1714, a machine learning (ML) component 1716, and a recognition confidence component 1718. In some instances, the user recognition component 195 may monitor data and determinations from one or more subcomponents to determine an identity of one or more users associated with data input to the device 110 and/or the system component(s) 120. The user recognition component 195 may output user recognition data 197, which may include a user identifier associated with a user the user recognition component 195 determines originated data input to the device 110 and/or the system component(s) 120. The user recognition data 197 may be used to inform processes performed by various components of the device 110 and/or the system component(s) 120.

The vision component 1708 may receive data from one or more sensors capable of providing images (e.g., cameras) or sensors indicating motion (e.g., motion sensors). The vision component 1708 can perform facial recognition or image analysis to determine an identity of a user and to associate that identity with a user profile associated with the user. In some instances, when a user is facing a camera, the vision component 1708 may perform facial recognition and identify the user with a high degree of confidence. In other instances, the vision component 1708 may have a low degree of confidence of an identity of a user, and the user recognition component 195 may utilize determinations from additional components to determine an identity of a user. The vision component 1708 can be used in conjunction with other components to determine an identity of a user. For example, the user recognition component 195 may use data from the vision component 1708 with data from the audio component 1710 to identify what user's head appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 1712. For example, the biometric component 1712 may receive data corresponding to fingerprints, iris or retina scans, thermal scans, weights of users, a size of a user, pressure (e.g., within floor sensors), etc., and may determine a biometric profile corresponding to a user. The biometric component 1712 may distinguish between a user and sound from a television, for example. Thus, the biometric component 1712 may incorporate biometric information into a confidence level for determining an identity of a user. Biometric information output by the biometric component 1712 can be associated with specific user profile data such that the biometric information uniquely identifies a user profile of a user.

The radio frequency (RF) component 1714 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1714 the strength of the signal (e.g., as a received signal strength indication (RSSI)). The RF component 1714 may use the RSSI to determine an identity of a user (with an associated confidence level). In some instances, the RF component 1714 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1716 may track the behavior of various users as a factor in determining a confidence level of the identity of the user. By way of example, a user may adhere to a regular schedule such that the user is at a first location during the day (e.g., at work or at school). In this example, the ML component 1716 would factor in past behavior and/or trends in determining the identity of the user that provided input to the device 110 and/or the system component(s) 120. Thus, the ML component 1716 may use historical data and/or usage patterns over time to increase or decrease a confidence level of an identity of a user.

In at least some instances, the recognition confidence component 1718 receives determinations from the various components 1708, 1710, 1712, 1714, and 1716, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 197.

The audio component 1710 may receive data from one or more sensors capable of providing an audio signal (e.g., one or more microphones) to facilitate recognition of a user. The audio component 1710 may perform audio recognition on an audio signal to determine an identity of the user and associated user identifier. In some instances, aspects of device 110 and/or the system component(s) 120 may be configured at a computing device (e.g., a local server). Thus, in some instances, the audio component 1710 operating on a computing device may analyze all sound to facilitate recognition of a user. In some instances, the audio component 1710 may perform voice recognition to determine an identity of a user.

The audio component 1710 may also perform user identification based on audio data 111 input into the device 110 and/or the system component(s) 120 for speech processing. The audio component 1710 may determine scores indicating whether speech in the audio data 111 originated from particular users. For example, a first score may indicate a likelihood that speech in the audio data 111 originated from a first user associated with a first user identifier, a second score may indicate a likelihood that speech in the audio data 111 originated from a second user associated with a second user identifier, etc. The audio component 1710 may perform user recognition by comparing speech characteristics represented in the audio data 111 to stored speech characteristics of users (e.g., stored voice profiles associated with the device 110 that captured the spoken user input).

Figure 18:
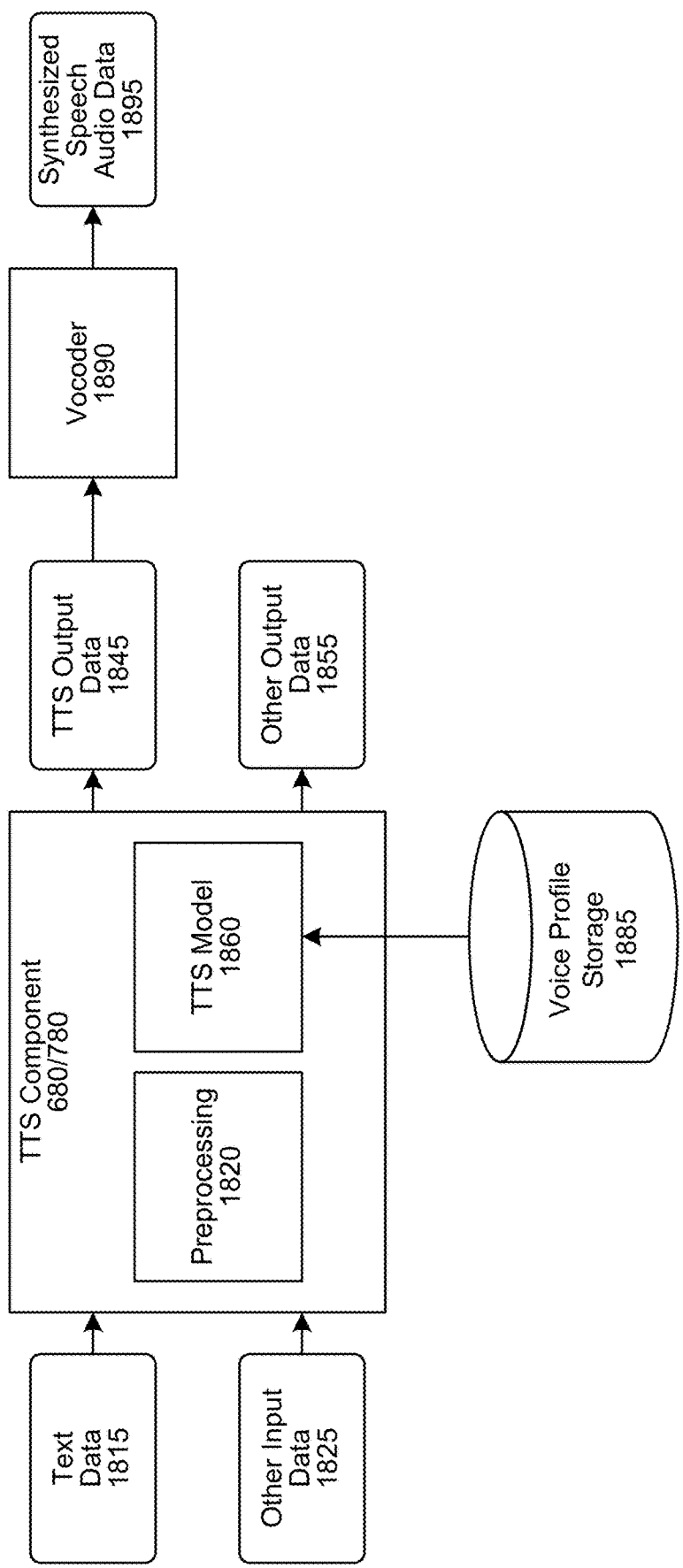
FIG. 18 is a conceptual diagram of text-to-speech components according to embodiments of the present disclosure.

Components of a system that may be used to perform unit selection, parametric TTS processing, and/or model-based audio synthesis are shown in FIG. 18. FIG. 18 is a conceptual diagram that illustrates operations for generating synthesized speech using a TTS component 680/780, according to embodiments of the present disclosure. The TTS component 680/780 may receive text data 1815 and process it using one or more TTS models 1860 to generate TTS output data 1845 representing synthesized speech. In some embodiments the TTS output data 1845 may represent synthesized speech in the form of, for example, spectrogram data. In other embodiments, the TTS output data 1845 may comprise other data, for example data representing a latent representation (e.g., embedding data) representing synthesized speech. A vocoder 1890 or other component may convert the TTS output data 1845 into output speech audio data 1895, which may represent a time-domain waveform suitable for amplification and output as audio (e.g., from a loudspeaker).

The TTS component 680/780 may additionally receive other input data 1825. The other input data 1825 may include, for example, identifiers and/or labels corresponding to a desired speaker identity, voice characteristics, emotion, speech style, etc. desired for the synthesized speech. In some implementations, the other input data 1825 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1815 and/or the other input data 1825 such as metadata accompanying a TTS request and indicating what text should be whispered (or have some other indicated audio characteristic).

The TTS component 680/780 may include a preprocessing component 1820 that can convert the text data 1815 and/or other input data 1825 into a form suitable for processing by the TTS model 1860. The text data 1815 may be from, for example an application, a skill component (described further below), an NLG component, another device or source, or may be input by a user. The text data 1815 received by the TTS component 680/780 may not necessarily be text, but may include other data (such as symbols, code, other data, etc.) that may reference text (such as an indicator of a word and/or phoneme) that is to be synthesized. The preprocessing component 1820 may transform the text data 1815 into, for example, a symbolic linguistic representation, which may include linguistic context features such as phoneme data, punctuation data, syllable-level features, word-level features, and/or emotion, speaker, accent, or other features for processing by the TTS component 680/780. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1815, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1820 may include functionality and/or components for performing text normalization, linguistic analysis, linguistic prosody generation, or other such operations. During text normalization, the preprocessing component 1820 may first process the text data 1815 and generate standard text, converting such things as numbers, abbreviations (such as Apt., St., etc.), symbols ($, %, etc.) into the equivalent of written out words.

During linguistic analysis, the preprocessing component 1820 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1860 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1820 may also identify different grammatical components such as prefixes, suffixes, phrases, punctuation, syntactic boundaries, or the like. Such grammatical components may be used by the TTS component 680/780 to craft a natural-sounding audio waveform output. The language dictionary may also include letter-to-sound rules and other tools that may be used to pronounce previously unidentified words or letter combinations that may be encountered by the TTS component 680/780. Generally, the more information included in the language dictionary, the higher quality the speech output.

The output of the preprocessing component 1820 may be a symbolic linguistic representation, which may include a sequence of phonetic units. In some implementations, the sequence of phonetic units may be annotated with prosodic characteristics. In some implementations, prosody may be applied in part or wholly by a TTS model 1860. This symbolic linguistic representation may be sent to the TTS model 1860 for conversion into audio data (e.g., in the form of Mel-spectrograms or other frequency content data format).

The TTS component 680/780 may retrieve one or more previously trained and/or configured TTS models 1860 from the voice profile storage 1885. A TTS model 1860 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1860 may be stored in the voice profile storage 1885. A TTS model 1860 may represent a particular speaker identity and may be conditioned based on speaking style, emotion, etc. In some implementations, a particular speaker identity may be associated with more than one TTS model 1860; for example, with a different model representing a different speaking style, language, emotion, etc. in some implementations, a particular TTS model 1860 may be associated with more than one speaker identity; that is, be able to produce synthesized speech that reproduces voice characteristics of more than one character. Thus a first TTS model 1860*a* may be used to create synthesized speech for the first speech-processing system component(s)a while a second, different, TTS model 1860*b* may be used to create synthesized speech for the second speech-processing system component(s)b. In some cases, the TTS model 1860 may generate the desired voice characteristics based on conditioning data received or determined from the text data 1815 and/or the other input data 1825. For example a synthesized voice of the first speech-processing system component(s)a may be different from a synthesized voice of the second speech-processing system component(s)b.

The TTS component 680/780 may, based on an indication received with the text data 1815 and/or other input data 1825, retrieve a TTS model 1860 from the voice profile storage 1885 and use it to process input to generate synthesized speech. The TTS component 680/780 may provide the TTS model 1860 with any relevant conditioning labels to generate synthesized speech having the desired voice characteristics. The TTS model 1860 may generate spectrogram data 1845 (e.g., frequency content data) representing the synthesized speech, and send it to the vocoder 1890 for conversion into an audio signal.

The TTS component 680/780 may generate other output data 1855. The other output data 1855 may include, for example, indications or instructions for handling and/or outputting the synthesized speech. For example, the text data 1815 and/or other input data 1825 may be received along with metadata, such as SSML tags, indicating that a selected portion of the text data 1815 should be louder or quieter. Thus, the other output data 1855 may include a volume tag that instructs the vocoder 1890 to increase or decrease an amplitude of the output speech audio data 1895 at times corresponding to the selected portion of the text data 1815. Additionally or alternatively, a volume tag may instruct a playback device to raise or lower a volume of the synthesized speech from the device's current volume level, or lower a volume of other media being output by the device (e.g., to deliver an urgent message).

The vocoder 1890 may convert the spectrogram data 1845 generated by the TTS model 1860 into an audio signal (e.g., an analog or digital time-domain waveform) suitable for amplification and output as audio. The vocoder 1890 may be, for example, a universal neural vocoder based on Parallel WaveNet or related model. The vocoder 1890 may take as input audio data in the form of, for example, a Mel-spectrogram with 80 coefficients and frequencies ranging from 50 Hz to 12 kHz. The synthesized speech audio data 1895 may be a time-domain audio format (e.g., pulse-code modulation (PCM), waveform audio format (WAV), u-law, etc.) that may be readily converted to an analog signal for amplification and output by a loudspeaker. The synthesized speech audio data 1895 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 19:
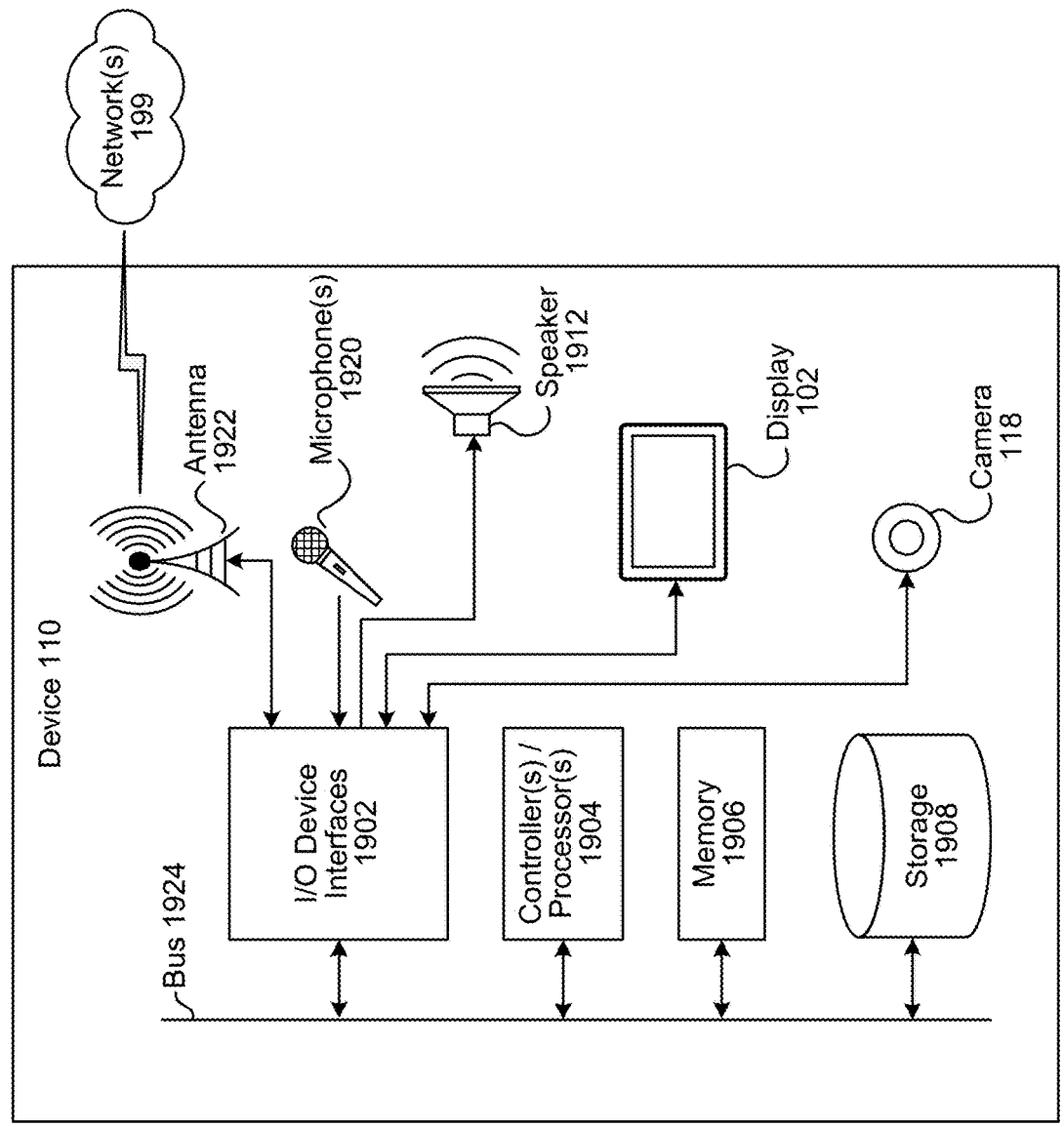
FIG. 19 is a block diagram conceptually illustrating example components of a device, according to embodiments of the present disclosure.
Figure 20:
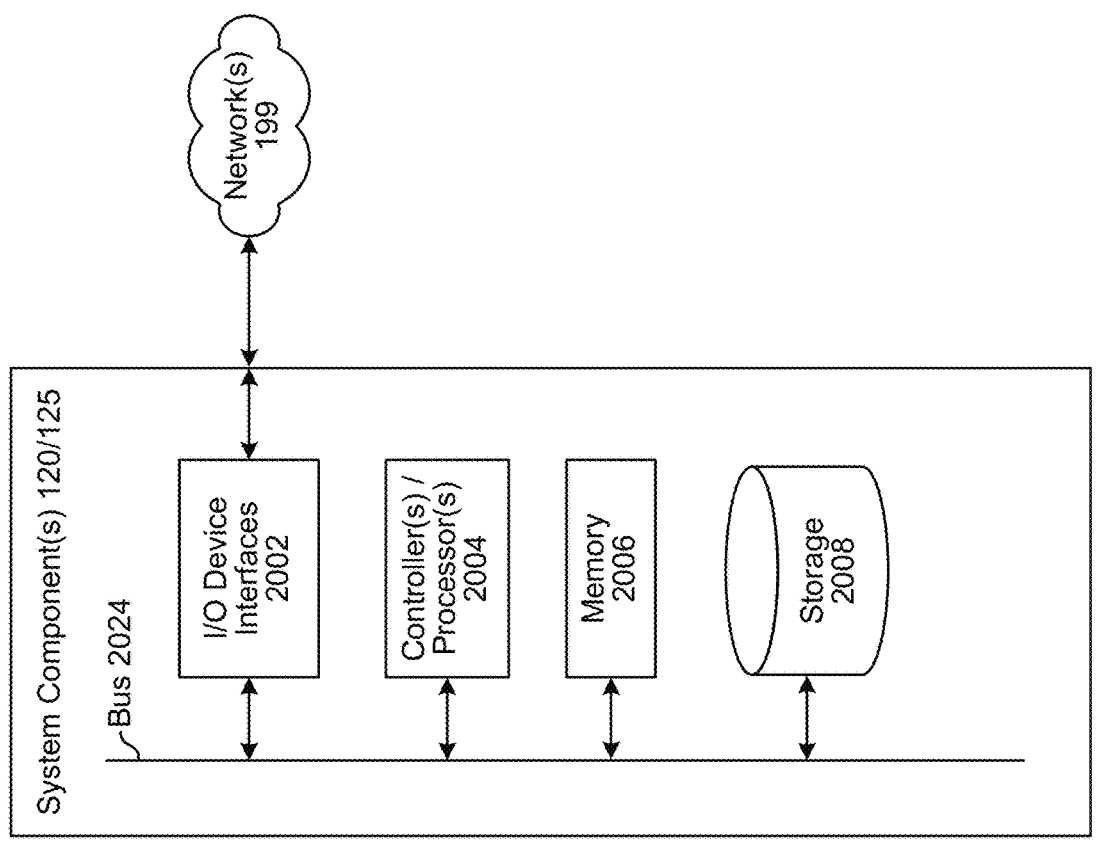
FIG. 20 is a block diagram conceptually illustrating example components of a system, according to embodiments of the present disclosure.

FIG. 19 is a block diagram conceptually illustrating a device 110 that may be used with the system. FIG. 20 is a block diagram conceptually illustrating example components of a remote device, such as the natural language command processing system component(s), which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (1904/2004), which may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive memory (MRAM), and/or other types of memory. Each device (110/120/125) may also include a data storage component (1908/2008) for storing data and controller/processor-executable instructions. Each data storage component (1908/2008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1902/2002).

Computer instructions for operating each device (110/120/125) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120/125) includes input/output device interfaces (1902/2002). A variety of components may be connected through the input/output device interfaces (1902/2002), as will be discussed further below. Additionally, each device (110/120/125) may include an address/data bus (1924/2024) for conveying data among components of the respective device. Each component within a device (110/120/125) may also be directly connected to other components in addition to (or instead of) being connected to other components across the bus (1924/2024).

Referring to FIG. 19, the device 110 may include input/output device interfaces 1902 that connect to a variety of components such as an audio output component such as a speaker 1912, a wired headset or a wireless headset (not illustrated), or other component capable of outputting audio. The device 110 may also include an audio capture component. The audio capture component may be, for example, a microphone 1920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 102 for displaying content. The device 110 may further include a camera 118.

Via antenna(s) 1922, the input/output device interfaces 1902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1902/2002) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (1902/2002), processor(s) (1904/2004), memory (1906/2006), and/or storage (1908/2008) of the device(s) 110, natural language command processing system component(s), or the skill system component(s) 125, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on device 110. For example, language processing 692/792 (which may include ASR 650/750), language output 693/793 (which may include NLG 679/779 and TTS 680/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 21:
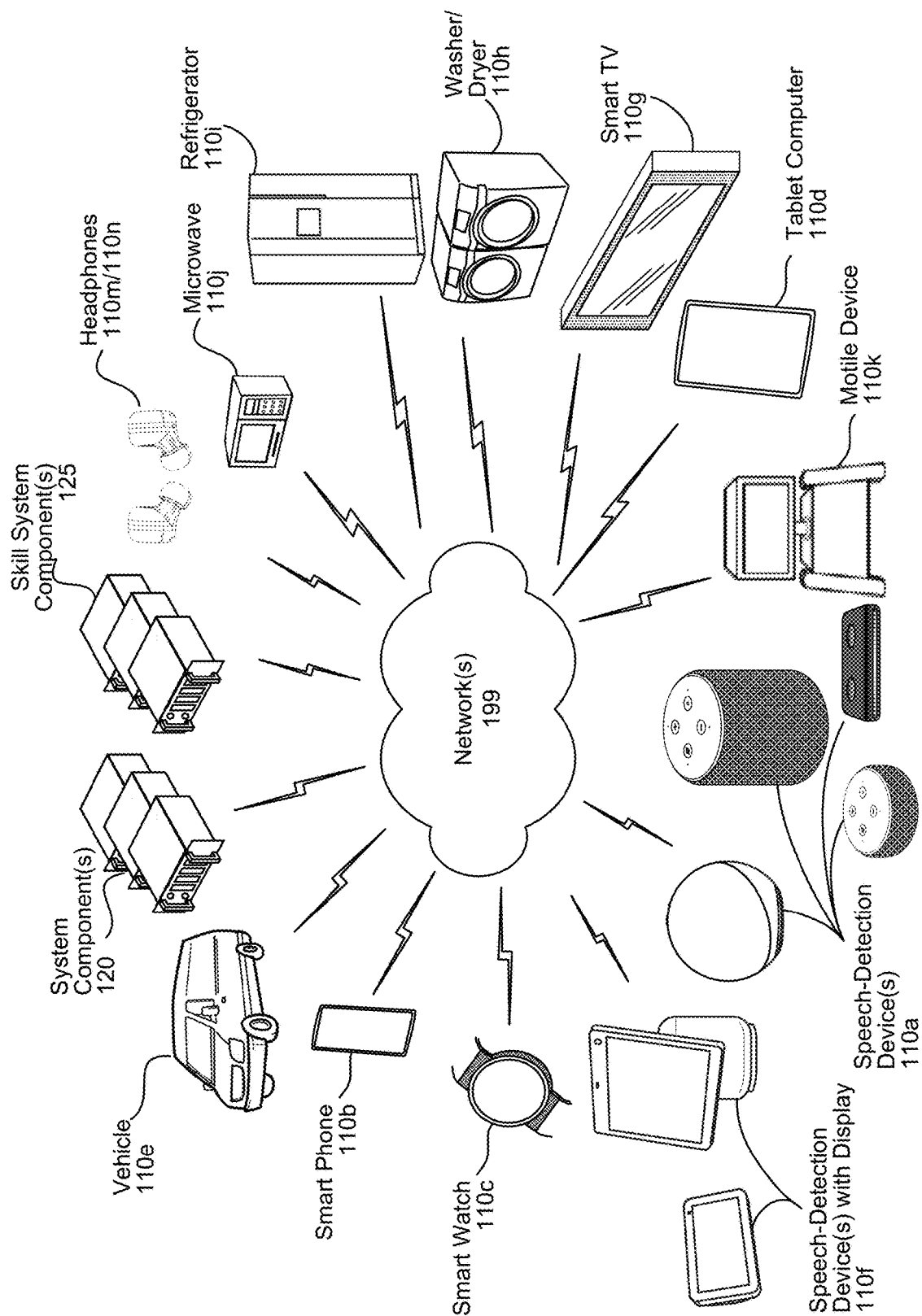
FIG. 21 illustrates an example of a computer network for use with the overall system, according to embodiments of the present disclosure.

As illustrated in FIG. 21, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
presenting, by a display of a first device, a first graphical user interface (GUI) element;
capturing, by a camera of the first device, first image data representing a user;
processing the first image data to determine a gaze of the user is directed, at a first time, at the display;
determining the first GUI element corresponds to video content corresponding to a first application;
based at least in part on the first GUI element corresponding to the video content, selecting a first time threshold from a plurality of time thresholds, the first time threshold corresponding to playing of video content in response to gaze detection;
capturing, by the camera, second image data;
processing the second image data to determine the gaze of the user is directed, at a second time after the first time, at the display;
based at least in part on the first time and the second time, determining a first duration corresponding to the gaze of the user being directed at the display;
determining that the first duration satisfies the first time threshold;
receiving video data corresponding to the video content; and
in response to the first duration satisfying the first time threshold, causing the first device to present the video content using the video data.

2. The computer-implemented method of claim 1, further comprising:
capturing, by the camera, third image data;
processing the third image data to determine the gaze of the user is directed, at a third time between the first time and the second time, at the display;
determining a second duration between the first time and the third time; and
based at least in part on the second duration, presenting, by the display, a visual indicator representing detection of the gaze of the user.

3. The computer-implemented method of claim 1, further comprising, prior to processing the second image data:
sending a request for the video data to a second device associated with the first application;
receiving a first portion of the video data; and
storing, by the first device, the first portion of the video data,
wherein causing the first device to present the video content comprises processing the first portion of the video data.

4. A computer-implemented method comprising:
receiving first content to display on a device;
determining that the first content corresponds to a gaze initiated playback function;
based on the first content, determining a first time threshold to be used to initiate gaze related playback of the first content;
presenting, by a display of a first device, a first graphical user interface (GUI) element corresponding to first content;
capturing, by a camera, first image data representing a user;
processing the first image data to determine a first gaze of the user is directed at the display;
determining a first duration corresponding to the first gaze;
determining that the first duration satisfies the first time threshold; and
in response to the first duration satisfying the first time threshold, causing playback of the first content.

5. The computer-implemented method of claim 4, wherein the first content corresponds to video content comprising image content and audio content and wherein causing playback of the first content comprises:
in response to the first duration satisfying the first time threshold, causing playback of the image content.

6. The computer-implemented method of claim 5, further comprising:
receiving a user input corresponding to playback of the audio content; and
in response to the user input, causing playback of the audio content.

7. The computer-implemented method of claim 4, further comprising:
determining user profile data corresponding to the user;
wherein determining the first time threshold is further based at least in part on the user profile data.

8. The computer-implemented method of claim 4, further comprising:
determining the first GUI element corresponds to a first application;
determining first data associating the first gaze with the first application;
capturing, by a microphone, audio representing an utterance;
determining audio data representing the utterance; and
causing speech processing to be performed using the audio data and the first data.

9. The computer-implemented method of claim 4, further comprising:
presenting, by the display, a visual indicator representing detection of the first gaze of the user.

10. The computer-implemented method of claim 4, further comprising:
determining an identifier associated with the user,
wherein presenting the first GUI element is based at least in part on the identifier.

11. A system, comprising:
at least one processor; and
at least one memory comprising instructions that, when executed by the at least one processor, cause the system to:
present, by a display of a first device, a first graphical user interface (GUI) element corresponding to first content;
capture, by a camera, first image data representing a user;
process the first image data to determine a gaze of the user is directed to at the display;
determine a duration corresponding to the gaze;
determine user profile data corresponding to the user;
determine that the user profile data includes information identifying a first time threshold associated with the user;
based at least in part on the user profile data including the information, select the first time threshold for use in evaluating the duration;

determine the duration satisfies the first time threshold; and in response to the duration satisfying the first time threshold, cause playback of the first content.

12. The system of claim 11, wherein the first content corresponds to video content comprising image content and audio content and wherein the instructions that cause the system to cause playback of the first content comprise instructions that, when executed by the at least one processor, further cause the system to:

in response to the duration satisfying the first time threshold, causing playback of the image content.

13. The system of claim 12, wherein the at least one memory further comprises instructions that, when executed by the at least one processor, further cause the system to:

receive a user input corresponding to playback of the audio content; and in response to the user input, cause playback of the audio content.

14. The system of claim 11, wherein the at least one memory further comprises instructions that, when executed by the at least one processor, further cause the system to:

select the first time threshold further based at least in part on the first content.

15. The system of claim 11, wherein the at least one memory further comprises instructions that, when executed by the at least one processor, further cause the system to:

determine the first GUI element corresponds to a first application;

determine first data associating the gaze with the first application;

capture, by a microphone, audio representing an utterance;

determine audio data representing the utterance; and cause speech processing to be performed using the audio data and the first data.

16. The system of claim 11, wherein the at least one memory further comprises instructions that, when executed by the at least one processor, further cause the system to:

present, by the display, a visual indicator representing detection of the gaze of the user.

17. The system of claim 11, wherein the at least one memory further comprises instructions that, when executed by the at least one processor, further cause the system to:

determine an identifier associated with the user, wherein presentation of the first GUI element is based at least in part on the identifier.

18. The computer-implemented method of claim 4, further comprising:

receiving second content to display on a device;

determining that the second content does not correspond to a gaze initiated playback function;

presenting, by the display, a second GUI element corresponding to second content, wherein the first image data was captured while the first GUI element and the second GUI element were presented simultaneously on the display; and determining to cause playback of the first content rather than the second content based at least in part on the first content corresponding to a gaze initiated playback function and the second content not corresponding to a gaze initiated playback function.

19. The computer-implemented method of claim 4, further comprising:

receiving second content to display on a device;

determining that the second content corresponds to a gaze initiated playback function;

based on the second content, determining a second time threshold, different than the first time threshold, to be used to initiate gaze related playback of the second content;

presenting, by the display, a second GUI element corresponding to the second content;

capturing, by the camera, second image data representing the user;

processing the second image data to determine a second gaze of the user is directed at the display;

determining a second duration corresponding to the second gaze;

determining that the second duration satisfies the second time threshold; and in response to the second duration satisfying the second time threshold, causing playback of the second content.

20. The computer-implemented method of claim 19, wherein:

determining the first time threshold further comprises:

determining that the first content corresponds to a first type of content, and determining that the first type of content is associated with the first time threshold; and determining the second time threshold further comprises:

determining that the second content corresponds to a second type of content different than the first type of content, and determining that the second type of content is associated with the second time threshold.

* * * * *